United States Patent
Miyagi et al.

(10) Patent No.: US 12,407,832 B2
(45) Date of Patent: Sep. 2, 2025

(54) INFORMATION PROCESSING DEVICE AND METHOD

(71) Applicant: SONY GROUP CORPORATION, Tokyo (JP)

(72) Inventors: Yusuke Miyagi, Tokyo (JP); Yuji Fujimoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/563,735

(22) PCT Filed: Feb. 9, 2022

(86) PCT No.: PCT/JP2022/004998
§ 371 (c)(1),
(2) Date: Nov. 22, 2023

(87) PCT Pub. No.: WO2022/259614
PCT Pub. Date: Dec. 15, 2022

(65) Prior Publication Data
US 2024/0275985 A1    Aug. 15, 2024

(30) Foreign Application Priority Data
Jun. 11, 2021    (JP) .................................. 2021-097753

(51) Int. Cl.
*H04N 19/154*    (2014.01)
*G06V 10/44*    (2022.01)
(Continued)

(52) U.S. Cl.
CPC ........... *H04N 19/154* (2014.11); *G06V 10/44* (2022.01); *G06V 10/758* (2022.01); *H04N 19/119* (2014.11); *H04N 19/124* (2014.11)

(58) Field of Classification Search
CPC .. H04N 19/154; H04N 19/119; H04N 19/124; H04N 19/176; H04N 19/196; G06V 10/44; G06V 10/758
See application file for complete search history.

(56) References Cited

U.S. PATENT DOCUMENTS

2016/0021373 A1*   1/2016   Queru .................. H04N 19/167
                                                             382/239
2020/0128249 A1    4/2020   Karczewicz et al.

FOREIGN PATENT DOCUMENTS

WO    2015/183375 A2    12/2015
WO    2018/008387 A1    1/2018
WO    2020/183846 A1    9/2020

OTHER PUBLICATIONS

International Search Report and Written Opinion of PCT Application No. PCT/JP2022/004998, issued on Apr. 19, 2022, 08 pages of ISRWO.

(Continued)

*Primary Examiner* — Nam D Pham
(74) *Attorney, Agent, or Firm* — CHIP LAW GROUP

(57) ABSTRACT

The present disclosure relates to an information processing device and a method enabling suppression of reduction in subjective image quality while suppressing reduction in coding efficiency. An influence on a subjective image quality of a decoded image by applying ZeroOut to quantization coefficients corresponding to an image when coding the image is estimated, and division of a block is controlled on the basis of the estimated influence when setting a size of the block serving as a unit of processing in the coding of the image. The present disclosure may be applied to, for example, an information processing device, a coding device, an electronic device, an information processing method, a program or the like.

20 Claims, 30 Drawing Sheets

| METHOD 1 | ESTIMATE INFLUENCE ON BASIS OF IMAGE AND CORRECT COST ON BASIS OF ESTIMATION RESULT |
|---|---|
| METHOD 1 – 1 | ESTIMATE INFLUENCE ON BASIS OF STATISTIC OF IMAGE |
| METHOD 1 – 1 – 1 | DETERMINE MAGNITUDE OF INFLUENCE USING THRESHOLD |
| METHOD 1 – 2 | ESTIMATE INFLUENCE ON BASIS OF SPATIAL FEATURE AMOUNT OF IMAGE |
| METHOD 1 – 2 – 1 | DETERMINE MAGNITUDE OF INFLUENCE USING THRESHOLD |
| METHOD 1 – 3 | ESTIMATE INFLUENCE ON BASIS OF FREQUENCY FEATURE AMOUNT OF IMAGE |
| METHOD 1 – 3 – 1 | DETERMINE MAGNITUDE OF INFLUENCE USING THRESHOLD |
| METHOD 1 – 4 | ADD FIXED OFFSET TO COST IN CASE WHERE INFLUENCE IS LARGE |
| METHOD 1 – 5 | PROHIBIT ZeroOut APPLICATION IN CASE WHERE INFLUENCE IS LARGE |
| METHOD 1 – 6 | ADD VARIABLE OFFSET CORRESPONDING TO MAGNITUDE OF ESTIMATED INFLUENCE TO COST |
| METHOD 2 | ESTIMATE INFLUENCE ON BASIS OF SCALING LIST AND CORRECT COST ON BASIS OF ESTIMATION RESULT |
| METHOD 2 – 1 | ESTIMATE INFLUENCE ON BASIS OF STATISTIC OF LIST VALUES IN ZeroOut REGION IN CURRENT PICTURE SCALING LIST |
| METHOD 2 – 2 | ADD FIXED OFFSET TO COST IN CASE WHERE INFLUENCE IS LARGE |
| METHOD 2 – 3 | PROHIBIT ZeroOut APPLICATION IN CASE WHERE INFLUENCE IS LARGE |
| METHOD 2 – 4 | ADD VARIABLE OFFSET CORRESPONDING TO MAGNITUDE OF ESTIMATED INFLUENCE TO COST |

(51) Int. Cl.
*G06V 10/75* (2022.01)
*H04N 19/119* (2014.01)
*H04N 19/124* (2014.01)

(56) References Cited

OTHER PUBLICATIONS

"Versatile Video Coding", ITU-T Standard H.266, International Telecommunication Union, Series H: Audiovisual And Multimedia Systems Infrastructure of audiovisual services—Coding of moving video, Aug. 2020, 516 pages.

* cited by examiner

FIG. 1

| 133 | 134 | 140 | 100 | 128 | 139 | 142 | 157 | 138 | 120 | 138 | 132 | 116 | 135 | 138 | 139 |
|---|---|---|---|---|---|---|---|---|---|---|---|---|---|---|---|
| 135 | 130 | 107 | 114 | 123 | 133 | 157 | 121 | 130 | 109 | 111 | 107 | 127 | 120 | 134 | 139 |
| 129 | 151 | 120 | 122 | 118 | 143 | 151 | 125 | 135 | 110 | 117 | 152 | 102 | 122 | 94 | 122 |
| 140 | 152 | 119 | 117 | 114 | 131 | 158 | 116 | 104 | 146 | 141 | 116 | 138 | 112 | 151 | 130 |
| 151 | 125 | 159 | 122 | 117 | 147 | 116 | 149 | 110 | 117 | 133 | 128 | 138 | 127 | 140 | 118 |
| 130 | 128 | 100 | 117 | 134 | 121 | 121 | 132 | 134 | 126 | 142 | 110 | 145 | 164 | 109 | 136 |
| 134 | 104 | 105 | 132 | 108 | 144 | 159 | 110 | 124 | 114 | 133 | 102 | 124 | 134 | 134 | 104 |
| 126 | 164 | 111 | 129 | 146 | 110 | 109 | 134 | 137 | 116 | 147 | 138 | 122 | 127 | 119 | 114 |
| 125 | 116 | 123 | 134 | 130 | 125 | 143 | 142 | 138 | 155 | 103 | 92 | 149 | 121 | 120 | 145 |
| 143 | 141 | 121 | 127 | 139 | 146 | 107 | 137 | 117 | 126 | 111 | 117 | 162 | 112 | 105 | 146 |
| 112 | 138 | 147 | 109 | 128 | 158 | 106 | 125 | 128 | 120 | 141 | 106 | 141 | 120 | 124 | 101 |
| 157 | 87 | 147 | 119 | 113 | 151 | 158 | 143 | 117 | 106 | 108 | 122 | 140 | 140 | 118 | 123 |
| 163 | 114 | 130 | 134 | 135 | 103 | 134 | 140 | 136 | 145 | 129 | 128 | 125 | 133 | 131 | 123 |
| 143 | 133 | 122 | 113 | 101 | 135 | 130 | 123 | 115 | 113 | 143 | 120 | 136 | 142 | 130 | 125 |
| 134 | 124 | 96 | 124 | 121 | 142 | 156 | 158 | 134 | 143 | 158 | 116 | 109 | 126 | 129 | 131 |
| 156 | 151 | 113 | 102 | 130 | 109 | 128 | 114 | 138 | 166 | 120 | 115 | 127 | 132 | 103 | 117 |

| 5 | 6 | 12 | -28 | 0 | 11 | 14 | 29 | 10 | -8 | 10 | 4 | -12 | 7 | 10 | 11 |
|---|---|---|---|---|---|---|---|---|---|---|---|---|---|---|---|
| 7 | 2 | -21 | -14 | -5 | 5 | 29 | -7 | 2 | -19 | -17 | -21 | -1 | -8 | 6 | 11 |
| 1 | 23 | -8 | -6 | -10 | 15 | 23 | -3 | 7 | -18 | -11 | 24 | -26 | -6 | -34 | -6 |
| 12 | 24 | -9 | -11 | -14 | 3 | 30 | -12 | -24 | 18 | 13 | -12 | 10 | -16 | 23 | 2 |
| 23 | -3 | 31 | -6 | -11 | 19 | -12 | 21 | -18 | -11 | 5 | 0 | 10 | -1 | 12 | -10 |
| 2 | 0 | -28 | -11 | 6 | -7 | -7 | 4 | 6 | -2 | 14 | -18 | 17 | 36 | -19 | 8 |
| 6 | -24 | -23 | 4 | -20 | 16 | 31 | -18 | -4 | -14 | 5 | -26 | -4 | 6 | 6 | -24 |
| -2 | 36 | -17 | 1 | 18 | -18 | -19 | 6 | 9 | -12 | 19 | 10 | -6 | -1 | -9 | -14 |
| -3 | -12 | -5 | 6 | 2 | -3 | 15 | 14 | 10 | 27 | -25 | -36 | 21 | -7 | -8 | 17 |
| 15 | 13 | -7 | -1 | 11 | 18 | -21 | 9 | -11 | -2 | -17 | -11 | 34 | -16 | -23 | 18 |
| -16 | 10 | 19 | -19 | 0 | 30 | -22 | -3 | 0 | -8 | 13 | -22 | 13 | -8 | -4 | -27 |
| 29 | -41 | 19 | -9 | -15 | 23 | 30 | 15 | -11 | -22 | -20 | -6 | 12 | 12 | -10 | -5 |
| 35 | -14 | 2 | 6 | 7 | -25 | 6 | 12 | 8 | 17 | 1 | 0 | -3 | 5 | 3 | -5 |
| 15 | 5 | -6 | -15 | -27 | 7 | 2 | -5 | -13 | -15 | 15 | -8 | 8 | 14 | 2 | -3 |
| 6 | -4 | -32 | -4 | 7 | 14 | 28 | 30 | 6 | 15 | 30 | -12 | -19 | -2 | 1 | -7 |
| 28 | 23 | -15 | -26 | 2 | -19 | 0 | -14 | 10 | 38 | -8 | -13 | -1 | 4 | -25 | -11 |

| 13 | -13 | 66 | -28 | -42 | -21 | 9 | -202 | 197 | -25 | -8 | -87 | -34 | -128 | -59 | 26 |
|---|---|---|---|---|---|---|---|---|---|---|---|---|---|---|---|
| 147 | 16 | -6 | -87 | -17 | 197 | -38 | 148 | 48 | -20 | 17 | 100 | -17 | -148 | 130 | -82 |
| -97 | -85 | -63 | -24 | -153 | 25 | 1 | -107 | 85 | 100 | 111 | 262 | 18 | 107 | 91 | 190 |
| 55 | 189 | 90 | 238 | -18 | 62 | -3 | 18 | 131 | -27 | 166 | 215 | 216 | -200 | -64 | 101 |
| 318 | 3 | 293 | 28 | 156 | -12 | -70 | -47 | 108 | 103 | -10 | -141 | -104 | 81 | -90 | -34 |
| 465 | -44 | 81 | -30 | -159 | -96 | 79 | 99 | -112 | -14 | -51 | -88 | -104 | 144 | 228 | 94 |
| 128 | -47 | 159 | 81 | -4 | 90 | -76 | 25 | -116 | -113 | 88 | -21 | -122 | -15 | -13 | 97 |
| 77 | 228 | -112 | 184 | 132 | -68 | 123 | 43 | -3 | 171 | 68 | 27 | -12 | 61 | -202 | -22 |
| -120 | 64 | -171 | -136 | 104 | -9 | -58 | -34 | 64 | 354 | -31 | -43 | -47 | -222 | 55 | 146 |
| -38 | 36 | 111 | 155 | -167 | -381 | -112 | 28 | 87 | -145 | -74 | -84 | -214 | -57 | -23 | -92 |
| 165 | 171 | -73 | 43 | -100 | 3 | -17 | 22 | 47 | 273 | 59 | -262 | -220 | 360 | 43 | -64 |
| -164 | -46 | 73 | -148 | -226 | -68 | -14 | 136 | 46 | -74 | -11 | 4 | -165 | 123 | 238 | -222 |
| 108 | 55 | -61 | -136 | -173 | -200 | 272 | -99 | -106 | -53 | -151 | -22 | 119 | -93 | 246 | -31 |
| 51 | 112 | -135 | -189 | -164 | 119 | 217 | -299 | 241 | -44 | -40 | 93 | -142 | 105 | 17 | -92 |
| -138 | 18 | 199 | -48 | 2 | -60 | 24 | 155 | 229 | 214 | 29 | -100 | 91 | -116 | 68 | 4 |
| 80 | -41 | 4 | -11 | 24 | -120 | 21 | 106 | -6 | -18 | 11 | 52 | -21 | 152 | -123 | -8 |

| 0 | −80 | 160 | 80 | 0 | 80 | 80 | 0 | 160 | −80 | −80 | −240 | 0 | −80 | 0 | 0 |
|---|---|---|---|---|---|---|---|---|---|---|---|---|---|---|---|
| −80 | 80 | 80 | −80 | −80 | 240 | 0 | −160 | 80 | 0 | 0 | 240 | 240 | 0 | 80 | −80 |
| −80 | −160 | 80 | −160 | 80 | 160 | 0 | 80 | −240 | −80 | 320 | 80 | −80 | 80 | −80 | 160 |
| 0 | 0 | 0 | 240 | −80 | −80 | −80 | 0 | 0 | −240 | −240 | −160 | 80 | −160 | 80 | 0 |
| −80 | 80 | 240 | 240 | −160 | −80 | 0 | 0 | 0 | −80 | −240 | 0 | 0 | 80 | −80 | 0 |
| 0 | 0 | 80 | 160 | 0 | 0 | 80 | 80 | 0 | −80 | 80 | 0 | −160 | 0 | 0 | 0 |
| 0 | 0 | 80 | 0 | 80 | 0 | −80 | 160 | 320 | −160 | 240 | −80 | 0 | 0 | 240 | 0 |
| 160 | 0 | 80 | 80 | 80 | −80 | −80 | 0 | 80 | 80 | 0 | 0 | −80 | 240 | 240 | 0 |
| −160 | 160 | −80 | 0 | 0 | 80 | 0 | 0 | 0 | 0 | 160 | −80 | −320 | 160 | 80 |  |
| 0 | 0 | 0 | 0 | −80 | 80 | −80 | 80 | −80 | −80 | 0 | 0 | 240 | 240 | 0 | 0 |
| 0 | 160 | 0 | 80 | 0 | −80 | 80 | −80 | 0 | −400 | 0 | −80 | −160 | 80 | −80 | −80 |
| 0 | 0 | −160 | 0 | 160 | −160 | 0 | 80 | 80 | −160 | −80 | −240 | −160 | −160 | 0 | 0 |
| 0 | −80 | 0 | 240 | 0 | 0 | 80 | 160 | −160 | 160 | 0 | −160 | −160 | −160 | 0 | 0 |
| 80 | 0 | −80 | 80 | 240 | 80 | 160 | −80 | −160 | 80 | −80 | 80 | −80 | −160 | 160 | 0 |
| 0 | 0 | −80 | 160 | 0 | 0 | 0 | 240 | 80 | 0 | 160 | 0 | 80 | 80 | 0 | 0 |
| 0 | 160 | −80 | 80 | 320 | 480 | 80 | 80 | −80 | 0 | 160 | −160 | 80 | 0 | −160 | 80 |

| 131 | 133 | 135 | 108 | 126 | 137 | 142 | 158 | 133 | 122 | 136 | 128 | 118 | 131 | 138 | 135 |
|---|---|---|---|---|---|---|---|---|---|---|---|---|---|---|---|
| 134 | 134 | 113 | 119 | 120 | 132 | 154 | 124 | 130 | 114 | 114 | 109 | 124 | 123 | 128 | 138 |
| 131 | 153 | 118 | 125 | 118 | 139 | 150 | 124 | 144 | 108 | 115 | 152 | 104 | 120 | 97 | 122 |
| 136 | 153 | 115 | 116 | 115 | 128 | 156 | 119 | 107 | 144 | 140 | 114 | 140 | 117 | 150 | 129 |
| 148 | 122 | 156 | 121 | 120 | 141 | 115 | 146 | 104 | 114 | 134 | 131 | 137 | 129 | 141 | 114 |
| 134 | 133 | 106 | 118 | 135 | 118 | 123 | 134 | 130 | 129 | 141 | 109 | 143 | 159 | 111 | 130 |
| 137 | 106 | 109 | 135 | 104 | 139 | 161 | 113 | 121 | 117 | 129 | 105 | 124 | 135 | 137 | 104 |
| 127 | 163 | 110 | 132 | 144 | 106 | 108 | 138 | 136 | 113 | 143 | 139 | 118 | 127 | 117 | 119 |
| 126 | 120 | 123 | 127 | 133 | 125 | 145 | 141 | 139 | 153 | 110 | 94 | 149 | 125 | 119 | 145 |
| 144 | 135 | 120 | 127 | 133 | 144 | 107 | 140 | 119 | 124 | 114 | 112 | 163 | 112 | 105 | 143 |
| 116 | 141 | 144 | 117 | 120 | 156 | 108 | 125 | 132 | 121 | 139 | 109 | 143 | 117 | 121 | 103 |
| 155 | 86 | 143 | 118 | 115 | 149 | 155 | 141 | 123 | 99 | 106 | 118 | 135 | 141 | 121 | 125 |
| 164 | 110 | 129 | 135 | 134 | 107 | 132 | 138 | 133 | 142 | 125 | 128 | 128 | 132 | 130 | 123 |
| 147 | 132 | 113 | 112 | 106 | 134 | 130 | 119 | 122 | 114 | 143 | 122 | 139 | 144 | 130 | 122 |
| 133 | 127 | 99 | 131 | 118 | 141 | 157 | 151 | 133 | 141 | 156 | 113 | 109 | 126 | 132 | 119 |
| 157 | 155 | 111 | 100 | 132 | 115 | 130 | 117 | 141 | 160 | 123 | 123 | 131 | 133 | 102 | 117 |

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| −160 | 160 | −80 | 0 | 0 | 80 | 0 | 0 | 0 | 0 | 0 | 0 | 0 | 0 | 0 | 0 |
| 0 | 0 | 0 | 0 | −80 | 80 | −80 | 80 | 0 | 0 | 0 | 0 | 0 | 0 | 0 | 0 |
| 0 | 160 | 0 | 80 | 0 | −80 | 80 | −80 | 0 | 0 | 0 | 0 | 0 | 0 | 0 | 0 |
| 0 | 0 | −160 | 0 | 160 | −160 | 0 | 80 | 0 | 0 | 0 | 0 | 0 | 0 | 0 | 0 |
| 0 | −80 | 0 | 240 | 0 | 0 | 80 | 160 | 0 | 0 | 0 | 0 | 0 | 0 | 0 | 0 |
| 80 | 0 | −80 | 80 | 240 | 80 | 160 | −80 | 0 | 0 | 0 | 0 | 0 | 0 | 0 | 0 |
| 0 | 0 | −80 | 160 | 0 | 0 | 0 | 240 | 0 | 0 | 0 | 0 | 0 | 0 | 0 | 0 |
| 0 | 160 | −80 | 80 | 320 | 480 | 80 | 80 | 0 | 0 | 0 | 0 | 0 | 0 | 0 | 0 |

FIG. 7

| 132 | 129 | 123 | 118 | 122 | 135 | 147 | 146 | 134 | 124 | 121 | 124 | 126 | 128 | 134 | 140 |
|---|---|---|---|---|---|---|---|---|---|---|---|---|---|---|---|
| 137 | 133 | 124 | 117 | 121 | 135 | 147 | 143 | 128 | 120 | 121 | 124 | 121 | 118 | 124 | 133 |
| 142 | 137 | 127 | 117 | 120 | 134 | 144 | 137 | 122 | 117 | 124 | 128 | 120 | 113 | 118 | 128 |
| 144 | 138 | 127 | 120 | 122 | 132 | 137 | 130 | 120 | 120 | 128 | 133 | 129 | 122 | 123 | 129 |
| 141 | 134 | 125 | 122 | 125 | 130 | 131 | 127 | 123 | 123 | 128 | 134 | 138 | 136 | 131 | 127 |
| 137 | 128 | 120 | 121 | 127 | 129 | 128 | 127 | 126 | 124 | 123 | 129 | 139 | 141 | 131 | 118 |
| 134 | 125 | 117 | 120 | 127 | 129 | 128 | 129 | 130 | 126 | 120 | 121 | 130 | 135 | 126 | 114 |
| 132 | 126 | 121 | 123 | 127 | 129 | 129 | 131 | 133 | 129 | 122 | 119 | 123 | 127 | 125 | 120 |
| 131 | 129 | 127 | 128 | 128 | 129 | 130 | 132 | 133 | 131 | 126 | 122 | 123 | 126 | 128 | 128 |
| 132 | 131 | 131 | 130 | 130 | 131 | 132 | 132 | 130 | 127 | 124 | 124 | 127 | 128 | 127 | 125 |
| 134 | 131 | 128 | 128 | 130 | 134 | 135 | 132 | 125 | 118 | 117 | 123 | 130 | 131 | 123 | 114 |
| 137 | 130 | 123 | 122 | 128 | 135 | 137 | 132 | 123 | 115 | 115 | 123 | 132 | 132 | 122 | 111 |
| 140 | 129 | 119 | 118 | 125 | 133 | 136 | 133 | 127 | 122 | 121 | 126 | 133 | 135 | 129 | 122 |
| 145 | 130 | 116 | 115 | 123 | 131 | 133 | 133 | 134 | 134 | 131 | 129 | 132 | 134 | 133 | 130 |
| 151 | 131 | 113 | 112 | 123 | 130 | 131 | 134 | 140 | 142 | 135 | 127 | 126 | 128 | 127 | 122 |
| 156 | 132 | 110 | 111 | 124 | 130 | 130 | 134 | 142 | 144 | 134 | 123 | 121 | 121 | 117 | 109 |

| METHOD 1 | ESTIMATE INFLUENCE ON BASIS OF IMAGE AND CORRECT COST ON BASIS OF ESTIMATION RESULT | |
|---|---|---|
| METHOD 1-1 | ESTIMATE INFLUENCE ON BASIS OF STATISTIC OF IMAGE | |
| METHOD 1-1-1 | | DETERMINE MAGNITUDE OF INFLUENCE USING THRESHOLD |
| METHOD 1-2 | ESTIMATE INFLUENCE ON BASIS OF SPATIAL FEATURE AMOUNT OF IMAGE | |
| METHOD 1-2-1 | | DETERMINE MAGNITUDE OF INFLUENCE USING THRESHOLD |
| METHOD 1-3 | ESTIMATE INFLUENCE ON BASIS OF FREQUENCY FEATURE AMOUNT OF IMAGE | |
| METHOD 1-3-1 | | DETERMINE MAGNITUDE OF INFLUENCE USING THRESHOLD |
| METHOD 1-4 | ADD FIXED OFFSET TO COST IN CASE WHERE INFLUENCE IS LARGE | |
| METHOD 1-5 | PROHIBIT ZeroOut APPLICATION IN CASE WHERE INFLUENCE IS LARGE | |
| METHOD 1-6 | ADD VARIABLE OFFSET CORRESPONDING TO MAGNITUDE OF ESTIMATED INFLUENCE TO COST | |
| METHOD 2 | ESTIMATE INFLUENCE ON BASIS OF SCALING LIST AND CORRECT COST ON BASIS OF ESTIMATION RESULT | |
| METHOD 2-1 | ESTIMATE INFLUENCE ON BASIS OF STATISTIC OF LIST VALUES IN ZeroOut REGION IN CURRENT PICTURE SCALING LIST | |
| METHOD 2-2 | ADD FIXED OFFSET TO COST IN CASE WHERE INFLUENCE IS LARGE | |
| METHOD 2-3 | PROHIBIT ZeroOut APPLICATION IN CASE WHERE INFLUENCE IS LARGE | |
| METHOD 2-4 | ADD VARIABLE OFFSET CORRESPONDING TO MAGNITUDE OF ESTIMATED INFLUENCE TO COST | |

FIG. 11

| 138 | 139 | 151 | 76 | 129 | 149 | 155 | 183 | 147 | 114 | 148 | 136 | 105 | 142 | 148 | 148 |
|---|---|---|---|---|---|---|---|---|---|---|---|---|---|---|---|
| 141 | 132 | 90 | 103 | 118 | 138 | 184 | 114 | 133 | 93 | 96 | 89 | 127 | 114 | 140 | 148 |
| 131 | 172 | 114 | 117 | 110 | 157 | 172 | 123 | 141 | 95 | 108 | 174 | 79 | 117 | 65 | 118 |
| 150 | 173 | 112 | 107 | 101 | 134 | 185 | 107 | 83 | 161 | 153 | 105 | 147 | 99 | 172 | 132 |
| 171 | 122 | 186 | 117 | 107 | 164 | 105 | 167 | 95 | 108 | 137 | 129 | 147 | 126 | 151 | 110 |
| 132 | 129 | 76 | 108 | 140 | 115 | 115 | 136 | 139 | 125 | 155 | 94 | 160 | 195 | 93 | 143 |
| 140 | 84 | 85 | 137 | 90 | 159 | 186 | 95 | 121 | 103 | 137 | 79 | 120 | 139 | 140 | 84 |
| 124 | 196 | 96 | 129 | 162 | 95 | 92 | 139 | 145 | 105 | 163 | 146 | 116 | 127 | 111 | 103 |
| 123 | 105 | 118 | 140 | 131 | 122 | 157 | 155 | 148 | 179 | 81 | 61 | 168 | 115 | 113 | 160 |
| 156 | 153 | 116 | 127 | 149 | 163 | 89 | 146 | 108 | 125 | 97 | 108 | 192 | 99 | 87 | 162 |
| 98 | 147 | 164 | 92 | 129 | 184 | 87 | 123 | 128 | 114 | 153 | 86 | 152 | 114 | 120 | 77 |
| 184 | 51 | 164 | 112 | 100 | 172 | 184 | 156 | 107 | 88 | 91 | 117 | 151 | 151 | 110 | 118 |
| 195 | 102 | 132 | 139 | 141 | 81 | 140 | 152 | 144 | 161 | 130 | 128 | 122 | 137 | 134 | 119 |
| 157 | 137 | 117 | 101 | 79 | 141 | 131 | 119 | 104 | 100 | 156 | 114 | 143 | 155 | 132 | 124 |
| 140 | 121 | 68 | 121 | 115 | 155 | 181 | 185 | 140 | 156 | 185 | 107 | 92 | 125 | 129 | 116 |
| 180 | 172 | 101 | 79 | 133 | 93 | 128 | 102 | 148 | 199 | 113 | 103 | 126 | 136 | 81 | 108 |

| 149 | 150 | 151 | 153 | 155 | 156 | 160 | 163 | 167 | 172 | 180 | 184 | 186 | 192 | 195 | 199 |
|---|---|---|---|---|---|---|---|---|---|---|---|---|---|---|---|
| 140 | 140 | 141 | 143 | 147 | 148 | 151 | 155 | 157 | 163 | 172 | 174 | 184 | 185 | 186 | 196 |
| 132 | 136 | 137 | 137 | 139 | 140 | 143 | 147 | 152 | 157 | 162 | 171 | 173 | 183 | 185 | 195 |
| 126 | 127 | 129 | 129 | 131 | 133 | 137 | 139 | 145 | 148 | 155 | 160 | 164 | 172 | 184 | 185 |
| 119 | 121 | 122 | 123 | 125 | 128 | 130 | 134 | 139 | 141 | 148 | 155 | 161 | 168 | 179 | 184 |
| 115 | 115 | 116 | 117 | 118 | 122 | 125 | 129 | 132 | 138 | 141 | 148 | 155 | 161 | 172 | 181 |
| 108 | 110 | 112 | 114 | 114 | 117 | 119 | 124 | 128 | 132 | 138 | 141 | 148 | 156 | 164 | 172 |
| 105 | 105 | 107 | 108 | 108 | 114 | 114 | 118 | 122 | 127 | 132 | 139 | 146 | 152 | 157 | 164 |
| 100 | 101 | 103 | 103 | 105 | 108 | 112 | 114 | 117 | 123 | 129 | 134 | 140 | 147 | 156 | 162 |
| 95 | 95 | 96 | 99 | 101 | 104 | 107 | 111 | 115 | 118 | 124 | 131 | 137 | 142 | 151 | 159 |
| 90 | 91 | 92 | 93 | 97 | 101 | 103 | 108 | 113 | 117 | 121 | 128 | 133 | 140 | 147 | 156 |
| 84 | 85 | 88 | 89 | 93 | 96 | 102 | 105 | 108 | 114 | 118 | 125 | 131 | 139 | 146 | 153 |
| 79 | 81 | 81 | 86 | 89 | 93 | 98 | 103 | 107 | 114 | 117 | 123 | 129 | 137 | 144 | 153 |
| 76 | 77 | 79 | 83 | 87 | 92 | 95 | 102 | 107 | 113 | 116 | 121 | 129 | 136 | 140 | 151 |
| 61 | 68 | 79 | 81 | 85 | 92 | 95 | 100 | 107 | 110 | 116 | 120 | 127 | 136 | 140 | 149 |
| 51 | 65 | 76 | 79 | 84 | 90 | 94 | 99 | 105 | 110 | 115 | 120 | 126 | 132 | 140 | 148 |

102

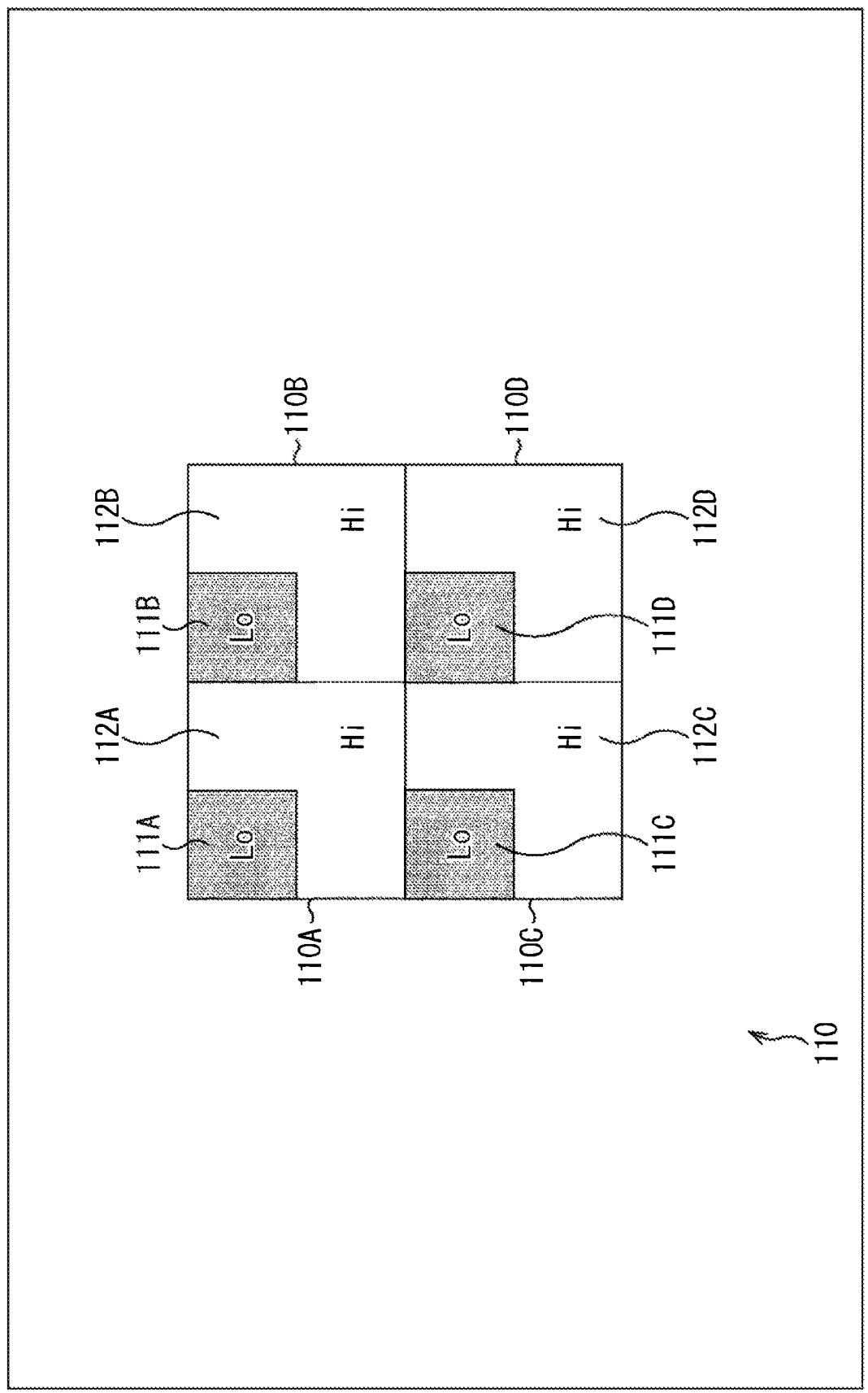

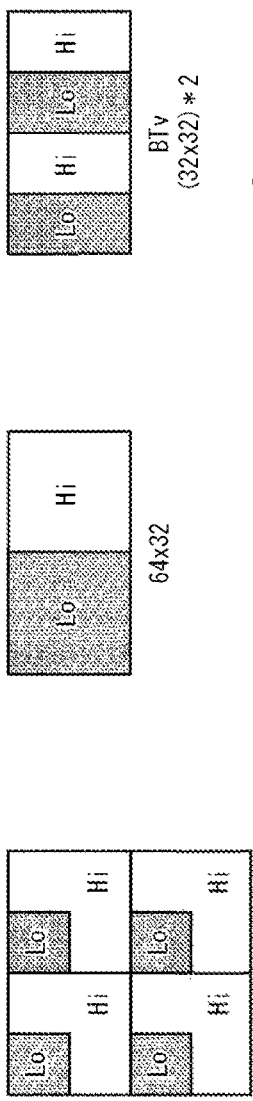
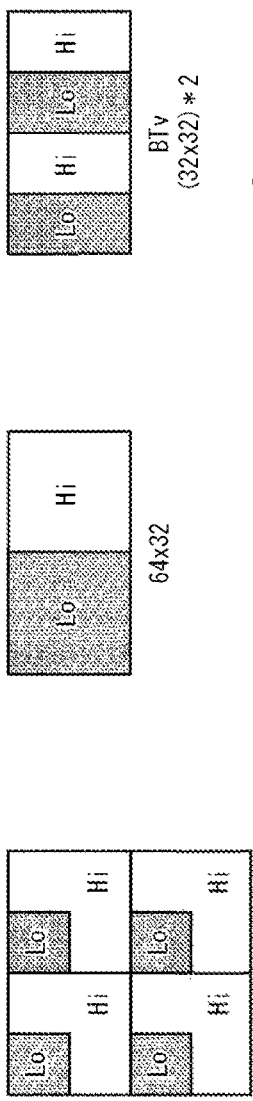
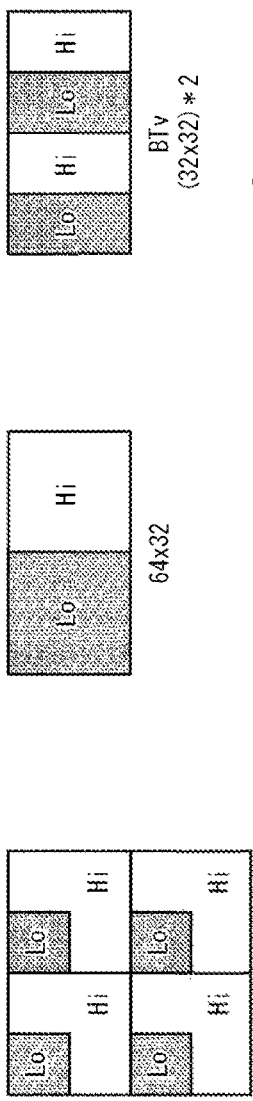
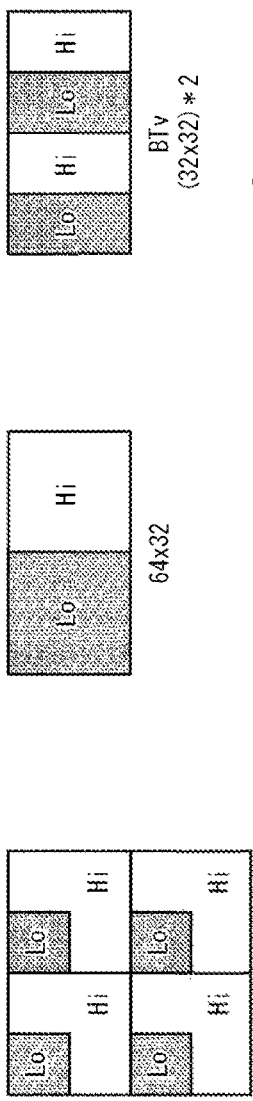
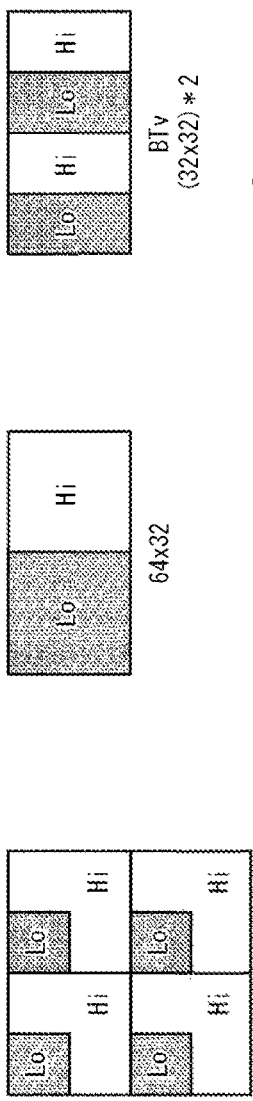
FIG. 15A  64x64
FIG. 15B  QT (32x32)*4
FIG. 15C  64x32
FIG. 15D  BTv (32x32)*2
FIG. 15E  64x16
FIG. 15F  BTv (32x16)*2
FIG. 15G  64x8
FIG. 15H  BTv (32x8)*2
FIG. 15I  64x4
FIG. 15J  BTv (32x4)*2

INFORMATION PROCESSING DEVICE AND METHOD

CROSS REFERENCE TO RELATED APPLICATIONS

This application is a U.S. National Phase of International Patent Application No. PCT/JP2022/004998 filed on Feb. 9, 2022, which claims priority benefit of Japanese Patent Application No. JP 2021-097753 filed in the Japan Patent Office on Jun. 11, 2021. Each of the above-referenced applications is hereby incorporated herein by reference in its entirety.

TECHNICAL FIELD

The present disclosure relates to an information processing device and a method, and especially relates to an information processing device and a method capable of suppressing reduction in subjective image quality while suppressing reduction in coding efficiency.

BACKGROUND ART

Conventionally, in versatile video coding (VVC), which is a moving image coding standard, a prediction residual of a moving image has been derived at the time of coding processing, and the prediction residual has been subjected to coefficient transform, quantized, and coded. Furthermore, at the time of decoding processing, coded data has been decoded, subjected to inverse quantization and inverse coefficient transform to derive the prediction residual, and a prediction value has been added to the prediction residual to generate (restore) a moving image (for example, refer to Non-Patent Document 1).

In image coding involving coefficient transform such as VVC, a transformation size has been generally set by setting the number of divisions from a maximum size. At that time, determination as to whether or not to divide the transformation size has been performed by comparing a cost of coding in the transformation size before the division with a cost of coding in the transformation size after the division.

In VVC, the maximum size of the transformation size (TU), which is the size of the coefficient transform, has been extended from 32×32 to 64×64. Furthermore, with respect to a transformation size larger than 32×32, in order to reduce a circuit scale of a decoder, a constraint (ZeroOut) has been added that only coefficients from DC to a mid-frequency range are transmitted, and high-frequency components are not transmitted. When the transformation size to which ZeroOut is applied is selected, the high-frequency components are completely lost regardless of a bit rate, so that there has been a possibility that the subjective image quality is greatly reduced. Therefore, it has been desired that an encoder sets the transformation size in consideration of both the coding efficiency and the subjective image quality.

CITATION LIST

Non-Patent Document

Non-Patent Document 1: TELECOMMUNICATION STANDARDIZATION SECTOR OF ITU, "Versatile video coding", SERIES H: AUDIOVISUAL AND MULTIMEDIA SYSTEMS Infrastructure of audiovisual services—Coding of moving video, Recommendation ITU-T H.266, August 2020

SUMMARY OF THE INVENTION

Problems to be Solved by the Invention

However, in a case of real time encoding of instantly coding an input image, the cost has been derived on the basis of information regarding the code amount and the subjective image quality has not been considered. Therefore, there has been a possibility that a transformation size to which ZeroOut is applied is selected in order to suppress the reduction in coding efficiency, and the subjective image quality of the decoded image is reduced.

The present disclosure has been achieved in view of such a situation, and an object thereof is to enable suppression of reduction in subjective image quality while suppressing reduction in coding efficiency.

Solutions to Problems

An information processing device according to an aspect of the present technology is an information processing device including an estimation unit that estimates, on the basis of an image, influence on a subjective image quality of a decoded image by applying ZeroOut to quantization coefficients corresponding to the image when coding the image, and a control unit that controls division of a block on the basis of the influence estimated by the estimation unit when setting a size of the block serving as a unit of processing in the coding of the image.

An information processing method according to an aspect of the present technology is an information processing method including estimating, on the basis of an image, influence on a subjective image quality of a decoded image by applying ZeroOut to quantization coefficients corresponding to the image when coding the image, and controlling division of a block on the basis of the estimated influence when setting a size of the block serving as a unit of processing in the coding of the image.

An information processing device according to another aspect of the present technology is an information processing device including an estimation unit that estimates, on the basis of a scaling list, influence on a subjective image quality of a decoded image by applying ZeroOut to quantization coefficients corresponding to the image when coding the image, and a control unit that controls division of a block on the basis of the influence estimated by the estimation unit when setting a size of the block serving as a unit of processing in the coding of the image.

An information processing method according to another aspect of the present technology is an information processing method including estimating, on the basis of a scaling list, influence on a subjective image quality of a decoded image by applying ZeroOut to quantization coefficients corresponding to an image when coding the image, and controlling division of a block on the basis of the estimated influence when setting a size of the block serving as a unit of processing in the coding of the image.

In the information processing device and method according to one aspect of the present technology, on the basis of the image, the influence on the subjective image quality of the decoded image by applying ZeroOut to the quantization coefficients corresponding to the image when coding the image is estimated, and the division of the block is controlled on the basis of the estimated influence when setting the size of the block serving as a unit of processing in the coding of the image.

In the information processing device and method according to another aspect of the present technology, on the basis of the scaling list, the influence on the subjective image quality of the decoded image by applying ZeroOut to the quantization coefficients corresponding to the image when coding the image is estimated, and the division of the block is controlled on the basis of the estimated influence when setting the size of the block serving as a unit of processing in the coding of the image.

BRIEF DESCRIPTION OF DRAWINGS

FIG. 1 is a diagram illustrating an example of pixel values of an original image.

FIG. 2 is a diagram illustrating an example of prediction residuals.

FIG. 3 is a diagram illustrating an example of transform coefficients.

FIG. 4 is a diagram illustrating an example of quantization coefficients in a case where Zeroout is not applied.

FIG. 5 is a diagram illustrating an example of a reconstructed image in a case where Zeroout is not applied.

FIG. 6 is a diagram illustrating an example of quantization coefficients in a case where Zeroout is applied.

FIG. 7 is a diagram illustrating an example of the reconstructed image in a case where Zeroout is applied.

FIG. 10 is a diagram illustrating an example of a method of CU division control.

FIG. 11 is a diagram illustrating an example of transform coefficients.

FIG. 12 is a diagram illustrating an example of sorted transform coefficients.

FIG. 14 is a diagram illustrating an example of deriving a frequency feature amount.

FIGS. 15A, 15B, 15C, 15D, 15E, 15F, 15G, 15H, 15I, and 15J are diagrams illustrating an example of deriving a frequency feature amount.

MODE FOR CARRYING OUT THE INVENTION

Figure 8:
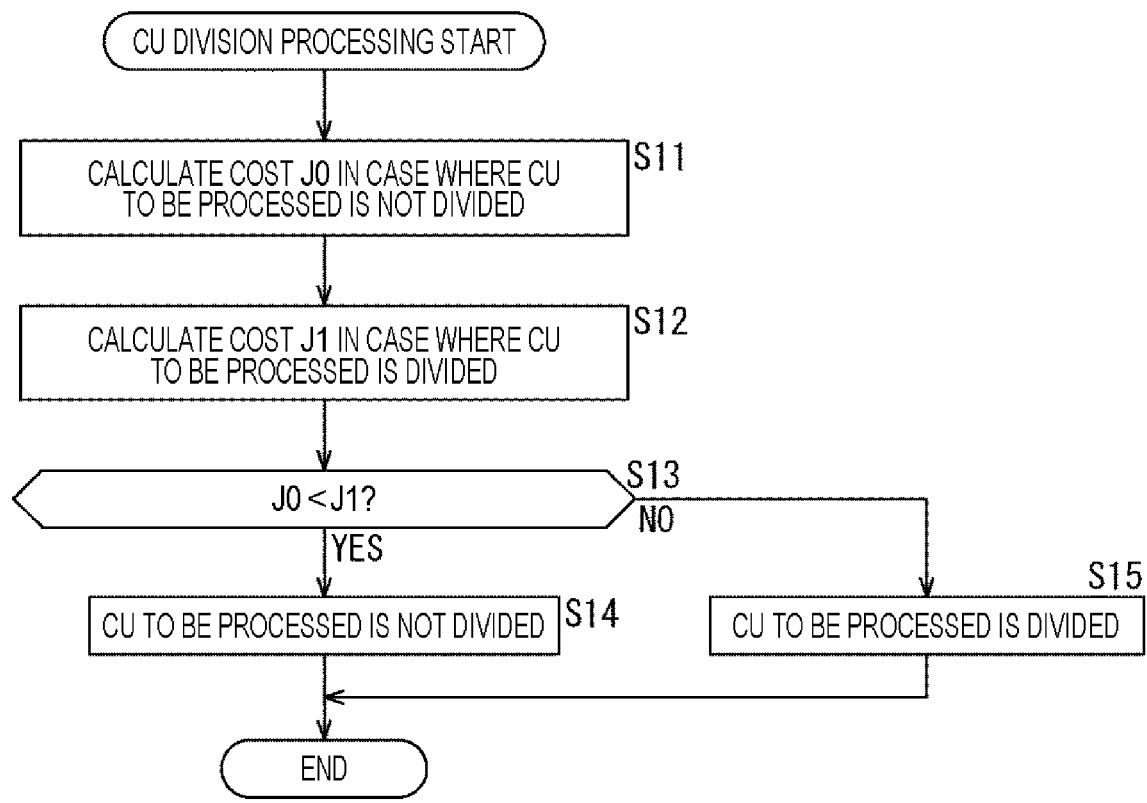
FIG. 8 is a flowchart illustrating an example of a flow of CU division processing.

Modes for carrying out the present disclosure (hereinafter, referred to as embodiments) are hereinafter described. Note that, the description will be given in the following order.
1. CU Setting in Image Coding
2. CU Setting in Consideration of Influence on Subjective Image Quality by ZeroOut Application
3. First Embodiment (CU Setting Device (Influence Estimation Based on Image))
4. Second Embodiment (CU Setting Device (Influence Estimation Based on Scaling List))
5. Third Embodiment (Image Coding Device)
6. Appendix

1. CU SETTING IN IMAGE CODING

Documents and the Like that Support Technical Contents and Technical Terms

The scope disclosed in the present technology includes, in addition to the contents disclosed in the embodiments, contents described in following Non-Patent Documents and the like known at the time of filing, the contents of other documents referred to in following Non-Patent Documents and the like.
Non-Patent Document 1: (mentioned above)
Non-Patent Document 2: Recommendation ITU-T H.264 (April 2017) "Advanced video coding for generic audiovisual services", April 2017
Non-Patent Document 3: Recommendation ITU-T H.265 (February 18) "High efficiency video coding", February 2018

That is, the contents disclosed in above-mentioned Non-Patent Documents also serve as the basis for determining the support requirements. For example, even in a case where the quad-tree block structure and the quad-tree plus binary tree (QTBT) block structure disclosed in above-mentioned Non-Patent Documents are not directly described in the embodiments, they are within the scope of the disclosure of the present technology and satisfy the support requirements of claims. Furthermore, for example, technical terms such as parsing, syntax, and semantics are similarly within the scope of the disclosure of the present technology even in a case where there is no direct description in the embodiment, and meet the support requirements of claims.

Furthermore, in the present specification, a "block" (not a block indicating a processing unit) used in the description as a partial region or a unit of processing of an image (picture) indicates any partial region in the picture unless otherwise especially mentioned, and its size, shape, characteristics and the like are not limited. For example, examples of the "block" include any partial region (unit of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a sub-block, a macroblock, a tile, or a slice disclosed in Non-Patent Documents mentioned above.

Furthermore, when the size of such block is specified, the block size may be specified not only directly but also indirectly. For example, the block size may be specified using identification information for identifying the size. Furthermore, for example, the block size may be specified by a ratio with the size of a reference block (for example, LCU, SCU and the like) or a difference therefrom. For example, in a case of transmitting information for specifying the block size as a syntax element and the like, information indirectly specifying the size as described above may be used as this information. By doing so, an information amount of the information can be reduced, and coding efficiency may be improved in some cases. Furthermore, the specification of the block size also includes specification of a range of the block size (for example, specification of the range of an allowable block size and the like).

Furthermore, in the present specification, coding includes not only entire processing of transforming an image into a bit stream but also a part of the processing. For example, in addition to processing including prediction processing, orthogonal transform, quantization, arithmetic coding and the like, processing collectively including the quantization and arithmetic coding, processing including the prediction processing, quantization, and arithmetic coding and the like are also included. Similarly, decoding includes not only entire processing of transforming a bit stream into an image but also a part of the processing. For example, in addition to processing including inverse arithmetic decoding, inverse quantization, inverse orthogonal transform, prediction processing and the like, processing including the inverse arithmetic decoding and inverse quantization, processing including the inverse arithmetic decoding, inverse quantization, and prediction processing and the like are also included.

<ZeroOut of VVC>

In versatile video coding (VVC) disclosed in Non-Patent Document 1, a difference in pixel value (prediction residual) is derived between an image and a prediction image of the image, and the prediction residual is subjected to coefficient transform (for example, orthogonal transform and the like), quantized, and coded. Furthermore, at the time of decoding processing, coded data is decoded, subjected to inverse quantization and inverse coefficient transform, the prediction residual is derived, and a prediction value is added to the prediction residual to generate (restore) a moving image.

These pieces of processing are performed for each predetermined block (for example, CU). FIG. 1 illustrates an example of pixel values of an original image. An original image 11 illustrated in FIG. 1 is an example of the pixel values of the original image of a CU to be processed. For convenience of description, it is herein assumed that a size of the CU to be processed is 16×16 (16 pixels×16 pixels), but the size of the CU to be processed is not limited to this example. Furthermore, the "original image" is an image to be coded input to an encoder.

The encoder derives a difference in pixel value (prediction residual) between the original image 11 and a prediction image thereof. Prediction residuals 12 illustrated in FIG. 2 are an example of the prediction residuals of the CU to be processed derived from the original image 11.

Furthermore, the encoder performs coefficient transform (for example, orthogonal transform) on the prediction residuals 12 to derive transform coefficients. Transform coefficients 13 illustrated in FIG. 3 are an example of the transform coefficients of the CU to be processed derived from the prediction residuals 12.

Moreover, the encoder quantizes the transform coefficients 13 to derive quantization coefficients. Transform coefficients 14 illustrated in FIG. 4 are an example of transform coefficients obtained by further performing inverse quantization on the quantization coefficients of the CU to be processed obtained by performing quantization on the transform coefficients 13. A reconstructed image 15 illustrated in FIG. 5 is an example of a reconstructed image (also referred to as a decoded image) obtained by performing inverse coefficient transform (for example, inverse orthogonal transform) on the transform coefficients 14 in FIG. 4.

FIGS. 1 to 5 illustrate an example in a case where the size of the CU to be processed (16×16) is a CU size to which ZeroOut is not applied. In this case, as illustrated in FIGS. 4 and 5, all the quantization coefficients of the CU to be processed are coded.

In contrast, it is assumed that a transformation size of a processing target is a size to which ZeroOut is applied. In this case, as for the quantization coefficients, only the coefficients from DC to a mid-frequency range are coded, and high-frequency components are transformed to "0" (not coded). Such processing is referred to as ZeroOut. The transform coefficients 14 illustrated in FIG. 6 are an example of the transform coefficients obtained by performing inverse quantization on the quantization coefficients in that case. In a case of the example in FIG. 6, only the quantization coefficients in a portion enclosed by a thick line frame 16 are coded, and the quantization coefficients in the other portion (also referred to as a ZeroOut region) are transformed into coefficients of value "0" (also referred to as zero coefficients) (that is, not coded).

Therefore, the reconstructed image 15 of the CU to be processed in this case is as in an example in FIG. 7, and has pixel values different from those in the example in FIG. 5. That is, when the transformation size to which ZeroOut is applied is selected, the high-frequency components are completely lost regardless of a bit rate. Specifically, even if the bit rate is allowed to increase and a quantization step of the transform coefficient is made finer by reducing a quantization parameter (QP), a wide-area component removed by ZeroOut cannot be reproduced. Therefore, for example, when the transformation size to which ZeroOut is applied is selected for a block (high texture region) including a large number of high-frequency components such as noise components referred to as so-called film grain and the like, a texture of a tree and the like, there has been a possibility that the high-frequency components are lost and a subjective image quality is greatly reduced. Therefore, it has been desired that an encoder sets the transformation size in consideration of both the coding efficiency and the subjective image quality.

<CU Division Processing>

In image coding with coefficient transform such as VVC, an image is coded for each partial region (CU). That is, the transformation size depends on the CU size. The CU size is set by repeatedly dividing from a maximum size. That is, it is determined whether or not to divide the CU having the maximum size, and it is determined whether or not to further divide the divided CU. Each CU size is set by recursively repeating the determination as to whether or not to divide the CU with respect to the divided CU in this manner. The determination as to whether or not to divide the CU is performed by comparing a cost of coding in the CU before the division with a cost of coding in the CU after the division.

For example, it is set whether or not to divide the CU in a flow illustrated in a flowchart in FIG. 8. That is, the encoder first calculates a cost J0 in a case where the CU to be processed is not divided (step S11), and then calculates a cost J1 in a case where the CU to be processed is divided (step S12).

Next, the encoder compares the cost J0 with the cost J1, and determines whether or not the cost J1 is larger than the cost J0 (J0<J1) (step S13). In a case where it is determined that the cost J1 is larger than the cost J0, the encoder does not divide the CU to be processed (step S14). In a case where it is determined that the cost J1 is not larger than the cost J0, the encoder divides the CU to be processed (step S15).

In a case of non-real time encoding in which a coding time is sufficient, the cost J (the cost J0 and cost J1) is derived as, for example, in following Expression (1).

$$J = Dist + \lambda \cdot Bit \qquad (1)$$

where

Dist=coding distortion (original image−reconstructed image),

Bit=code amount (header and transform coefficient), and $\lambda$=weight coefficient (function of QP).

In this case, it is set whether or not to divide the CU so as to optimize a rate and the coding distortion. Therefore, an influence on the coding distortion due to the application of ZeroOut is also reflected in the cost J. Note that, as described above, in order to calculate the cost J, the reconstructed image (decoded image) obtained by further decoding the coded data obtained by coding the image is required, and a processing time increases.

In contrast, in a case of real time encoding to immediately code an input moving image, coding needs to be performed in a short time, and there is no time to calculate the cost J using the reconstructed image as in the above-described example. Therefore, the cost J (the cost J0 and cost J1) is derived as, for example, in following Expression (2).

$$J = Satd + \lambda \cdot HeaderBin \qquad (2)$$

where

Satd=prediction residual,

HeaderBin=code amount of header, and $\lambda$=weight coefficient (function of QP).

That is, it is set whether or not to divide the CU on the basis of information regarding the code amount of the prediction residual and the like. Therefore, in this case, since the reconstructed image is not used, an increase in processing time can be suppressed. Note that, in this case, the coding distortion is not taken into consideration. Therefore, there has been a possibility that a large CU size to which ZeroOut is applied is selected also in the high texture region, for example, in order to suppress reduction in coding efficiency, the coding distortion increases, and as a result, the subjective image quality is reduced.

Figure 9:
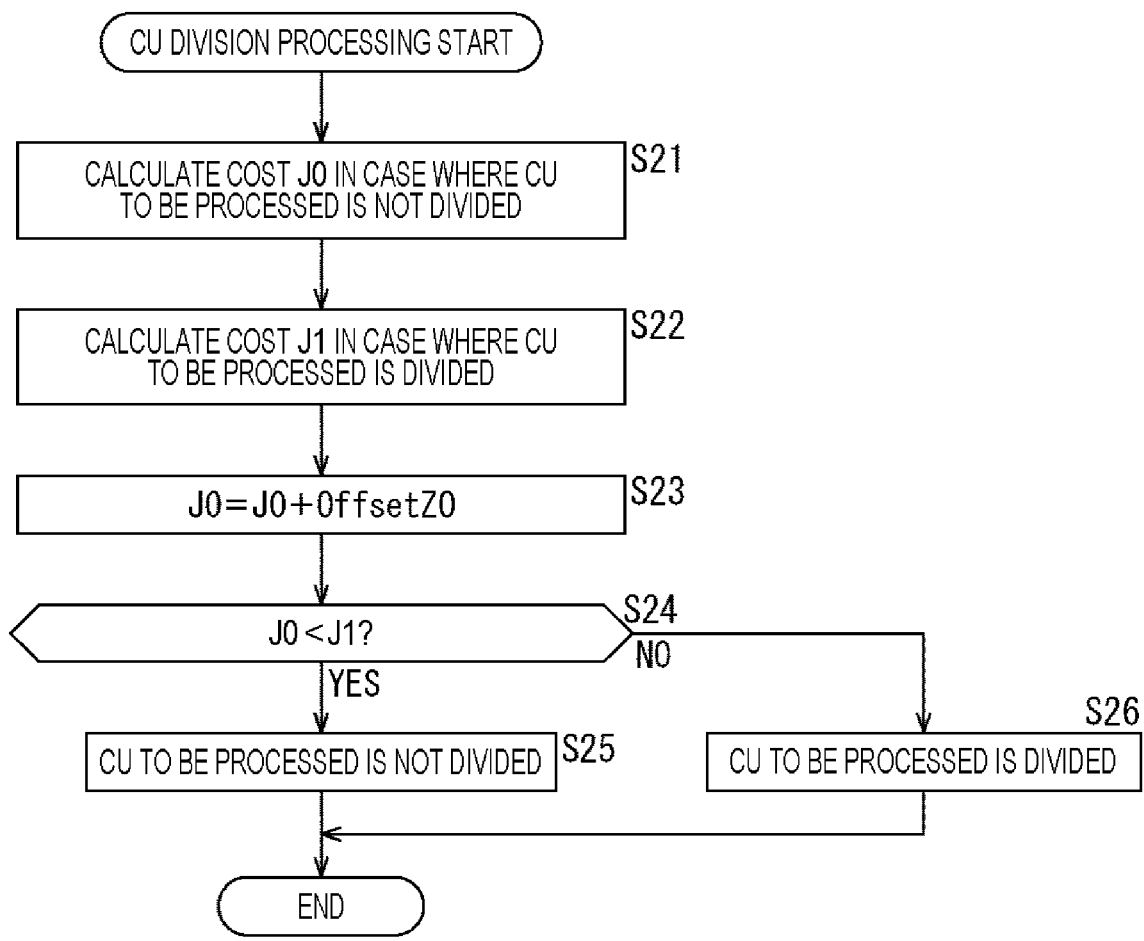
FIG. 9 is a flowchart illustrating an example of a flow of CU division processing.

Note that, a method of suppressing ZeroOut by adding a uniform offset to the cost of the CU to which ZeroOut is applied to facilitate division has also been considered. In this case, for example, setting of the CU division is performed in a flow as illustrated in a flowchart in FIG. 9. That is, the encoder first calculates the cost J0 in a case where the CU to be processed is not divided (step S21), and then calculates the cost J1 in a case where the CU to be processed is divided (step S22).

Next, the encoder adds a predetermined offset (OffsetZ0) to the cost J0 (step S23).

Then, the encoder compares the cost J0 with the cost J1, and determines whether or not the cost J1 is larger than the cost J0 (J0<J1) (step S24). In a case where it is determined that the cost J1 is larger than the cost J0, the encoder does not divide the CU to be processed (step S25). In a case where it is determined that the cost J1 is not larger than the cost J0, the encoder divides the CU to be processed (step S26).

In this case, since the offset is always added, the CU division (ZeroOut is not applied) is likely to be selected regardless of the image. Therefore, for example, there has been a possibility that the application of ZeroOut is suppressed also in an image in which the influence on the coding distortion is small (for example, a flat portion and the like) even if ZeroOut is applied. Therefore, there has been a possibility that the code amount increases, and the coding efficiency is deteriorated.

2. CU SETTING IN CONSIDERATION OF INFLUENCE ON SUBJECTIVE IMAGE QUALITY BY ZEROOUT APPLICATION

Therefore, a device that sets the CU (CU size) sets the CU (CU size) by controlling the CU division on the basis of the cost regarding the code amount and the influence on the subjective image quality of the decoded image by ZeroOut application.

First, the device derives the cost regarding the code amount for each of before and after the CU division. That is, the device derives the cost J0 and the cost J1 on the basis of an amount of data to be coded (data amount of prediction residual) and the code amount of the header without taking the coding distortion into consideration (without using the reconstructed image), for example, as in Expression (2) described above. Then, the device sets whether or not to divide the CU on the basis of the derived cost. The device sets the size of each CU by recursively repeating such CU division setting on the divided CU.

Note that, in a case where the CU size before the division is the size to which ZeroOut is applied and the CU size after the division is the size to which ZeroOut is not applied, the device performs the processing as follows. That is, the device corrects the derived cost (that is, the cost in a case of applying ZeroOut) before the CU division on the basis of the influence on the subjective image quality of the decoded image by applying ZeroOut, and sets whether or not to divide the CU using the corrected cost.

This decoded image is the image obtained by coding the image to be coded (original image) and decoding the obtained coded data, and is also referred to as the reconstructed image.

By doing so, the device can set the CU (CU size) in consideration of not only the code amount but also the influence on the subjective image quality by applying ZeroOut. Therefore, by performing the image coding using the set CU, the encoder can suppress the reduction in subjective image quality while suppressing the reduction in coding efficiency.

Furthermore, since the device can set the CU (CU size) without using the reconstructed image, an increase in processing time can be suppressed. Therefore, for example, this can also be applied to real time encoding.

2-1. Cost Correction Based on Image

In the cost correction described above, for example, it is possible to estimate the influence on the subjective image quality by applying ZeroOut on the basis of the image to be coded as in "Method 1" illustrated in an uppermost row of a table in FIG. 10, and correct the cost on the basis of an estimation result (that is, control whether or not to divide).

For example, in the information processing method, it is possible to estimate, on the basis of the image, the influence on the subjective image quality of the decoded image by applying ZeroOut to the quantization coefficients corresponding to the image when coding the image, and control the division of the block on the basis of the estimated influence when setting the size of the block serving as a unit of processing in the coding of the image.

Furthermore, for example, the information processing device may be provided with an estimation unit that estimates, on the basis of the image, the influence on the subjective image quality of the decoded image by applying ZeroOut to the quantization coefficients corresponding to the image when coding the image, and a control unit that controls the division of the block on the basis of the influence estimated by the estimation unit when setting the size of the block serving as the unit of processing in the coding of the image.

Here, the "image" used for estimating the influence may include the pixel values of the original image to be coded, or may include information obtained by using the original image in coding processing, such as the prediction residuals or the transform coefficients, for example. By estimating the influence on the basis of the image to be coded, the influence can be estimated more correctly. Therefore, it is possible to further suppress the reduction in subjective image quality while further suppressing the reduction in coding efficiency.

Furthermore, the estimation of the influence may be performed without using the reconstructed image (decoded image). By doing so, the influence may be estimated without requiring the reconstructed image, so that the increase in processing time can be suppressed. Therefore, for example, this can also be applied to real time encoding.

2-1-1. Influence Estimation Method

Note that, an estimation method of the influence is any method. An example of the estimation method will be described below.

2-1-1-1. Method 1-1

For example, as in "Method 1-1" illustrated in a second row from the top of the table in FIG. 10, the influence may be estimated on the basis of a statistic of data regarding the image. By doing so, the influence can be more correctly estimated.

This statistic may be any statistic. For example, this may be variance, may be another statistic, or may include a plurality of parameters.

For example, the variance of the pixel values of the original image may be included in the statistic. It may be considered that the larger the variance of the pixel values, the larger the number of high-frequency components. As described above, the larger the number of high-frequency components, the larger the influence on the subjective image quality of the decoded image by applying ZeroOut. Therefore, by estimating the above-described influence on the basis of the variance of the pixel values of the original image, it is possible to more correctly estimate the influence on the subjective image quality of the decoded image by applying ZeroOut.

For example, the variance of the prediction residuals may be included in the statistic. The original image is transformed into the prediction residuals, the difference between the original image and the prediction image of the original image, at the time of coding. In general, prediction accuracy tends to be reduced in the high texture region including many high-frequency components. Therefore, the variance of the prediction residuals tends to be large. That is, similarly to a case of the original image, it can be considered that the larger the variance of the prediction residuals, the larger the number of high-frequency components. Therefore, by estimating the above-described influence on the basis of the variance of the prediction residuals, it is possible to more correctly estimate the influence on the subjective image quality of the decoded image by applying ZeroOut.

The influence that is estimated (also referred to as estimated influence) may be any parameter. For example, the above-described statistic (for example, variance of pixel values of the original image, variance of prediction residuals and the like) may be made the estimated influence. In that case, it is possible to control the CU division according to a value of the statistic.

2-1-1-1-1. Method 1-1-1

Furthermore, the statistic described above may be compared with a threshold, and a comparison result may be made the estimated influence. That is, as in "Method 1-1-1" illustrated in a third row from the top of the table in FIG. 10, for example, magnitude of the influence may be determined using the threshold. That is, by comparing the estimated influence with a predetermined threshold, it may be determined whether or not the influence is large, and the division of the block may be controlled on the basis of a result of the determination. In that case, control of the CU division based on the comparison result (whether or not the influence is large) becomes possible.

Note that, this threshold may be any value. For example, a predetermined fixed value determined in advance may be made the threshold. Furthermore, a value derived by a monotonically increasing function for a quantization parameter may be made the threshold. Generally, as the quantization parameter increases, the high-frequency components decreases, and the influence on the subjective image quality of the decoded image by applying ZeroOut decreases. In other words, the larger the quantization parameter, the larger the variance of the original image (or prediction image) having the same degree of influence. Therefore, by setting the threshold for determining whether or not the influence is large to a value derived by the monotonically increasing function for the quantization parameter, a determination result that does not depend on the magnitude of the quantization parameter can be obtained.

2-1-1-2. Method 1-2

For example, as in "Method 1-2" illustrated in a fourth row from the top of the table in FIG. 10, the influence may be estimated on the basis of a spatial feature amount of the image (original image). The spatial feature amount may be any amount as long as spatial (planar) correlation of the image is indicated.

For example, an original image 101 in FIG. 11 is an example of pixel values of the original image of the CU to be processed. When these pixel values are sorted in order of size, an original image 102 in FIG. 12 is obtained. The original images 101 and 102 are obtained only by sorting the pixel values, so that the variance thereof is the same. However, the pixel values of the original image 102 change more gently than those of the original image 101. That is, the number of high-frequency components is larger, and the influence on the subjective image quality of the decoded image by applying ZeroOut is larger in the original image 101 than in the original image 102.

In a case of "Method 1-2", the influence is estimated on the basis of the spatial feature amount, that is, the spatial correlation of the image (for example, a difference in pixel value between adjacent pixels and the like). Therefore, the amounts of high-frequency components of the original image 101 and the original image 102 can be identified. That is, the influence on the subjective image quality of the decoded image by applying ZeroOut may be more correctly estimated.

For example, the spatial feature amount may include an evaluation value (norm) of data regarding the image by an operation including differentiation. By applying the operation including differentiation, frequency components included in the image can be reflected in the evaluation value. That is, the influence can be estimated on the basis of the frequency components included in the image.

Note that, the operation including differentiation may be any operation. For example, a Laplacian filter used for edge detection and the like may be applied as the operation including differentiation, or total variation, which is a difference absolute value sum of adjacent pixels, may be applied.

For example, an evaluation value of the pixel values of the original image by the operation including differentiation may be included in the spatial feature amount. That is, the pixel values of the original image may be evaluated using the operation including differentiation, and the evaluation value may be made the spatial feature amount of the original image.

Furthermore, an evaluation value of the prediction residuals by the operation including differentiation may be included in the spatial feature amount. That is, it is possible to evaluate the prediction residuals obtained from the original image using the operation including differentiation, and an evaluation value may be made the spatial feature amount of the original image. As described above, in general, the prediction accuracy is deteriorated as the original image contains more high-frequency components, and thus there is a high possibility that the prediction residual contains more high-frequency components. Therefore, also in a case where the prediction residuals are evaluated using the operation including differentiation, an evaluation value similar to that in a case of the original image can be obtained.

In this case also, the estimated influence may be any parameter. For example, the above-described spatial feature amount of the image (for example, the evaluation values of the pixel values of the original image, prediction residuals and the like by the operation including differentiation) may be made the estimated influence. In that case, it is possible to control the CU division according to the value of the spatial feature amount.

2-1-1-2-1. Method 1-2-1

Furthermore, the spatial feature amount of the image described above may be compared with a threshold, and a comparison result may be made the estimated influence. That is, as in "Method 1-2-1" illustrated in a fifth row from the top of the table in FIG. 10, for example, magnitude of the influence may be determined using the threshold. That is, by comparing the estimated influence with a predetermined threshold, it may be determined whether or not the influence is large, and the division of the block may be controlled on the basis of a result of the determination. In that case, control of the CU division based on the comparison result (whether or not the influence is large) becomes possible.

Note that, this threshold may be any value. For example, a predetermined fixed value determined in advance may be made the threshold. Furthermore, a value derived by a monotonically increasing function for a quantization parameter may be made the threshold. By making the threshold a value derived by the monotonically increasing function for the quantization parameter, a determination result that does not depend on the magnitude of the quantization parameter can be obtained similarly to the case of "Method 1-1-1".

2-1-1-3. Method 1-3

For example, as in "Method 1-3" illustrated in a sixth row from the top of the table in FIG. 10, the influence may be estimated on the basis of a frequency feature amount of the image (original image). This frequency feature amount may be any amount as long as the feature regarding the frequency components of the image is indicated.

For example, the frequency feature amount may include a ratio of energy between coefficients transmitted in a case where ZeroOut is applied and coefficients not transmitted of transform coefficients corresponding to the image (original image). For example, the frequency feature amount may include a ratio of energy of the transform coefficients in a block that is not divided (for example, CU).

When ZeroOut is applied, the high-frequency components of the transform coefficients of the CU to be processed are removed. That is, the high-frequency components are transformed into coefficients having a value of "0" (also referred to as zero coefficients). In other words, the high-frequency components are not transmitted (not coded). In contrast, the DC component to a mid-frequency component are left (not transformed into the zero coefficient) and transmitted (coded). For example, in transform coefficients 110 of the CU to be processed illustrated in A of FIG. 13A, coefficients in a Lo region 111 are coefficients transmitted when ZeroOut is applied, and coefficients in a Hi region 112 are coefficients not transmitted when ZeroOut is applied.

That is, the more the coefficients other than zero (also referred to as non-zero coefficients) exist in the Hi region 112, the greater the influence on the subjective image quality of the decoded image by applying ZeroOut. Therefore, the influence can be estimated from a ratio of the number of non-zero coefficients (energy) between the Lo region 111 and the Hi region 112 of the transform coefficients 110.

Note that, some transform coefficients might become the zero coefficients (that is, not transmitted) by quantization. Therefore, as in following Expressions (3) and (4), in each of the Lo region 111 and the Hi region 112, the number of coefficients the quantization coefficient of which is non-zero coefficient is counted, and the counted number is defined as energy.

$$\text{Lo\_NonZero} = countif(Lo > \text{min\_abs\_level}) \qquad (3)$$

$$\text{Hi\_NonZero} = countif(Hi > \text{min\_abs\_level}) \qquad (4)$$

where

Lo_NonZero represents the number of coefficients the quantization coefficient of which is a non-zero coefficient in the Lo region, Hi_NonZero represents the number of coefficients the quantization coefficient of which is a non-zero coefficient in the Hi region, countif(A) represents the number of coefficients satisfying a condition A, Lo represents a value of the coefficients in the Lo region, Hi represents a value of the coefficients in the Hi region, and min_abs_level represents the maximum value of the transform coefficient at which the quantization coefficient is the zero coefficient.

Figure 13B:
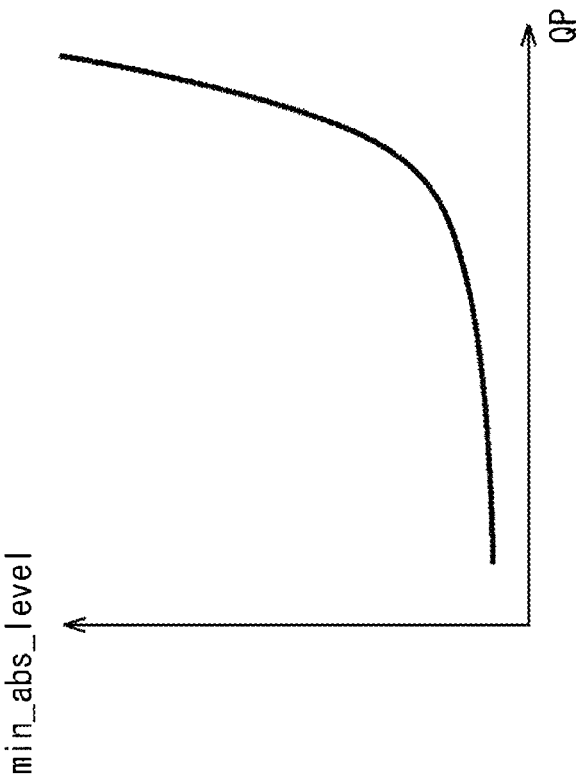
FIGS. 13A and 13B are diagrams illustrating an example of deriving a frequency feature amount.

Note that, min_abs_level depends on a quantization parameter (QP), that is, min_abs_level is derived using any function f(QP) uniquely determined on the basis of the quantization parameter (QP) as illustrated in FIG. 13B (min_abs_level=f(QP)).

Then, as in following Expression (5), a ratio CoefRatio of energy between both regions is derived as the frequency feature amount of the image.

$$\text{CoefRatio} = \text{Hi\_NonZero}/\text{Lo\_NonZero} \qquad (5)$$

The larger this CoefRatio is, the larger the number of coefficients that are not transmitted by applying ZeroOut. That is, this indicates that the influence on the subjective image quality of the decoded image by applying ZeroOut is larger.

As described above, CoefRatio is derived on the basis of the transform coefficient (quantization coefficient). Since the processing of ZeroOut is performed on the quantization coefficient, CoefRatio can more correctly reflect the influence by ZeroOut. Therefore, by using such frequency feature amount of the image, it is possible to more correctly estimate the influence on the subjective image quality of the decoded image by applying ZeroOut.

In this case, the estimated influence may be any parameter. For example, the frequency feature amount (for example, CoefRatio and the like) of the image described above may be made the estimated influence. In that case, it is possible to control CU division according to a value of the frequency feature amount.

Note that, it is described above that the derivation of the frequency feature amount (for example, CoefRatio and the like) is performed in the block that is not divided (for example, CU), but there is no limitation, and the derivation may be performed in a block divided into a size to which ZeroOut is not applied (for example, CU). That is, the frequency feature amount may include a ratio of energy of the transform coefficients in a block (for example, CU) divided into a size to which ZeroOut is not applied.

Figure 13A:
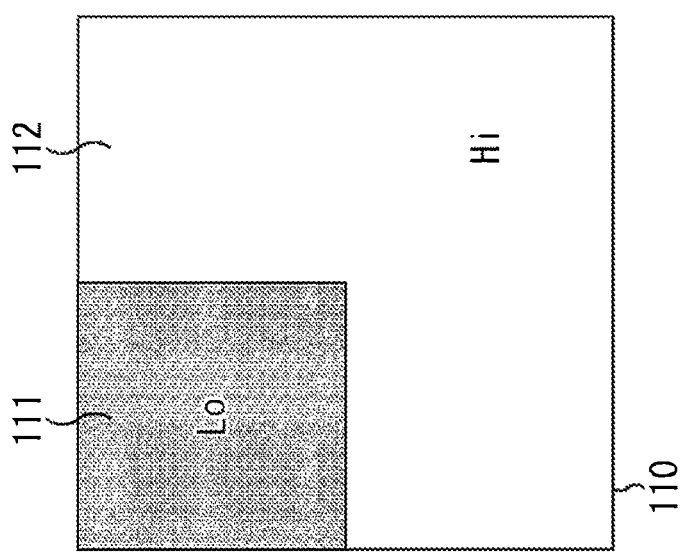

For example, it is assumed that the CU to be processed (CU of the transform coefficients 110) illustrated in FIGS. 13A and 13B are divided into 2×2 as illustrated in FIG. 14. In FIG. 14, a transform coefficient 110A, a transform coefficient 110B, a transform coefficient 110C, and a transform coefficient 110D are transform coefficients obtained in the CUs after the division.

Assuming that ZeroOut is applied to these CUs after the division, the Lo region and the Hi region of each CU are assumed. A Lo region 111A is a region in which the coefficients are transmitted when ZeroOut is applied of the transform coefficients 110A, and a Hi region 112A is a region in which the coefficients are not transmitted when ZeroOut is applied of the transform coefficients 110A. Similarly, a Lo region 111B is a region in which the coefficients are transmitted when ZeroOut is applied of the transform coefficients 110B, and a Hi region 112B is a region in which the coefficients are not transmitted when ZeroOut is applied of the transform coefficients 110B. Furthermore, a Lo region 111C is a region in which the coefficients are transmitted when ZeroOut is applied of the transform coefficients 110C, and a Hi region 112C is a region in which the coefficients are not transmitted when ZeroOut is applied of the transform coefficients 110C. Moreover, a Lo region 111D is a region in which the coefficients are transmitted when ZeroOut is applied of the transform coefficients 110D, and a Hi region 112D is a region in which the coefficients are not transmitted when ZeroOut is applied of the transform coefficients 110D.

In each of such regions, the number of coefficients (Lo_NonZero or Hi_NonZero) the quantization coefficient of which is the non-zero coefficient may be counted, the sum of Lo_NonZero and the sum of Hi_NonZero may be derived, and the ratio CoefRatio between them may be derived.

That is, a ratio of the sum of Lo_NonZero of the Lo region 111A, the Lo region 111B, the Lo region 111C, and the Lo region 111D to the sum of Hi_NonZero of the Hi region 112A, the Hi region 112B, the Hi region 112C, and the Hi region 112D may be set as CoefRatio.

Since a range of the CU from which the transform coefficient is derived is different between the case of the CU before the division (FIGS. 13A and 13B) and the case of the CU after the division (FIG. 14), there is no guarantee that CoefRatio is the same. However, since both are transform coefficients of partial regions (CU to be processed before division) in the same range, a certain degree of correlation is maintained. Therefore, also in a case of the CU after the division, the frequency feature amount similar to that in the case of the CU before the division can be obtained.

Note that, in general, in a case where ZeroOut is applied, it is assumed that a method of not calculating the high-frequency coefficients from the beginning at the time of rectification is taken in place of including the high-frequency coefficients and dropping the high-frequency coefficients after the rectification. By deriving the frequency feature amount on the basis of the transform coefficient of the CU (Sub-CU) after the division to which ZeroOut is not applied, it is possible to suppress an increase in processing amount of the rectification.

Note that, when deriving the frequency feature amount as described above, Sub-Cu of which information is used with respect to the size of the CU to be processed to which ZeroOut is applied is optional. For example, the information of Sub-Cu the number of divisions of which from the CU to be processed is the smallest, the Sub-Cu having a size to which ZeroOut is not applied after the division may be used.

For example, in a case where the size of the CU to be processed is 64×64 as illustrated in FIG. 15A, it is possible to derive the frequency feature amount (for example, CoefRatio and the like) by using information of four Sub-Cus of 32×32 as illustrated in FIG. 15B. Furthermore, in a case where the size of the CU to be processed is 64×32 as illustrated in FIG. 15C, it is possible to derive the frequency feature amount (for example, CoefRatio and the like) by using information of two Sub-Cus of 32×32 as illustrated in FIG. 15D. Moreover, in a case where the size of the CU to be processed is 64×16 as illustrated in FIG. 15E, it is possible to derive the frequency feature amount (for example, CoefRatio and the like) by using information of two Sub-Cus of 32×16 as illustrated in FIG. 15E.

Furthermore, in a case where the size of the CU to be processed is 64×8 as illustrated in FIG. 15G, it is possible to derive the frequency feature amount (for example, CoefRatio and the like) by using information of two Sub-Cus of 32×8 as illustrated in FIG. 15H. Moreover, in a case where the size of the CU to be processed is 64×4 as illustrated in FIG. 15I, it is possible to derive the frequency feature amount (for example, CoefRatio and the like) by using information of two Sub-Cus of 32×4 as illustrated in FIG. 15J.

2-1-1-3-1. Method 1-3-1

Furthermore, the frequency feature amount of the image described above may be compared with a threshold, and a comparison result may be made the estimated influence. That is, as in "Method 1-3-1" illustrated in a seventh row from the top of the table in FIG. 10, for example, magnitude of the influence may be determined using the threshold. That is, by comparing the estimated influence with a predetermined threshold, it may be determined whether or not the influence is large, and the division of the block may be controlled on the basis of a result of the determination. In that case, control of the CU division based on the comparison result (whether or not the influence is large) becomes possible.

Note that, the threshold may be any value. For example, in a case where the threshold is "0", if energy remains in the Hi region (there is at least one transform coefficient the quantization coefficient of which is the non-zero coefficient), it is determined that the influence is large. Furthermore, in a case where the threshold is "1", it is determined that the influence is large if the energy in the Hi region is equal to or larger than the energy in the Lo region (the number of transform coefficients the quantization coefficient of which is non-zero coefficient is larger in the Hi region).

2-1-1-4. Application Example

A plurality of methods of the above-described "Method 1-1" (also including "Method 1-1-1"), "Method 1-2" (also including "Method 1-2-1"), and "Method 1-3" (also including "Method 1-3-1") can be applied in any combination.

For example, the influence may be estimated by a plurality of methods (or the estimated influence may be compared with the threshold), and the CU division control may be performed on the basis of the estimated influence (or the comparison result) of each method.

For example, the influence may be estimated by a plurality of methods (or the estimated influence may be compared with the threshold), the estimated influences (or comparison results) of the respective methods may be integrated, and the CU division control may be performed on the basis of an integration result.

For example, the influence may be estimated by a plurality of methods (or the estimated influence may be compared with the threshold), and the estimated influence to be applied (or the comparison result) may be selected on the basis of any condition out of the estimated influences (or comparison results) of the respective methods.

Furthermore, the threshold in a case where the estimated influence is compared with the threshold may be a plurality of thresholds. That is, the magnitude of the influence may be determined at a plurality of levels, and the CU division control may be performed according to the determined level.

In this case, in threshold determination at each level, "Method 1-1" (also including "Method 1-1-1"), "Method 1-2" (also including "Method 1-2-1"), and "Method 1-3" (also including "Method 1-3-1") may be appropriately combined to be applied as described above.

2-1-2. Correction Processing Method

The method of controlling the division of the block on the basis of the estimated influence described above in <2-1. Cost Correction Based on Image> is any method. An example of the control method will be described below.

2-1-2-1. Method 1-4

For example, in a case where the influence on the subjective image quality of the decoded image by applying ZeroOut is large as in "Method 1-4" illustrated in an eighth row from the top of the table in FIG. 10, a predetermined offset value may be added to a cost in a case where the block is not divided. This offset value is a fixed value (positive value) determined in advance.

For example, in a case where it is applied to "Method 1-1-1", "Method 1-2-1", or "Method 1-3-1" (or a combination of a plurality of methods including any one of them) described above, and it is determined that the influence on the subjective image quality of the decoded image by applying ZeroOut is large as a result of the threshold determination, it is possible to add a predetermined offset value to the cost in a case where the block is not divided.

By adding the offset value, the cost in a case where the block is not divided increases, so that it tends to control to divide the block. That is, in a case where the influence on the subjective image quality of the decoded image is large, application of ZeroOut is suppressed. In other words, in a case where the influence on the subjective image quality of the decoded image is not large, application of ZeroOut is not suppressed. Therefore, it is possible to further suppress the reduction in subjective image quality while further suppressing the reduction in coding efficiency.

2-1-2-2. Method 1-5

For example, in a case where the influence on the subjective image quality of the decoded image by applying ZeroOut is large as in "Method 1-5" illustrated in a ninth row from the top of the table in FIG. 10, the division of the block (for example, CU and the like) may be forced. In other words, in a case where the influence on the subjective image quality of the decoded image by applying ZeroOut is large, the application of ZeroOut may be prohibited.

For example, in a case where it is applied to "Method 1-1-1", "Method 1-2-1", or "Method 1-3-1" (or a combination of a plurality of methods including any one of them) described above, and it is determined that the influence on the subjective image quality of the decoded image by applying ZeroOut is large as a result of the threshold determination, the division of the block may be forced.

By controlling in this manner, in a case where the influence on the subjective image quality of the decoded image is large, the application of ZeroOut is prohibited (the division of the block is forced). In other words, in a case where the influence on the subjective image quality of the decoded image is not large, the application of ZeroOut is not prohibited (the division of block is not forced). Therefore, it is possible to further suppress the reduction in subjective image quality while further suppressing the reduction in coding efficiency.

Note that, "Method 1-5" is equivalent to adding such an offset value that the cost becomes a sufficiently large value (for example, maximum) in "Method 1-4". That is, "Method 1-5" can also be implemented by addition of the offset value (cost correction).

2-1-2-3. Method 1-6

For example, an offset value corresponding to the estimated influence may be added to the cost in a case where the block is not divided as in "Method 1-6" illustrated in a tenth row from the top of the table in FIG. 10. That is, a variable offset value (positive value) is added.

For example, it is possible to apply to "Method 1-1", "Method 1-2", or "Method 1-3" (or a combination of a plurality of methods including any one of them) described above, and add the offset value corresponding to magnitude of the derived estimated influence (for example, the static of the image, the spatial feature amount of the image, or the frequency feature amount of the image) to the cost in a case where the block is not divided.

By adding the offset value, the cost in a case where the block is not divided increases, so that it tends to control to divide the block. The larger the offset value is, the more it tends to control to divide the block. That is, the block division is controlled with a degree corresponding to the magnitude of the influence on the subjective image quality of the decoded image by applying ZeroOut. Therefore, it is possible to further suppress the reduction in subjective image quality while further suppressing the reduction in coding efficiency.

2-1-2-4. Application Example

Each correction processing method described above in <2-1-2. Correction Processing Method> to <2-1-2-3. Method 1-6> (for example, "Method 1-4", "Method 1-5", "Method 1-6" or a combination of a plurality of methods including any one of them) can be applied in combination with each correction processing method described above in <2-1-1. Influence Estimation Method> to <2-1-1-4. Application Example> (for example, "Method 1-1" (also including "Method 1-1-1"), "Method 1-2" (also including "Method 1-2-1"), "Method 1-3" (also including "Method 1-3-1"), or a combination of a plurality of methods including any one of them).

Furthermore, a plurality of methods of "Method 1-4", "Method 1-5", and "Method 1-6" described above can be optionally combined to apply. For example, a plurality of correction methods (control methods of CU division) may be integrated, or a correction method to be applied (control method of CU division) may be selected on the basis of any condition.

For example, in a case where the influence is estimated by a plurality of methods, it is possible to set an offset value for each method and add the same to the cost.

For example, the magnitude of the influence may be determined at a plurality of levels, and an offset value corresponding to each level may be added to the cost.

Furthermore, cost correction (control of CU division) may be performed by a method different for each level, such as adding an offset value at a small level and prohibiting the application of ZeroOut at a large level.

2-2. Cost Correction Based on Scaling List

Furthermore, in the cost correction, it is possible to estimate the influence on the subjective image quality by applying ZeroOut on the basis of a scaling list as in "Method 2" illustrated in an eleventh row from the top of the table in FIG. 10, for example, and correct the cost on the basis of the estimation result (that is, control whether or not to divide).

For example, in the information processing method, it is possible to estimate the influence on the subjective image quality of the decoded image by applying ZeroOut to the quantization coefficients corresponding to the image when coding the image on the basis of the scaling list, and control the division of the block on the basis of the estimated influence when setting the size of the block serving as a unit of processing in the coding of the image.

Furthermore, for example, an information processing device may be provided with an estimation unit that estimates the influence on the subjective image quality of the decoded image by applying ZeroOut to the quantization coefficients corresponding to the image when coding the image on the basis of the scaling image, and a control unit that controls the division of the block on the basis of the influence estimated by the estimation unit when setting the size of the block serving as the unit of processing in the coding of the image.

In a case where a general scene is encoded, a method is used in which inclination is given by the scaling list, and emphasis is placed on a low-frequency range and emphasis is not placed on a high-frequency range. A default scaling list also has such a configuration.

In a scene containing a large amount of noise such as a film grain, a scaling list for protecting the mid-frequency range to the high-frequency range may be applied. In this case, when ZeroOut is applied, the high-frequency range is removed, and there is a possibility that intended control cannot be performed. That is, there is a possibility that the influence on the subjective image quality of the decoded image by applying ZeroOut is large. Therefore, in a picture to which the scaling list for protecting the mid-frequency range to high-frequency range is applied, the CU division may be controlled so as to suppress the application of ZeroOut.

In this case, the influence is estimated without using the reconstructed image (decoded image). Therefore, an increase in processing time can be suppressed. Therefore, for example, this can also be applied to real time encoding.

2-2-1. Influence Estimation Method

Note that, an estimation method of the influence is any method. An example of the estimation method will be described below.

2-2-1-1. Method 2-1

For example, the influence may be estimated on the basis of a statistic of list values of a current picture scaling list corresponding to coefficients not transmitted in a case where ZeroOut is applied, as in "Method 2-1" illustrated in a twelfth row from the top of the table in FIG. 10.

Figure 16:
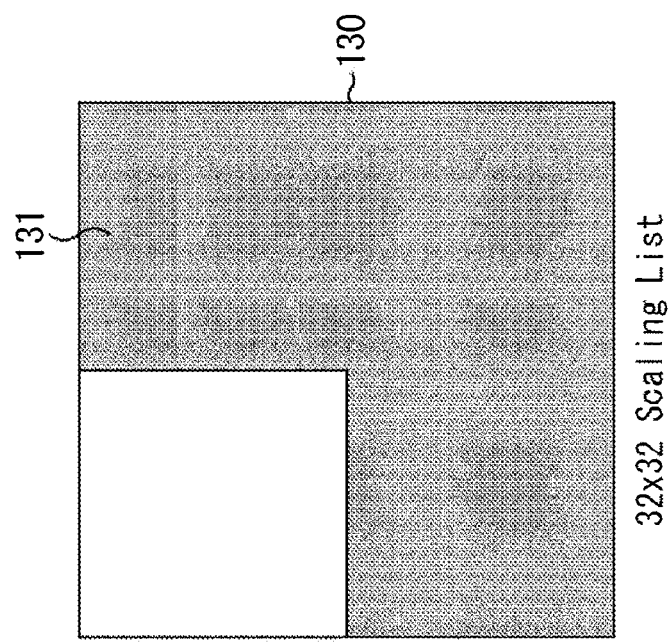
FIG. 16 is a diagram illustrating an example of CU division control on the basis of a scaling list.

For example, list values in a region 131 indicated in gray in the current picture scaling list 130 illustrated in FIG. 16 are list values corresponding to the mid-frequency range to the high-frequency range of the transform coefficients.

In a case where the region 131 corresponds to the Hi region 112 illustrated in FIG. 13A, the list values in the region 131 are list values corresponding to coefficients not transmitted (that is, transformed into zero coefficients) when ZeroOut is applied. Therefore, in a case where the list value in this region 131 is small, it indicates that the picture is set to protect the transform coefficients in the Hi region 112 (also referred to as a ZeroOut region). That is, there is a possibility that the influence on the subjective image quality of the decoded image by applying ZeroOut is large. In other words, in a case where the list value in the region 131 is large, there is a high possibility that the influence on the subjective image quality of the decoded image by applying ZeroOut Therefore, as described above, the influence can be estimated more correctly by estimating the influence on the basis of the statistic of the list values of the current picture scaling list.

This statistic may be any value. For example, this may be an average value of the list values corresponding to the ZeroOut region of the current picture scaling list, other statistics, or include a plurality of parameters.

The estimated influence in this case may be any parameter. For example, the statistic described above (for example, an average value of the list values corresponding to the ZeroOut region of the current picture scaling list or the like) may be made the estimated influence. Furthermore, an average value of difference values between the list value corresponding to the ZeroOut region of the current picture scaling list and the list value corresponding to the ZeroOut region of the default scaling list may be made the estimated influence. In a case where the statistic is made the estimated influence in this manner, it is possible to control the CU division according to the value of the statistic.

2-2-1-1-1. Method 2-1-1

Furthermore, the statistic described above may be compared with a threshold, and a comparison result may be made the estimated influence. That is, for example, the magnitude of the influence may be determined using a threshold ("Method 2-1-1"). That is, by comparing the estimated influence with a predetermined threshold, it may be determined whether or not the influence is large, and the division of the block may be controlled on the basis of a result of the determination. In that case, control of the CU division based on the comparison result (whether or not the influence is large) becomes possible.

In a case of this "Method 2-1-1", the threshold may be any value. For example, the statistic of the list values corresponding to the ZeroOut region of the default scaling list (that is, the list values corresponding to the coefficients not transmitted in a case where ZeroOut is applied) may be made the threshold. For example, an average value of the list values corresponding to the ZeroOut region of the current picture scaling list may be compared with an average value of the list values corresponding to the ZeroOut region of the default scaling list. Then, for example, in a case where the average value of the list values corresponding to the ZeroOut region of the current picture scaling list is smaller than the average value of the list values corresponding to the ZeroOut region of the default scaling list, the CU division may be controlled so that application of ZeroOut is suppressed.

2-2-1-2. Application Example

It is possible to apply "Method 2-1" (including "Method 2-1-1") described above in combination with another method. For example, "Method 2-1" (including "Method 2-1-1") may be applied in combination with the above-described "Method 1-1" (also including "Method 1-1-1"), "Method 1-2" (also including "Method 1-2-1"), or "Method 1-3" (also including "Method 1-3-1"). Furthermore, for example, "Method 2-1" (also including "Method 2-1-1") may be applied in combination with a combination of a plurality of methods of "Method 1-1" (also including "Method 1-1-1"), "Method 1-2" (also including "Method 1-2-1"), or "Method 1-3" (also including "Method 1-3-1").

For example, the influence may be estimated by a plurality of methods (or the estimated influence may be compared with the threshold), and the CU division control may be performed on the basis of the estimated influence (or the comparison result) of each method.

For example, the influence may be estimated by a plurality of methods (or the estimated influence may be compared with the threshold), the estimated influences (or comparison results) of the respective methods may be integrated, and the CU division control may be performed on the basis of an integration result.

For example, the influence may be estimated by a plurality of methods (or the estimated influence may be compared with the threshold), and the estimated influence to be applied (or the comparison result) may be selected on the basis of any condition out of the estimated influences (or comparison results) of the respective methods.

Furthermore, the threshold in a case where the estimated influence is compared with the threshold may be a plurality of thresholds. That is, the magnitude of the influence may be determined at a plurality of levels, and the CU division control may be performed according to the determined level.

In this case, in threshold determination at each level, "Method 1-1" (also including "Method 1-1-1"), "Method 1-2" (also including "Method 1-2-1"), "Method 1-3" (also including "Method 1-3-1"), and "Method 2-1" (also including "Method 2-1-1") may be appropriately combined to be applied as described above.

2-2-2. Correction Processing Method

The method of controlling the division of the block on the basis of the estimated influence described above in <2-2. Cost Correction Based on Scaling List> is any method. An example of the control method will be described below.

2-2-2-1. Method 2-2

For example, in a case where the influence on the subjective image quality of the decoded image by applying ZeroOut is large as in "Method 2-2" illustrated in a thirteenth row from the top of the table in FIG. 10, a predetermined offset value may be added to the cost in a case where the block is not divided. This offset value is a fixed value (positive value) determined in advance.

For example, in a case where it is applied to "Method 2-1-1" (or a combination of a plurality of methods including "Method 2-1-1") described above, and it is determined that the influence on the subjective image quality of the decoded image by applying ZeroOut is large as a result of the threshold determination, it is possible to add a predetermined offset value to the cost in a case where the block is not divided.

By doing so, it is possible to further suppress the reduction in subjective image quality while further suppressing the reduction in coding efficiency similarly to a case of "Method 1-4".

2-2-2-2. Method 2-3

For example, in a case where the influence on the subjective image quality of the decoded image by applying ZeroOut is large as in "Method 2-3" illustrated in a fourteenth row from the top of the table in FIG. 10, the division of the block (for example, CU and the like) may be forced. In other words, in a case where the influence on the subjective image quality of the decoded image by applying ZeroOut is large, the application of ZeroOut may be prohibited.

For example, in a case where it is applied to "Method 2-1-1" (or a combination of a plurality of methods including "Method 2-1-1") described above, and it is determined that the influence on the subjective image quality of the decoded image by applying ZeroOut is large as a result of the threshold determination, the division of the block may be forced.

By doing so, it is possible to further suppress the reduction in subjective image quality while further suppressing the reduction in coding efficiency similarly to a case of "Method 1-5".

Note that, "Method 2-3" is equivalent to adding such an offset value that the cost becomes a sufficiently large value (for example, maximum) in "Method 2-2". That is, "Method 2-3" can also be implemented by addition of the offset value (cost correction).

2-2-2-3. Method 2-4

For example, an offset value corresponding to the estimated influence may be added to the cost in a case where the block is not divided as in "Method 2-4" illustrated in a lowermost row of the table in FIG. 10. That is, a variable offset value (positive value) is added.

For example, it is possible to apply to "Method 2-1" described above (or a combination of a plurality of methods including "Method 2-1"), and add the offset value corresponding to magnitude of the derived estimated influence (for example, the statistic of the list values corresponding to the ZeroOut region of the scaling list) to the cost in a case where the block is not divided.

By doing so, it is possible to further suppress the reduction in subjective image quality while further suppressing the reduction in coding efficiency similarly to a case of "Method 1-6".

2-2-2-4. Application Example

Each correction processing method described above in <2-2-2. Correction Processing Method> to <2-1-2-3. Method 2-4> (for example, "Method 2-2", "Method 2-3", "Method 2-4", or a combination of a plurality of methods including any one of them) can be applied in combination with each correction processing method described above in <2-1-1. Influence Estimation Method> to <2-2-1-2. Application Example> (for example, a combination of a plurality of methods including "Method 2-1" (also including "Method 2-1-1") or "Method 2-1" (also including "Method 2-1-1").

Furthermore, a plurality of methods of "Method 2-2", "Method 2-3", and "Method 2-4" described above can be optionally combined to apply. For example, a plurality of correction methods (control methods of CU division) may be integrated, or a correction method to be applied (control method of CU division) may be selected on the basis of any condition.

For example, in a case where the influence is estimated by a plurality of methods, it is possible to set an offset value for each method and add the same to the cost.

For example, the magnitude of the influence may be determined at a plurality of levels, and an offset value corresponding to each level may be added to the cost. Furthermore, cost correction (control of CU division) may be performed by a method different for each level, such as adding an offset value at a small level and prohibiting the application of ZeroOut at a large level.

3. First Embodiment

Next, an embodiment to which the present technology described above is applied will be described. In this embodiment, an embodiment of applying the present technology (for example, including each method of "Method 1" to "Method 1-6" illustrated in the table in FIG. 10) described above in <2. CU Setting in Consideration of Influence on Subjective Image Quality by ZeroOut Application> (especially, <2-1. Cost Correction Based on Image> to <2-1-2-4. Application Example>) will be described.

3-1. CU Setting Device

Figure 17:
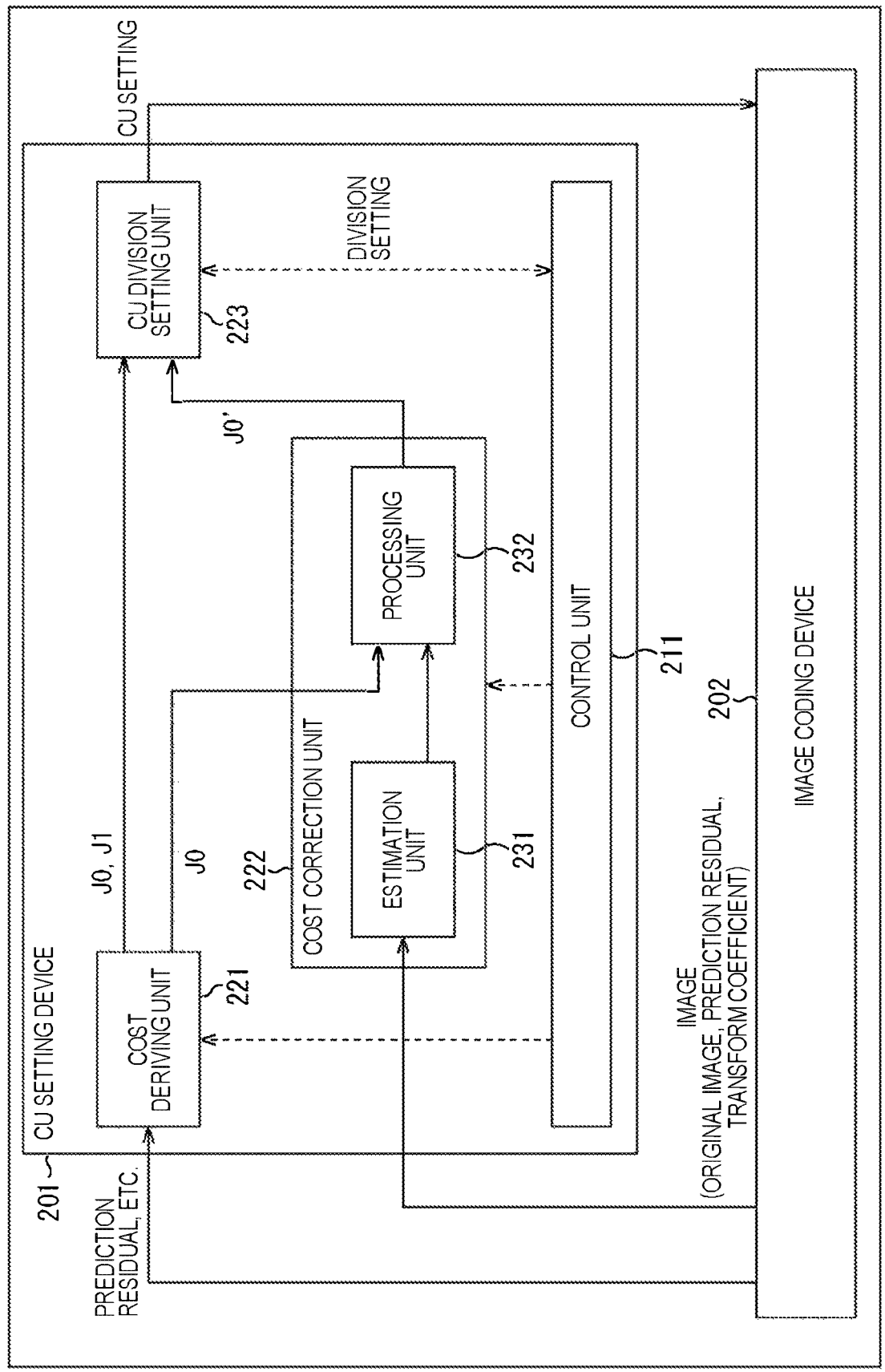
FIG. 17 is a block diagram illustrating a principal configuration example of a CU setting device.

FIG. 17 is a block diagram illustrating an example of a configuration of a CU setting device as an aspect of an information processing device to which the present technology is applied. A CU setting device 201 illustrated in FIG. 17 is a device that sets a configuration of a CU applied in an image coding device 202 that codes image data of a moving image.

The image coding device 202 is a device that codes the image data of the moving image using a CU (block) set by the CU setting device 201 as a unit of processing. A coding scheme applied by the image coding device 202 may be any coding scheme as long as the coding scheme does not contradict that of the CU setting device 201 (for example, a scheme of deriving a prediction residual from an original image using the CU as the unit of processing, performing coefficient transform on the prediction residual, and performing lossless coding on a transform coefficient (or a quantization coefficient)). For example, the image coding device 202 codes the image data of the moving image by a coding scheme disclosed in any one of above-mentioned Non-Patent Documents, a coding scheme compliant with the coding scheme or the like.

Note that, in FIG. 17, main processing units (blocks), data flows and the like are illustrated, and those illustrated in FIG. 17 are not necessarily all. That is, in the CU setting device 201 and the image coding device 202, a processing unit not illustrated as a block in FIG. 17 may exist, and processing or data flow not illustrated as an arrow and the like in FIG. 17 may exist.

As illustrated in FIG. 17, the CU setting device 201 includes a control unit 211, a cost deriving unit 221, a cost correction unit 222, and a CU division setting unit 223.

The control unit 211 controls the cost deriving unit 221, the cost correction unit 222, the CU division setting unit 223, and the image coding device 202, and executes control regarding setting of the CU. For example, the control unit 211 controls the cost deriving unit 221 and the CU division setting unit 223 to execute setting as to whether or not to divide the CU on the basis of a cost J (J0, J1). At that time, the control unit 211 controls the image coding device 202 to generate information required for deriving the cost J such as the prediction residual of the CU to be processed, for example, and supply the same to the cost deriving unit 221.

Note that, the control unit 211 controls the cost deriving unit 221 and the CU division setting unit 223 to execute the setting as to whether or not to divide the CU for the CU having the maximum size and then recursively execute the setting for the CU after the division.

Furthermore, in a case where the CU size (transformation size) before the division is a size to which ZeroOut is applied and the CU size (transformation size) after the division is a size to which ZeroOut is not applied, the control unit 211 controls the cost correction unit 222 to correct a cost J0 in a case where the CU to be processed is not divided derived by the cost deriving unit 221. At that time, the control unit 211 controls the image coding device 202 to supply an image to be coded to the cost correction unit 222.

The cost deriving unit 221 obtains the information required for deriving the cost J such as the prediction residual of the CU to be processed, for example, supplied from the image coding device 202. The cost deriving unit 221 derives the cost J0 in a case where the CU to be processed is not divided and a cost J1 in a case where the CU to be processed is divided by using the obtained information. At that time, the cost deriving unit 221 derives the cost J0 and the cost J1 without using the reconstructed image (decoded image).

The cost deriving unit 221 supplies the derived cost J0 and cost J1 to the CU division setting unit 223. Note that, in a case where the CU size (transformation size) before the division is the size to which ZeroOut is applied and the CU size (transformation size) after the division is the size to which ZeroOut is not applied, the cost deriving unit 221 supplies the derived cost J0 to the cost correction unit 222 and supplies the derived cost J1 to the CU division setting unit 223.

The cost deriving unit 221 executes these pieces of processing under the control of the control unit 211.

In a case where the CU size (transformation size) before the division is the size to which ZeroOut is applied and the CU size (transformation size) after the division is the size to which ZeroOut is not applied, the cost correction unit 222 obtains the image to be coded supplied from the image coding device 202. Furthermore, the cost correction unit 222 obtains the cost J0 supplied from the cost deriving unit 221. The cost correction unit 222 corrects the obtained cost J0 on the basis of the obtained image to be coded. The cost correction unit 222 supplies a cost J0', which is the cost J0 after the correction, to the CU division setting unit 223.

Note that, the "image" to be coded supplied from the image coding device 202 may include a pixel value of an original image to be coded, or may include information obtained by using the original image in coding processing such as the prediction residual or the transform coefficient.

The cost correction unit 222 executes these pieces of processing under the control of the control unit 211. The cost correction unit 222 corrects the cost J0 by applying the present technology described above in <2. CU Setting in Consideration of Influence on Subjective Image Quality by ZeroOut Application>.

The cost correction unit 222 includes an estimation unit 231 and a processing unit 232. In a case where the CU size (transformation size) before the division is the size to which ZeroOut is applied and the CU size (transformation size) after the division is the size to which ZeroOut is not applied, the estimation unit 231 obtains the image to be coded supplied from the image coding device 202. Furthermore, on the basis of the obtained image to be coded, the estimation unit 231 estimates the influence on the subjective image quality of the decoded image by applying ZeroOut to the quantization coefficients corresponding to the image when coding the image. That is, the estimation unit 231 executes estimation of the influence without using the reconstructed image (decoded image). The estimation unit 231 supplies information indicating an estimation result to the processing unit 232.

The processing unit 232 obtains the information indicating the estimation result of the influence on the subjective image quality of the decoded image by applying ZeroOut supplied from the estimation unit 231. Furthermore, the processing unit 232 obtains the cost J0 in a case of not dividing the CU to be processed supplied from the cost deriving unit 221. The processing unit 232 controls the division of the block by correcting the cost J0 on the basis of the influence estimated by the estimation unit 231 when setting the size of the block serving as the unit of processing in the coding of the image to be coded. The processing unit 232 supplies the cost J0', which is the cost J0 after the correction, to the CU division setting unit 223.

The estimation unit 231 and the processing unit 232 execute these pieces of processing under the control of the control unit 211. The estimation unit 231 and the processing unit 232 estimate the influence on the subjective image quality of the decoded image by applying ZeroOut by applying the present technology (for example, "Method 1" and the like illustrated in the table in FIG. 10) described above in <2-1. Cost Correction Based on Image> and control the division of the block. At that time, the estimation unit 231 and the processing unit 232 can apply the present technology (for example, each method of "Method 1-1" to "Method 1-6" illustrated in the table in FIG. 10 and the like) described above in <2-1-1. Influence Estimation Method> to <2-1-2-4. Application Example>.

The CU division setting unit 223 obtains the costs J0 and J1 supplied from the cost deriving unit 221. Note that, in a case where the CU size (transformation size) before the division is the size to which ZeroOut is applied and the CU size (transformation size) after the division is the size to which ZeroOut is not applied, the CU division setting unit 223 obtains the cost J0' supplied from the cost correction unit 222 in place of obtaining the cost J0 from the cost deriving unit 221. The CU division setting unit 223 sets whether or not to divide the block to be processed (CU to be processed) by using the obtained cost J0 (or cost J0') and cost J1. The CU division setting unit 223 supplies information indicating the division setting to the control unit 211.

The CU division setting unit 223 executes these pieces of processing under the control of the control unit 211.

The control unit 211 obtains and holds the division setting supplied from the CU division setting unit 223. The control unit 211 recursively repeats the setting as to whether or not to divide the CU as described above with respect to the CU after the division, and in a case where the CU division setting is completed for an entire CU to be processed having the maximum size, supplies the CU division setting for the entire CU to be processed having the maximum size to the image coding device 202.

The image coding device 202 obtains the CU division setting supplied from the control unit 211. The image coding device 202 executes the image coding using each CU (CU size) set by the obtained CU division setting as the unit of processing.

3-2. Flow of CU Division Processing

The CU setting device 201 sets whether or not to divide the CU to be processed by executing the CU division processing. An example of a flow of the CU division processing is described with reference to a flowchart in FIG. 18.

When the CU division processing is started, at step S201, the cost deriving unit 221 calculates the cost J0 in a case where the CU to be processed is not divided. The control unit 211 controls the image coding device 202 to supply the information required for calculating the cost J such as the prediction residual, for example, to the cost deriving unit 221. The cost deriving unit 221 derives the cost J0 on the basis of the information. At that time, the cost deriving unit 221 derives the cost J0 without using the reconstructed image. For example, the cost deriving unit 221 derives the cost J0 using Expression (2).

At step S202, the cost deriving unit 221 calculates the cost J1 in a case where the CU to be processed is divided. The cost deriving unit 221 derives the cost J1 on the basis of the information required for calculating the cost J such as the prediction residual, for example, supplied from the image coding device 202. At that time, the cost deriving unit 221 derives the cost J1 without using the reconstructed image. For example, the cost deriving unit 221 derives the cost J1 using Expression (2).

At step S203, the control unit 211 determines whether or not the CU size (transformation size) before the division is the size to which ZeroOut is applied and the CU size (transformation size) after the division is the size to which ZeroOut is not applied. In a case where the CU size (transformation size) before the division is the size to which ZeroOut is applied and the CU size (transformation size) after the division is the size to which ZeroOut is not applied, the processing proceeds to step S204.

At step S204, on the basis of the image to be coded, the estimation unit 231 of the cost correction unit 222 estimates the influence on the subjective image quality of the decoded image by applying ZeroOut to the quantization coefficients corresponding to the image when coding the image. At that time, the estimation unit 231 can apply the present technology (for example, each method of "Method 1-1" to "Method 1-3-1" illustrated in the table in FIG. 10 and the like) described above in <2-1-1. Influence Estimation Method> to <2-1-1-4. Application Example>. Furthermore, the estimation unit 231 may estimate the influence without using the reconstructed image (decoded image). By doing so, the estimation unit 231 can estimate the influence without requiring the reconstructed image, so that this can suppress an increase in processing time. Therefore, for example, the CU division setting (CU size setting) to which the present technology is applied can also be applied to real time encoding.

At step S205, the processing unit 232 of the cost correction unit 222 controls the division of the CU on the basis of the influence estimated at step S204 when setting the size of the block serving as the unit of processing in the coding of the image. At that time, the processing unit 232 can apply the present technology (for example, each method of "Method 1-4" to "Method 1-6" illustrated in the table in FIG. 10 and the like) described above in <2-1-2. Correction Processing Method> to <2-1-2-4. Application Example>.

When the processing at step S205 ends, the processing proceeds to step S206. Furthermore, in a case where it is determined at step S203 that the CU size (transformation size) before the division is not the size to which ZeroOut is applied or the CU size (transformation size) after the division is not the size to which ZeroOut is not applied, the processing proceeds to step S206.

At step S206, the CU division setting unit 223 determines whether or not the application of ZeroOut is not prohibited by the control processing at step S205 and the cost J1 is larger than the cost J0 derived at step S201 (or the cost J0' derived at step S205) (that is, J0<J1). In a case where the application of ZeroOut is not prohibited and it is determined that the cost J1 is larger than the cost J0 (or the cost J0'), the processing proceeds to step S207.

At step S207, the CU division setting unit 223 applies ZeroOut. That is, the CU division setting unit 223 sets so as not to divide the CU to be processed, and supplies information indicating the setting to the control unit 211. When the processing at step S207 ends, the CU division processing ends.

Furthermore, in a case where it is determined at step S206 that the application of ZeroOut is prohibited, or it is determined that the cost J1 is not larger than the cost J0 (or the cost J0'), the processing proceeds to step S208.

At step S208, the CU division setting unit 223 does not apply ZeroOut. That is, the CU division setting unit 223 sets to divide the CU to be processed, and supplies information indicating the setting to the control unit 211. When the processing at step S208 ends, the CU division processing ends.

The control unit 211 causes the CU division processing as described above to be executed for the CU having the maximum size, and further recursively executed for the CU after the division.

By doing so, the CU setting device 201 can set the CU size on the basis of not only the code amount but also the influence on the subjective image quality of the decoded image by applying ZeroOut. Therefore, the image coding device 202 that applies the CU to the image coding may further suppress the reduction in subjective image quality while further suppressing the reduction in coding efficiency.

3-2-1. Flow of Influence Setting Processing

Next, influence estimation processing executed at step S204 is described. A method of estimating the influence is any method. For example, the various methods described above in <2-1-1. Influence Estimation Method> to <2-1-1-4. Application Example> can be applied.

3-2-1-1. Influence Estimation Processing Based on Statistic of Image

For example, as in "Method 1-1", the estimation unit 231 may estimate the influence on the basis of a statistic of data regarding an image. By doing so, the influence can be more correctly estimated.

This statistic may be any statistic. For example, this may be variance, may be another statistic, or may include a plurality of parameters.

3-2-1-1-1. Flow of Influence Estimation Processing Based on Statistic of Original Image For example, the variance of the pixel values of the original image may be included in the statistic. By doing so, it is possible to more correctly estimate the influence on the subjective image quality of the decoded image by applying ZeroOut as described above in <2-1-1-1. Method 1-1>.

Furthermore, for example, the estimation unit 231 may compare the variance of the pixel values of the original image with a threshold and determine the magnitude of the influence using a comparison result as in "Method 1-1-1". In this case, as described above in <2-1-1-1-1. Method 1-1-1>, the control of the CU division based on the comparison result (whether or not the influence is large) becomes possible.

An example of a flow of the influence estimation processing executed at step S204 in FIG. 18 in a case where the influence on the subjective image quality of the decoded image by applying ZeroOut is estimated on the basis of the variance of the pixel values of the original image of the CU to be processed will be described with reference to a flowchart in FIG. 19.

In this case, when the influence estimation processing is started, at step S221, the control unit 211 controls the image coding device 202 to supply the pixel values of the original image of the CU to be processed to the estimation unit 231. Upon obtaining the same, the estimation unit 231 calculates variance Var of the pixel values of the original image of the CU to be processed.

At step S222, the estimation unit 231 compares the variance Var of the pixel values of the original image calculated at step S221 with a threshold.

Note that, this threshold may be any value. For example, a predetermined fixed value determined in advance may be made the threshold. Furthermore, a value derived by a monotonically increasing function for a quantization parameter may be made the threshold. By setting the threshold for determining whether or not the influence is large to the value derived by the monotonically increasing function for the quantization parameter, a determination result that does not depend on the magnitude of the quantization parameter can be obtained as described above in <2-1-1-1-1. Method 1-1-1>.

At step S223, the estimation unit 231 supplies the processing unit 232 with a comparison result between the variance Var of the pixel values of the original image of the CU to be processed and the threshold obtained at step S222 as the estimated influence.

Figure 18:
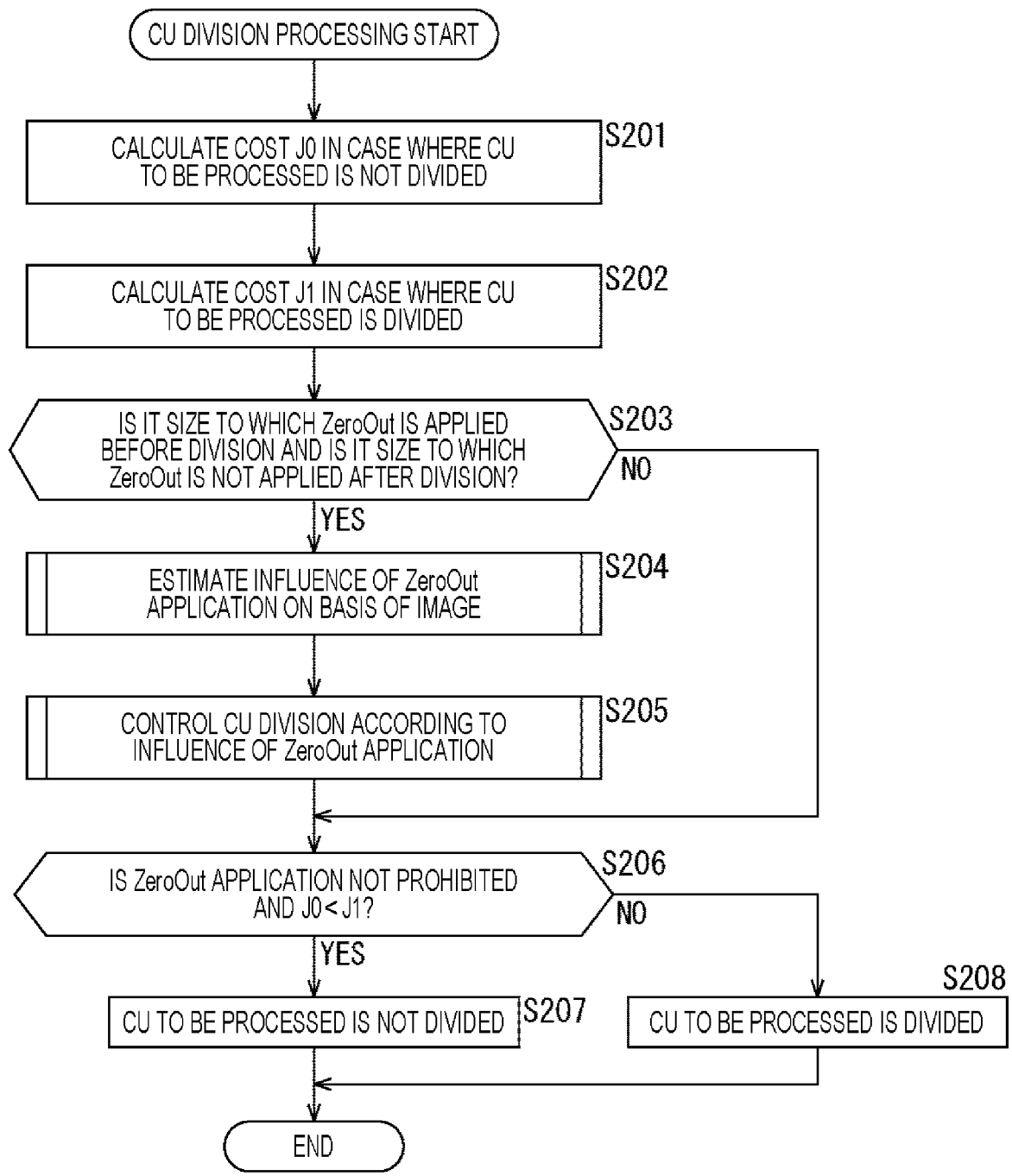
FIG. 18 is a flowchart illustrating an example of a flow of the CU division processing.
Figure 19:
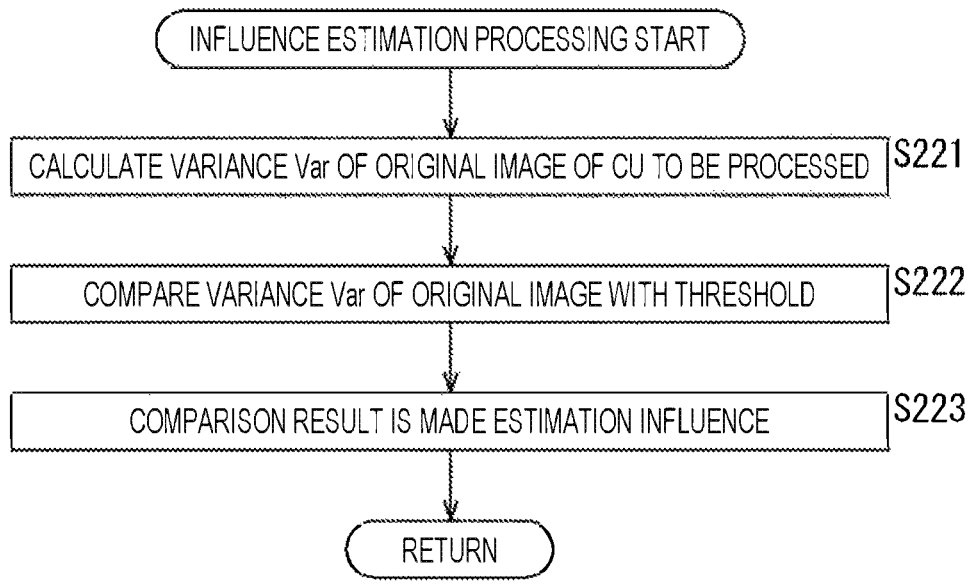
FIG. 19 is a flowchart illustrating an example of a flow of influence estimation processing.

When the processing at step S223 ends, the influence estimation processing ends, and the processing returns to FIG. 18.

Note that, the estimated influence in this case may be any parameter. For example, the above-described statistic (for example, the variance of the pixel values of the original image and the like) may be made the estimated influence. In this case, the magnitude determination of the influence using the threshold as in "Method 1-1-1" can be omitted. For example, step S222 in FIG. 19 may be omitted, and at step S223, the variance Var of the pixel values of the original image of the CU to be processed may be made the influence.

3-2-1-1-2. Flow of Influence Estimation Processing Based on Statistic of Prediction Residual For example, the variance of the prediction residuals may be included in the statistic of the image. By doing so, it is possible to more correctly estimate the influence on the subjective image quality of the decoded image by applying ZeroOut as described above in <2-1-1-1. Method 1-1>.

Furthermore, for example, the estimation unit 231 may compare the variance of the prediction residuals with a threshold and determine the magnitude of the influence using a comparison result as in "Method 1-1-1". In this case, as described above in <2-1-1-1-1. Method 1-1-1>, the control of the CU division based on the comparison result (whether or not the influence is large) becomes possible.

Figure 20:
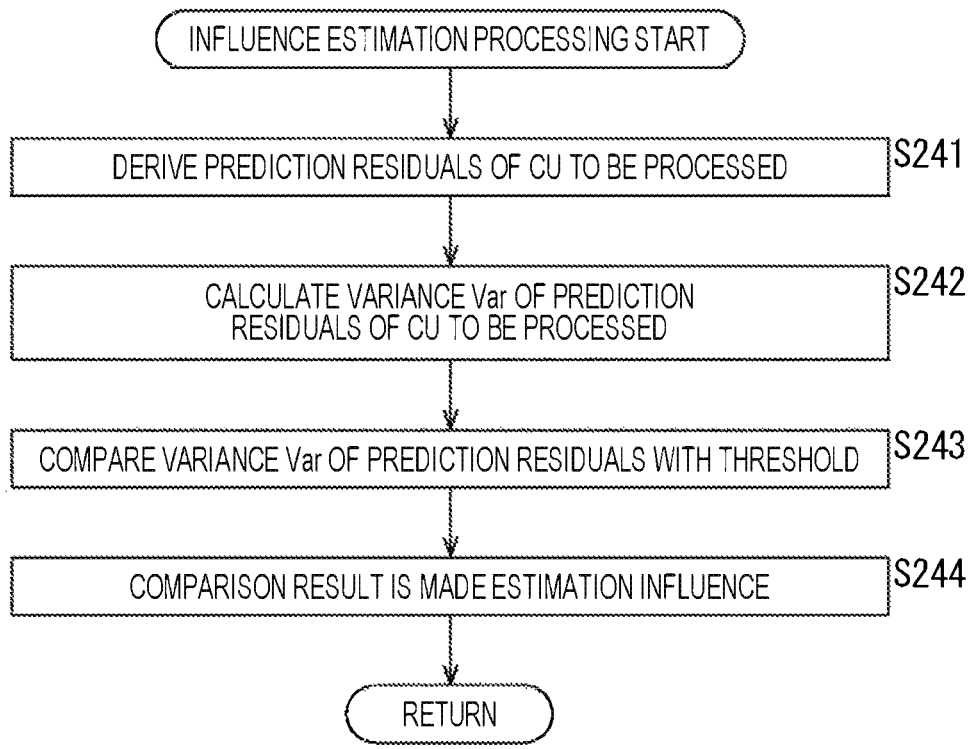
FIG. 20 is a flowchart illustrating an example of a flow of influence estimation processing.

An example of a flow of the influence estimation processing executed at step S204 in FIG. 18 in a case where the influence on the subjective image quality of the decoded image by applying ZeroOut is estimated on the basis of the variance of the prediction residuals of the CU to be processed will be described with reference to a flowchart in FIG. 20.

In this case, when the influence estimation processing is started, at step S241, the control unit 211 controls the image coding device 202 to calculate the difference between the original image of the CU to be processed and the prediction image thereof, and makes the same the prediction residuals. That is, control unit 211 causes image coding device 202 to generate the prediction residuals of the CU to be processed.

At step S242, the control unit 211 supplies the prediction residuals of the CU to be processed derived at step S241 to the estimation unit 231. Upon obtaining the same, the estimation unit 231 calculates the variance Var of the prediction residuals of the CU to be processed.

At step S243, the estimation unit 231 compares the variance Var of the prediction residuals calculated at step S242 with a threshold.

Note that, this threshold may be any value. For example, a predetermined fixed value determined in advance may be made the threshold. Furthermore, a value derived by a monotonically increasing function for a quantization parameter may be made the threshold. By setting the threshold for determining whether or not the influence is large to the value derived by the monotonically increasing function for the quantization parameter, a determination result that does not depend on the magnitude of the quantization parameter can be obtained as described above in <2-1-1-1-1. Method 1-1-1>.

At step S244, the estimation unit 231 supplies the processing unit 232 with a comparison result between the variance Var of the prediction residuals of the CU to be processed and the threshold obtained at step S243 as the estimated influence.

When the processing at step S244 ends, the influence estimation processing ends, and the processing returns to FIG. 18.

Note that, the estimated influence in this case may be any parameter. For example, the above-described statistic (for example, the variance of the prediction residuals and the like) may be made the estimated influence. In this case, the magnitude determination of the influence using the threshold as in "Method 1-1-1" can be omitted. For example, step S243 in FIG. 20 may be omitted, and at step S244, the variance Var of the prediction residuals of the CU to be processed may be made the influence.

3-2-1-2. Influence Estimation Processing Based on Spatial Feature Amount of Image For example, as in "Method 1-2", the estimation unit 231 may estimate the influence on the basis of a spatial feature amount of the image. By doing so, it is possible to more correctly estimate the influence as described above in <2-1-1-2. Method 1-2>.

The spatial feature amount may be any amount as long as spatial (planar) correlation of the image is indicated. For example, the spatial feature amount may include an evaluation value (norm) of data regarding the image by an operation including differentiation. By applying the operation including differentiation, frequency components included in the image can be reflected in the evaluation value. That is, the influence can be estimated on the basis of the frequency components included in the image.

Note that, the operation including differentiation may be any operation. For example, a Laplacian filter used for edge detection and the like may be applied as the operation including differentiation, or total variation, which is a difference absolute value sum of adjacent pixels, may be applied.

3-2-1-2-1. Flow of Influence Estimation Processing Based on Image Feature Amount of Original Image For example, an evaluation value of the pixel values of the original image by the operation including differentiation may be included in the spatial feature amount. For example, a difference absolute value sum of the pixel values of the original image may be made the spatial feature amount of the original image.

Furthermore, for example, the estimation unit 231 may compare the difference absolute value sum of the pixel values of the original image with a threshold and determine the magnitude of the influence using a comparison result as in "Method 1-2-1". In this case, as described above in <2-1-1-2-1. Method 1-2-1>, the control of the CU division based on the comparison result (whether or not the influence is large) becomes possible.

Figure 21:
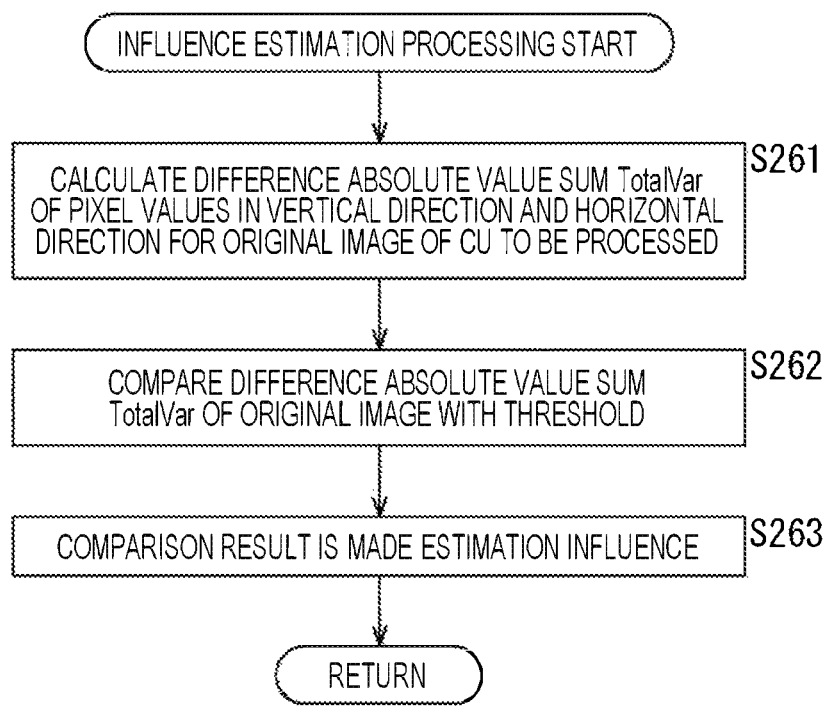
FIG. 21 is a flowchart illustrating an example of a flow of influence estimation processing.

An example of a flow of the influence estimation processing executed at step S204 in FIG. 18 in a case where the influence on the subjective image quality of the decoded image by applying ZeroOut is estimated on the basis of the difference absolute value sum of the pixel values of the original image of the CU to be processed will be described with reference to a flowchart in FIG. 21.

In this case, when the influence estimation processing is started, at step S261, the control unit 211 controls the image coding device 202 to supply the original image of the CU to be processed to the estimation unit 231. When obtaining the original image of the CU to be processed, the estimation unit 231 calculates, for the original image of the CU to be processed, a difference absolute value sum TotalVal of the pixel values in a vertical direction (Y direction) and a horizontal direction (X direction) of the image.

That is, the estimation unit 231 calculates, for each pixel, a difference in pixel value between pixels adjacent in the vertical direction, and calculates a total sum of the differences (difference absolute value sum in the vertical direction) with respect to the original image of the CU to be processed. Similarly, the estimation unit 231 calculates, for each pixel, a difference in pixel value between pixels adjacent in the horizontal direction, and calculates a total sum of the differences (difference absolute value sum in the horizontal direction) with respect to the original image of the CU to be processed. Then, the estimation unit 231 calculates the difference absolute value sum TotalVal of the pixel values of the original image of the CU to be processed by adding the calculated difference absolute value sum in the vertical direction and difference absolute value sum in the horizontal direction.

At step S262, the estimation unit 231 compares the difference absolute value sum TotalVal of the pixel values of the original image of the CU to be processed calculated at step S261 with a threshold.

Note that, this threshold may be any value. For example, a predetermined fixed value determined in advance may be made the threshold. Furthermore, a value derived by a monotonically increasing function for a quantization parameter may be made the threshold. By setting the threshold for determining whether or not the influence is large to the value derived by the monotonically increasing function for the quantization parameter, a determination result that does not depend on the magnitude of the quantization parameter can be obtained as described above in <2-1-1-2-1. Method 1-2-1>.

At step S263, the estimation unit 231 supplies the processing unit 232 with a comparison result between the difference absolute value sum TotalVal and the threshold obtained at step S262 as the estimated influence.

When the processing at step S263 ends, the influence estimation processing ends, and the processing returns to FIG. 18.

Note that, the estimated influence in this case may be any parameter. For example, the above-described statistic (for example, the difference absolute value sum TotalVal of the pixel values of the original image of the CU to be processed and the like) may be made the estimated influence. In this case, the magnitude determination of the influence using the threshold as in "Method 1-2-1" can be omitted. For example, step S262 in FIG. 21 may be omitted, and at step S263, the difference absolute value sum TotalVal of the pixel values of the original image of the CU to be processed may be made the influence.

3-2-1-2-2. Flow of Influence Estimation Processing Based on Image Feature Amount of Prediction Residual For example, an evaluation value of the prediction residuals by the operation including differentiation may be included in the spatial feature amount. For example, a difference absolute value sum of the prediction residuals obtained from the original image may be made the spatial feature amount of the original image.

Furthermore, for example, the estimation unit 231 may compare the difference absolute value sum of the prediction residuals with a threshold and determine the magnitude of the influence using a comparison result as in "Method 1-2-1". In this case, as described above in <2-1-1-2-1. Method 1-2-1>, the control of the CU division based on the comparison result (whether or not the influence is large) becomes possible.

Figure 22:
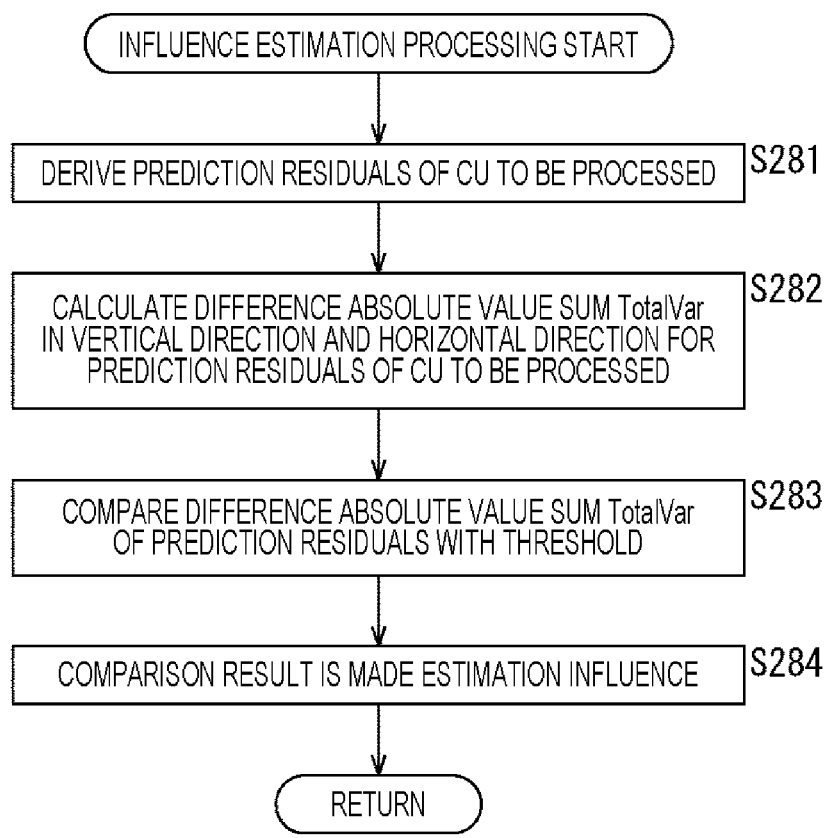
FIG. 22 is a flowchart illustrating an example of a flow of influence estimation processing.

An example of a flow of the influence estimation processing executed at step S204 in FIG. 18 in a case where the influence on the subjective image quality of the decoded image by applying ZeroOut is estimated on the basis of the difference absolute value sum of the prediction residuals of the CU to be processed will be described with reference to a flowchart in FIG. 22.

In this case, when the influence estimation processing is started, at step S281, the control unit 211 controls the image coding device 202 to calculate the difference between the original image of the CU to be processed and the prediction image thereof, and makes the same the prediction residuals.

That is, control unit 211 causes image coding device 202 to generate the prediction residuals of the CU to be processed.

At step S282, the control unit 211 supplies the prediction residuals of the CU to be processed derived at step S241 to the estimation unit 231. When obtaining the same, the estimation unit 231 calculates, for the prediction residuals of the CU to be processed, a difference absolute value sum TotalVal of the pixel values in a vertical direction (Y direction) and a horizontal direction (X direction) of the image.

That is, the estimation unit 231 calculates, for each coefficient (prediction residual), a difference between coefficients (prediction residuals) adjacent in the vertical direction, and calculates a total sum of the differences (difference absolute value sum in the vertical direction) with respect to the prediction residuals of the CU to be processed. Similarly, the estimation unit 231 calculates, for each coefficient (prediction residual), a difference between coefficients (prediction residuals) adjacent in the horizontal direction, and calculates a total sum of the differences (difference absolute value sum in the horizontal direction) with respect to the prediction residuals of the CU to be processed. Then, the estimation unit 231 calculates the difference absolute value sum TotalVal of the prediction residuals of the CU to be processed by adding the calculated difference absolute value sum in the vertical direction and difference absolute value sum in the horizontal direction.

At step S283, the estimation unit 231 compares the difference absolute value sum TotalVal of the prediction residuals of the CU to be processed calculated at step S282 with a threshold.

Note that, this threshold may be any value. For example, a predetermined fixed value determined in advance may be made the threshold. Furthermore, a value derived by a monotonically increasing function for a quantization parameter may be made the threshold. By setting the threshold for determining whether or not the influence is large to the value derived by the monotonically increasing function for the quantization parameter, a determination result that does not depend on the magnitude of the quantization parameter can be obtained as described above in <2-1-1-2-1. Method 1-2-1>.

At step S284, the estimation unit 231 supplies the processing unit 232 with a comparison result between the difference absolute value sum TotalVal and the threshold obtained at step S283 as the estimated influence.

When the processing at step S284 ends, the influence estimation processing ends, and the processing returns to FIG. 18.

Note that, the estimated influence in this case may be any parameter. For example, the above-described statistic (for example, the difference absolute value sum TotalVal of the prediction residuals of the CU to be processed and the like) may be made the estimated influence. In this case, the magnitude determination of the influence using the threshold as in "Method 1-2-1" can be omitted. For example, step S283 in FIG. 21 may be omitted, and at step S284, the difference absolute value sum TotalVal of the prediction residuals of the CU to be processed may be made the influence.

3-2-1-3. Flow of Influence Estimation Processing Based on Frequency Feature Amount of Image For example, as in "Method 1-3", the estimation unit 231 may estimate the influence on the basis of a frequency feature amount of an image (original image). By doing so, it is possible to more correctly estimate the influence as described above in <2-1-1-3. Method 1-3>.

This frequency feature amount may be any amount as long as the feature regarding the frequency components of the image is indicated. For example, the frequency feature amount may include a ratio of energy between coefficients transmitted in a case where ZeroOut is applied and coefficients not transmitted of transform coefficients corresponding to the image (original image). For example, the frequency feature amount may include a ratio of energy of the transform coefficients in a block that is not divided (for example, CU).

Furthermore, for example, the estimation unit 231 may compare the frequency feature amount of the image described above with a threshold and determine the magnitude of the influence using a comparison result as in "Method 1-3-1". In this case, as described above in <2-1-1-3-1. Method 1-3-1>, the control of the CU division based on the comparison result (whether or not the influence is large) becomes possible.

Figure 23:
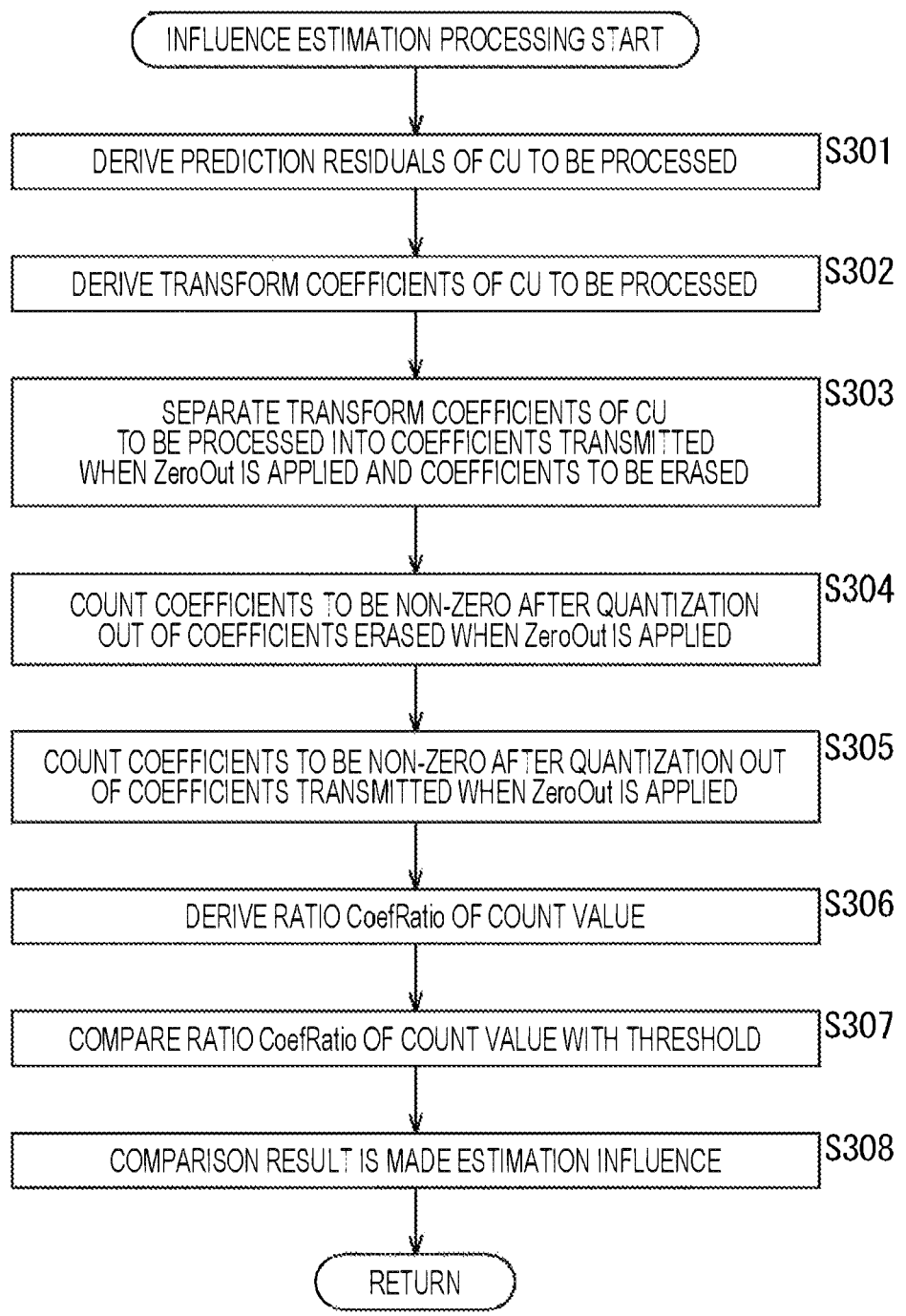
FIG. 23 is a flowchart illustrating an example of a flow of influence estimation processing.

An example of a flow of the influence estimation processing executed at step S204 in FIG. 18 in a case where the influence on the subjective image quality of the decoded image by applying ZeroOut is estimated on the basis of a ratio of energy between the coefficients transmitted in a case where ZeroOut is applied and the coefficients not transmitted of the transform coefficients in the CU to be processed not divided will be described with reference to a flowchart in FIG. 23.

In this case, when the influence estimation processing is started, at step S301, the control unit 211 controls the image coding device 202 to calculate the difference between the original image of the CU to be processed and the prediction image thereof, and makes the same the prediction residuals. That is, control unit 211 causes image coding device 202 to generate the prediction residuals of the CU to be processed.

At step S302, the control unit 211 controls the image coding device 202 to perform coefficient transform on the prediction residuals of the CU to be processed. That is, the control unit 211 causes the image coding device 202 to generate the transform coefficients of the CU to be processed.

At step S303, the control unit 211 controls the image coding device 202 to supply the transform coefficients of the CU to be processed generated at step S302 to the estimation unit 231. The estimation unit 231 separates the transform coefficients of the CU to be processed into the coefficients to be transmitted when ZeroOut is applied and the coefficients to be removed (that is, the coefficients transformed into zero coefficients and not transmitted).

At step S304, the estimation unit 231 counts the number of coefficients that become non-zero coefficients after quantization out of the coefficients removed when ZeroOut is applied. The estimation unit 231 sets a count value to Hi_NonZero. That is, the estimation unit 231 derives energy (Hi_NonZero) of the coefficients not transmitted in a case where ZeroOut is applied.

Furthermore, at step S305, the estimation unit 231 counts the number of coefficients that become non-zero coefficients after quantization out of the coefficients transmitted when ZeroOut is applied. The estimation unit 231 sets a count value to Lo_NonZero. That is, the estimation unit 231 derives the energy (Lo_NonZero) of the coefficients to be transmitted in a case where ZeroOut is applied.

At step S306, the estimation unit 231 derives a ratio CoefRatio between the count value Hi_NonZero derived at step S304 and the count value Lo_NonZero derived at step S305. That is, the estimation unit 231 derives a ratio (CoefRatio) between the energy (Hi_NonZero) of the coefficients not transmitted in a case where ZeroOut is applied and the energy (Lo_NonZero) of the coefficients transmitted in a case where ZeroOut is applied.

At step S307, the estimation unit 231 compares the ratio CoefRatio of the count values derived at step S306 with a threshold. Note that, this threshold may be any value.

At step S308, the estimation unit 231 supplies the processing unit 232 with a comparison result between the ratio CoefRatio of the count values and the threshold obtained at step S307 as the estimated influence.

When the processing at step S308 ends, the influence estimation processing ends, and the processing returns to FIG. 18.

Note that, the estimated influence in this case may be any parameter. For example, the statistic (for example, the ratio CoefRatio of the count values and the like) described above may be made the estimated influence. In this case, the magnitude determination of the influence using the threshold as in "Method 1-3-1" can be omitted. For example, step S307 in FIG. 23 may be omitted, and at step S308, the ratio CoefRatio of the count values may be made the influence.

Note that, as described above in <2-1-1-3. Method 1-3>, the derivation of the frequency feature amount (for example, CoefRatio and the like) may be performed in a block divided into a size to which ZeroOut is not applied (for example, CU). That is, the frequency feature amount may include a ratio of energy of the transform coefficients in a block (for example, CU) divided into a size to which ZeroOut is not applied.

3-2-2. Flow of CU Division Control Processing

Next, CU division control processing executed at step S205 is described. A control method of the CU division is any method. For example, the various methods described above in <2-1-2. Correction Processing Method> to <2-1-2-4. Application Example> can be applied.

3-2-2-1. Addition of Fixed Offset

For example, in a case where the influence on the subjective image quality of the decoded image by applying ZeroOut is large as in "Method 1-4", the estimation unit 231 may add a predetermined offset value to the cost in a case where the block is not divided.

For example, in the influence setting processing executed at step S204 in FIG. 18, in a case where "Method 1-1-1", "Method 1-2-1", or "Method 1-3-1" (or a combination of a plurality of methods including any one of them) described above is applied, and it is determined that the influence on the subjective image quality of the decoded image by applying ZeroOut is large as a result of threshold determination, it is possible to add a predetermined offset value to the cost in a case where the block is not divided.

By doing so, it is possible to further suppress the reduction in subjective image quality while further suppressing the reduction in coding efficiency as described above in <2-1-2-1. Method 1-4>.

Figure 24:
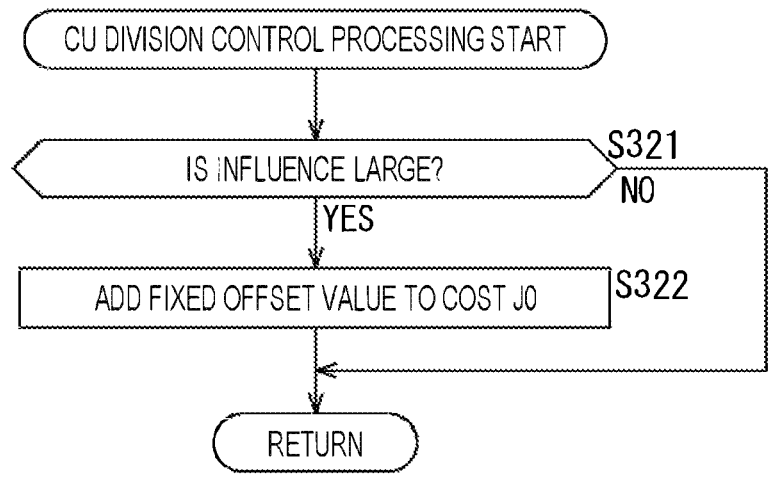
FIG. 24 is a flowchart illustrating an example of a flow of CU sub division control processing.

An example of a flow of the CU division control processing executed at step S205 in FIG. 18 in this case will be described with reference to a flowchart in FIG. 24.

In this case, when the CU division control processing is started, at step S321, the processing unit 232 determines whether or not the influence on the subjective image quality of the decoded image by applying ZeroOut is large on the basis of a result of the threshold determination executed at step S204. In a case where it is determined that the influence is large, the processing proceeds to step S322.

At step S322, the processing unit 232 adds a fixed offset value to the cost J0 in a case where the CU to be processed is not divided derived at step S201 in FIG. 18 (cost J0 is corrected, and cost J0' is derived). When the processing at step S322 ends, the CU division control processing ends, and the processing returns to FIG. 18. In this case, at step S206 in FIG. 18, the CU division setting unit 223 compares the cost J0' (corrected cost J0) with the cost J1. Therefore, ZeroOut is less likely to be applied.

Furthermore, in a case where it is determined at step S321 that the influence on the subjective image quality of the decoded image by applying ZeroOut is not large, the CU division control processing ends, and the processing returns to FIG. 18. In this case, the cost J0 is not corrected, and the application of ZeroOut is not prohibited. Therefore, at step S206 in FIG. 18, the CU division setting unit 223 compares the cost J0 (that is not corrected) with the cost J1.

In this manner, in a case where the influence on the subjective image quality of the decoded image by applying ZeroOut is large, the processing unit 232 controls the CU division in such a manner that ZeroOut is less likely to be applied. Therefore, the image coding device 202 that applies the CU set in this manner to code the image may suppress the reduction in subjective image quality while suppressing the reduction in coding efficiency.

3-2-2-2. Prohibition ZeroOut Application

For example, in a case where the influence on the subjective image quality of the decoded image by applying ZeroOut is large as in "Method 1-5", the estimation unit 231 may force the division of the block (for example, CU and the like). In other words, in a case where the influence on the subjective image quality of the decoded image by applying ZeroOut is large, the application of ZeroOut may be prohibited.

For example, in the influence setting processing executed at step S204 in FIG. 18, in a case where "Method 1-1-1", "Method 1-2-1", or "Method 1-3-1" (or a combination of a plurality of methods including any one of them) described above is applied, and it is determined that the influence on the subjective image quality of the decoded image by applying ZeroOut is large as a result of threshold determination, it is possible to force the division of the block.

By doing so, it is possible to further suppress the reduction in subjective image quality while further suppressing the reduction in coding efficiency as described above in <2-1-2-2. Method 1-5>.

Figure 25:
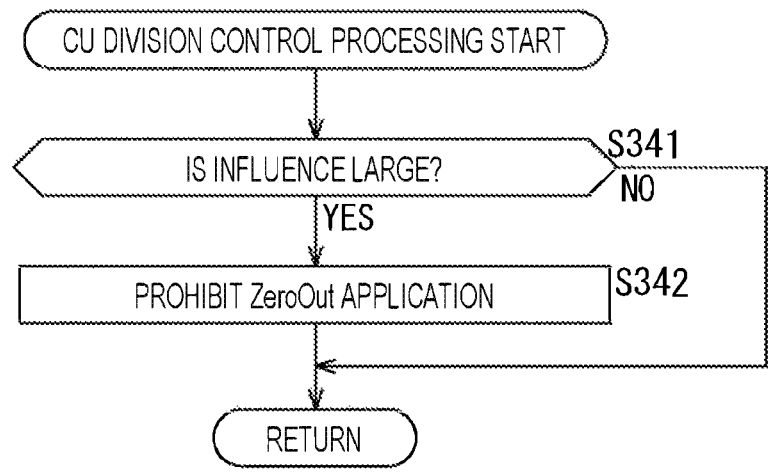
FIG. 25 is a flowchart illustrating an example of a flow of CU sub division control processing.

An example of a flow of the CU division control processing executed at step S205 in FIG. 18 in this case will be described with reference to a flowchart in FIG. 25.

In this case, when the CU division control processing is started, at step S341, the processing unit 232 determines whether or not the influence on the subjective image quality of the decoded image by applying ZeroOut is large on the basis of a result of the threshold determination executed at step S204. In a case where it is determined that the influence is large, the processing proceeds to step S342.

At step S342, the processing unit 232 prohibits the application of ZeroOut. That is, the processing unit 232 sets to divide the CU to be processed. When the processing at step S342 ends, the CU division control processing ends, and the processing returns to FIG. 18. In this case, at step S206 in FIG. 18, it is determined that the application of ZeroOut is prohibited. That is, the processing proceeds to step S207, and the CU to be processed is divided.

Furthermore, in a case where it is determined at step S341 that the influence on the subjective image quality of the decoded image by applying ZeroOut is not large, the CU division control processing ends, and the processing returns to FIG. 18. In this case, the cost J0 is not corrected, and the application of ZeroOut is not prohibited. Therefore, at step S206 in FIG. 18, the CU division setting unit 223 compares the cost J0 (that is not corrected) with the cost J1.

In this manner, in a case where the influence on the subjective image quality of the decoded image by applying ZeroOut is large, the processing unit 232 controls the CU division in such a manner that the application of ZeroOut is prohibited. Therefore, the image coding device 202 that applies the CU set in this manner to code the image may suppress the reduction in subjective image quality while suppressing the reduction in coding efficiency.

Note that, "Method 1-5" is equivalent to adding such an offset value that the cost becomes a sufficiently large value (for example, maximum) in "Method 1-4". That is, "Method 1-5" can also be implemented by addition of the offset value (cost correction).

3-2-2-3. Addition of Variable Offset

For example, the estimation unit 231 may add an offset value corresponding to the estimated influence to the cost in a case where the block is not divided as in "Method 1-6". That is, a variable offset value (positive value) is added.

For example, in the influence setting processing executed at step S204 in FIG. 18, it is possible to apply to "Method 1-1", "Method 1-2", or "Method 1-3" (or a combination of a plurality of methods including any one of them) described above, and add the offset value corresponding to magnitude of the derived estimated influence (for example, the static of the image, the spatial feature amount of the image, or the frequency feature amount of the image) to the cost in a case where the block is not divided.

By doing so, it is possible to further suppress the reduction in subjective image quality while further suppressing the reduction in coding efficiency as described above in <2-1-2-3. Method 1-6>.

Figure 26:
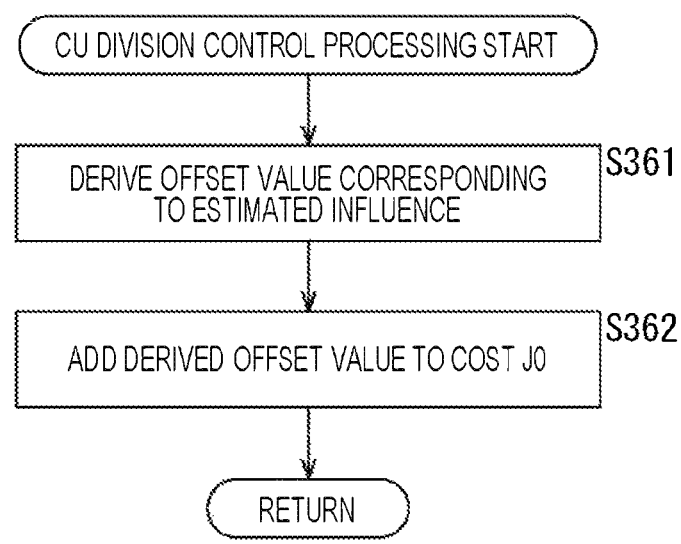
FIG. 26 is a flowchart illustrating an example of a flow of CU sub division control processing.

An example of a flow of the CU division control processing executed at step S205 in FIG. 18 in this case will be described with reference to a flowchart of FIG. 26.

In this case, when the CU division control processing is started, at step S361, the processing unit 232 derives an offset value corresponding to the estimated influence derived at step S204 in FIG. 18. For example, the processing unit 232 sets an offset having a larger value as the estimated influence is larger.

At step S362, the processing unit 232 adds the offset value derived at step S361 to the cost J0 in a case where the CU to be processed is not divided derived at step S201 in FIG. 18 (cost J0 is corrected, and cost J0' is derived). When the processing at step S362 ends, the CU division control processing ends, and the processing returns to FIG. 18. That is, at step S206 in FIG. 18, the CU division setting unit 223 compares the cost J0' (cost J0 corrected according to the estimated influence) with the cost J1. That is, the block division is controlled with a degree corresponding to the magnitude of the influence on the subjective image quality of the decoded image by applying ZeroOut. Therefore, the image coding device 202 that applies the CU set in this manner to code the image may suppress the reduction in subjective image quality while suppressing the reduction in coding efficiency.

4. SECOND EMBODIMENT

Next, an embodiment of applying the present technology (for example, including each method of "Method 2" to "Method 2-4" illustrated in the table in FIG. 10) described above in <2. CU Setting in Consideration of Influence on Subjective Image Quality by ZeroOut Application> (especially, <2-2. Cost Correction Based on Scaling List> to <2-2-2-4. Application Example>) will be described.

4-1. CU Setting Device

Figure 27:
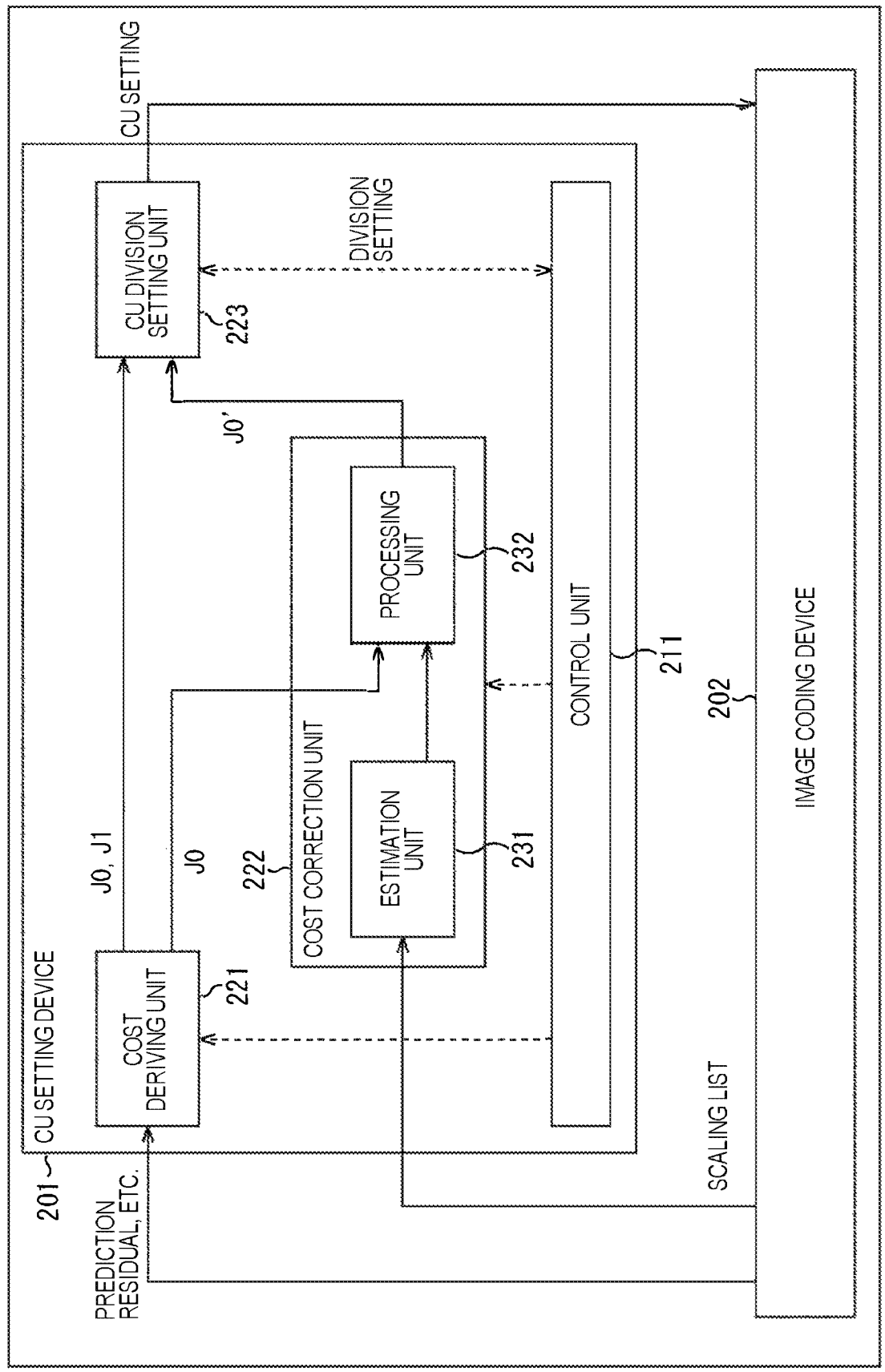
FIG. 27 is a block diagram illustrating a principal configuration example of a CU setting device.

FIG. 27 is a block diagram illustrating an example of a configuration of a CU setting device as an aspect of an information processing device to which the present technology is applied. A CU setting device 201 and an image coding device 202 illustrated in FIG. 27 are devices similar to those in a case of FIG. 17, and basically have configurations similar to those in the example in FIG. 17.

Note that, in a case of the example in FIG. 27, in a case where a CU size (transformation size) before division is a size to which ZeroOut is applied and the CU size (transformation size) after the division is a size to which ZeroOut is not applied, a control unit 211 controls a cost correction unit 222 to correct a cost J0 in a case where a CU to be processed is not divided derived by a cost deriving unit 221. At that time, the control unit 211 controls the image coding device 202 to supply a scaling list (a default scaling list or a current picture scaling list, which is a scaling list of a picture to be processed) to the cost correction unit 222.

In a case where the CU size (transformation size) before the division is the size to which ZeroOut is applied and the CU size (transformation size) after the division is the size to which ZeroOut is not applied, the cost correction unit 222 obtains the scaling list supplied from the image coding device 202. Furthermore, the cost correction unit 222 obtains the cost J0 supplied from the cost deriving unit 221. The cost correction unit 222 corrects the obtained cost J0 on the basis of the obtained scaling list. The cost correction unit 222 supplies a cost J0', which is the cost J0 after the correction, to the CU division setting unit 223.

The cost correction unit 222 executes these pieces of processing under the control of the control unit 211. The cost correction unit 222 corrects the cost J0 by applying the present technology described above in <2. CU Setting in Consideration of Influence on Subjective Image Quality by ZeroOut Application>.

The cost correction unit 222 includes an estimation unit 231 and a processing unit 232. In a case where the CU size (transformation size) before the division is the size to which ZeroOut is applied and the CU size (transformation size) after the division is the size to which ZeroOut is not applied, the estimation unit 231 obtains the scaling list supplied from the image coding device 202. Furthermore, on the basis of the obtained scaling list, the estimation unit 231 estimates an influence on the subjective image quality of a decoded image by applying ZeroOut to quantization coefficients corresponding to an image when coding the image. That is, the estimation unit 231 executes estimation of the influence without using the reconstructed image (decoded image). The estimation unit 231 supplies information indicating an estimation result to the processing unit 232.

The processing unit 232 obtains the information indicating the estimation result of the influence on the subjective image quality of the decoded image by applying ZeroOut supplied from the estimation unit 231. Furthermore, the processing unit 232 obtains the cost J0 in a case of not dividing the CU to be processed supplied from the cost deriving unit 221. The processing unit 232 controls the division of the block by correcting the cost J0 on the basis of the influence estimated by the estimation unit 231 when setting the size of the block serving as the unit of processing in the coding of the image to be coded. The processing unit 232 supplies the cost J0', which is the cost J0 after the correction, to the CU division setting unit 223.

The estimation unit 231 and the processing unit 232 execute these pieces of processing under the control of the control unit 211. The estimation unit 231 and the processing unit 232 estimate the influence on the subjective image quality of the decoded image by applying ZeroOut by applying the present technology (for example, "Method 2" and the like illustrated in the table in FIG. 10) described above in <2-2. Cost Correction Based on Scaling List> and control the division of the block. At that time, the estimation unit 231 and the processing unit 232 can apply the present technology (for example, each method of "Method 2" to "Method 2-4" illustrated in the table in FIG. 10 and the like) described above in <2-2-1. Influence Estimation Method> to <2-2-2-4. Application Example>.

Note that, the cost deriving unit 221 and the CU division setting unit 223 execute processing similar to that in the case in FIG. 17.

4-2. Flow of CU Division Processing

The CU setting device 201 sets whether or not to divide the CU to be processed by executing the CU division processing. An example of a flow of the CU division processing is described with reference to a flowchart in FIG. 28.

When the CU division processing is started, at step S401, the cost deriving unit 221 calculates the cost J0 in a case where the CU to be processed is not divided. The control unit 211 controls the image coding device 202 to supply the information required for calculating the cost J such as the prediction residual, for example, to the cost deriving unit 221. The cost deriving unit 221 derives the cost J0 on the basis of the information. At that time, the cost deriving unit 221 derives the cost J0 without using the reconstructed image. For example, the cost deriving unit 221 derives the cost J0 using Expression (2).

At step S402, the cost deriving unit 221 calculates the cost J1 in a case where the CU to be processed is divided. The cost deriving unit 221 derives the cost J1 on the basis of the information required for calculating the cost J such as the prediction residual, for example, supplied from the image coding device 202. At that time, the cost deriving unit 221 derives the cost J1 without using the reconstructed image. For example, the cost deriving unit 221 derives the cost J1 using Expression (2).

At step S403, the control unit 211 determines whether or not the CU size (transformation size) before the division is the size to which ZeroOut is applied and the CU size (transformation size) after the division is the size to which ZeroOut is not applied. In a case where it is determined that the CU size (transformation size) before the division is the size to which ZeroOut is applied and the CU size (transformation size) after the division is the size to which ZeroOut is not applied, the processing proceeds to step S404.

At step S404, on the basis of the scaling list, the estimation unit 231 of the cost correction unit 222 estimates the influence on the subjective image quality of the decoded image by applying ZeroOut to the quantization coefficients corresponding to the image when coding the image. At that time, the estimation unit 231 can apply the present technology (for example, "Method 2-1" illustrated in the table in FIG. 10 and the like) described above in <2-2-1. Influence Estimation Method> to <2-2-1-2. Application Example>. Furthermore, the estimation unit 231 may estimate the influence without using the reconstructed image (decoded image). By doing so, the estimation unit 231 can estimate the influence without requiring the reconstructed image, so that this can suppress an increase in processing time. Therefore, for example, the CU division setting (CU size setting) to which the present technology is applied can also be applied to real time encoding.

At step S405, the processing unit 232 of the cost correction unit 222 controls the division of the CU on the basis of the influence estimated at step S404 when setting the size of the block serving as the unit of processing in the coding of the image. At that time, the processing unit 232 can apply the present technology (for example, each method of "Method 2-2" to "Method 2-4" illustrated in the table in FIG. 10 and the like) described above in <2-2-2. Correction Processing Method> to <2-2-2-4. Application Example>.

When the processing at step S405 ends, the processing proceeds to step S406. Furthermore, in a case where it is determined at step S403 that the CU size (transformation size) before the division is not the size to which ZeroOut is applied or the CU size (transformation size) after the division is not the size to which ZeroOut is not applied, the processing proceeds to step S406.

At step S406, the CU division setting unit 223 determines whether or not the application of ZeroOut is not prohibited by the control processing at step S405 and the cost J1 is larger than the cost J0 derived at step S401 (or the cost J0' derived at step S405) (that is, J0<J1). In a case where the application of ZeroOut is not prohibited and it is determined that the cost J1 is larger than the cost J0 (or the cost J0'), the processing proceeds to step S407.

At step S407, the CU division setting unit 223 applies ZeroOut. That is, the CU division setting unit 223 sets so as not to divide the CU to be processed, and supplies information indicating the setting to the control unit 211. When the processing at step S407 ends, the CU division processing ends.

Furthermore, in a case where it is determined at step S406 that the application of ZeroOut is prohibited, or it is determined that the cost J1 is not larger than the cost J0 (or the cost J0'), the processing proceeds to step S408.

At step S408, the CU division setting unit 223 does not apply ZeroOut. That is, the CU division setting unit 223 sets to divide the CU to be processed, and supplies information indicating the setting to the control unit 211. When the processing at step S408 ends, the CU division processing ends.

The control unit 211 causes the CU division processing as described above to be executed for the CU having the maximum size, and further recursively executed for the CU after the division.

By doing so, the CU setting device 201 can set the CU size on the basis of not only the code amount but also the influence on the subjective image quality of the decoded image by applying ZeroOut. Therefore, the image coding device 202 that applies the CU to the image coding may further suppress the reduction in subjective image quality while further suppressing the reduction in coding efficiency.

4-2-1. Flow of Influence Setting Processing

Next, influence estimation processing executed at step S204 is described. A method of estimating the influence is any method. For example, the various methods described above in <2-2-1. Influence Estimation Method> to <2-2-1-2. Application Example> can be applied.

4-2-1-1. Flow of Influence Estimation Processing Based on Statistic of List Values in ZeroOut Region of Current Picture Scaling List For example, the estimation unit 231 may estimate the influence on the basis of a statistic of list values of the current picture scaling list corresponding to coefficients not transmitted in a case where ZeroOut is applied, as in "Method 2-1". By doing so, it is possible to more correctly estimate the influence as described above in <2-2-1-1. Method 2-1>.

This statistic may be any value. For example, this may be an average value of the list values corresponding to the ZeroOut region of the current picture scaling list, other statistics, or include a plurality of parameters.

Furthermore, for example, the estimation unit 231 may compare the estimated influence (for example, the statistic described above) with a threshold and determine the magnitude of the influence using a comparison result as in "Method 2-1-1". In this case, as described above in <2-2-1-1-1. Method 2-1-1>, the control of the CU division based on the comparison result (whether or not the influence is large) becomes possible.

In a case of this "Method 2-1-1", the threshold may be any value. For example, the statistic of the list values corresponding to the ZeroOut region of the default scaling list (that is, the list values corresponding to the coefficients not transmitted in a case where ZeroOut is applied) may be made the threshold. For example, an average value of the list values corresponding to the ZeroOut region of the current picture scaling list may be compared with an average value of the list values corresponding to the ZeroOut region of the default scaling list. Then, for example, in a case where the average value of the list values corresponding to the ZeroOut region of the current picture scaling list is smaller than the average value of the list values corresponding to the ZeroOut region of the default scaling list, the CU division may be controlled so that application of ZeroOut is suppressed.

An example of a flow of the influence estimation processing executed at step S404 in FIG. 28 in a case where the influence on the subjective image quality of the decoded image by applying ZeroOut is estimated on the basis of the scaling list in this manner will be described with reference to a flowchart in FIG. 29.

In this case, when the influence estimation processing is started, at step S421, the control unit 211 controls the image coding device 202 to supply the default scaling list to the estimation unit 231. The estimation unit 231 derives an average value of the list values corresponding to the coefficients removed in a case where ZeroOut is applied (that is, the coefficients in the ZeroOut region) on the basis of the default scaling list.

Furthermore, at step S422, the control unit 211 controls the image coding device 202 to supply the current picture scaling list to the estimation unit 231. The estimation unit 231 derives, for the current picture scaling list, an average value of the list values corresponding to the coefficients (that is, the coefficients in the ZeroOut region) to be removed in a case where ZeroOut is applied.

At step S423, the estimation unit 231 compares the average value of the list values corresponding to the coefficients in the ZeroOut region of the default scaling list derived at step S421 with the average value of the list values corresponding to the coefficients in the ZeroOut region of the current picture scaling list derived at step S422. That is, the estimation unit 231 determines which average value is larger.

At step S424, the estimation unit 231 supplies the processing unit 232 with a result of the comparison executed at step S423 as an estimated influence. That is, the estimation unit 231 supplies the processing unit 232 with information indicating which is larger between the average value of the list values corresponding to the coefficients in the ZeroOut region of the default scaling list and the average value of the list values corresponding to the coefficients in the ZeroOut region of the current picture scaling list as the estimated influence.

Figure 28:
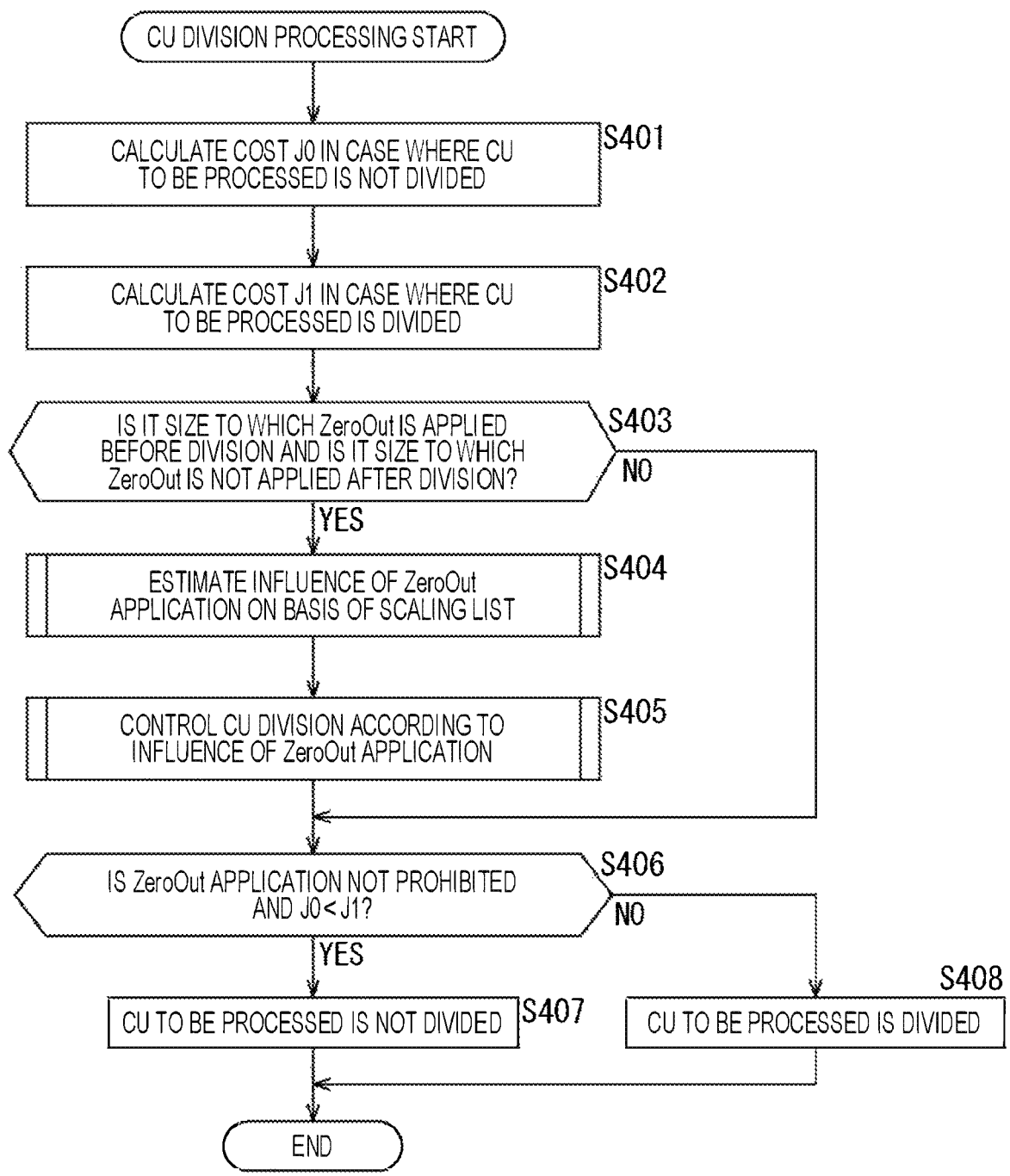
FIG. 28 is a flowchart illustrating an example of a flow of the CU division processing.
Figure 29:
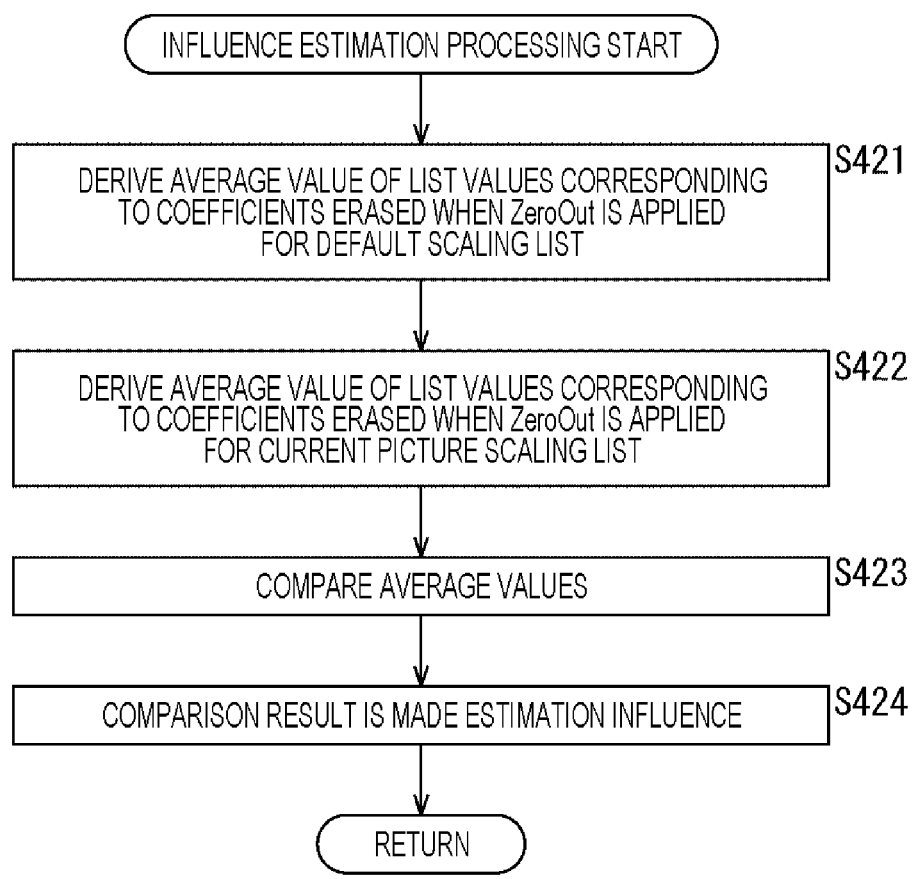
FIG. 29 is a flowchart illustrating an example of a flow of influence estimation processing.

When the processing at step S424 ends, the influence estimation processing ends, and the processing returns to FIG. 28.

Note that, the estimated influence in this case may be any parameter. For example, the statistic described above (for example, the average value of the list values corresponding to the coefficients in the ZeroOut region of the current picture scaling list and the like) may be made the estimated influence. In this case, the magnitude determination of the influence using the threshold as in "Method 2-1-1" can be omitted. For example, step S423 in FIG. 29 may be omitted, and the average value of the list values corresponding to the coefficients in the ZeroOut region of the current picture scaling list may be made the estimated influence at step S424.

4-2-2. Flow of CU Division Control Processing

Next, CU division control processing executed at step S405 is described. A control method of the CU division is any method. For example, the various methods described above in <2-2-2. Correction Processing Method> to <2-2-2-4. Application Example> can be applied. For example, "Method 2-2", "Method 2-3", "Method 2-4", or a combination thereof may be applied.

"Method 2-2" is similar to "Method 1-4". Therefore, in a case where this "Method 2-2" is applied, the processing unit 232 can execute the CU division control processing in a flow similar to the flowchart in FIG. 24, for example.

Furthermore, "Method 2-3" is similar to "Method 1-5". Therefore, in a case where this "Method 2-3" is applied, the processing unit 232 can execute the CU division control processing in a flow similar to the flowchart in FIG. 25, for example.

Moreover, "Method 2-4" is similar to "Method 1-6". Therefore, in a case where this "Method 2-5" is applied, the processing unit 232 can execute the CU division control processing in a flow similar to the flowchart in FIG. 26, for example.

Therefore, the image coding device 202 that applies the CU set in this manner to code the image may suppress the reduction in subjective image quality while suppressing the reduction in coding efficiency.

5. THIRD EMBODIMENT

5-1. Image Coding Device

Figure 30:
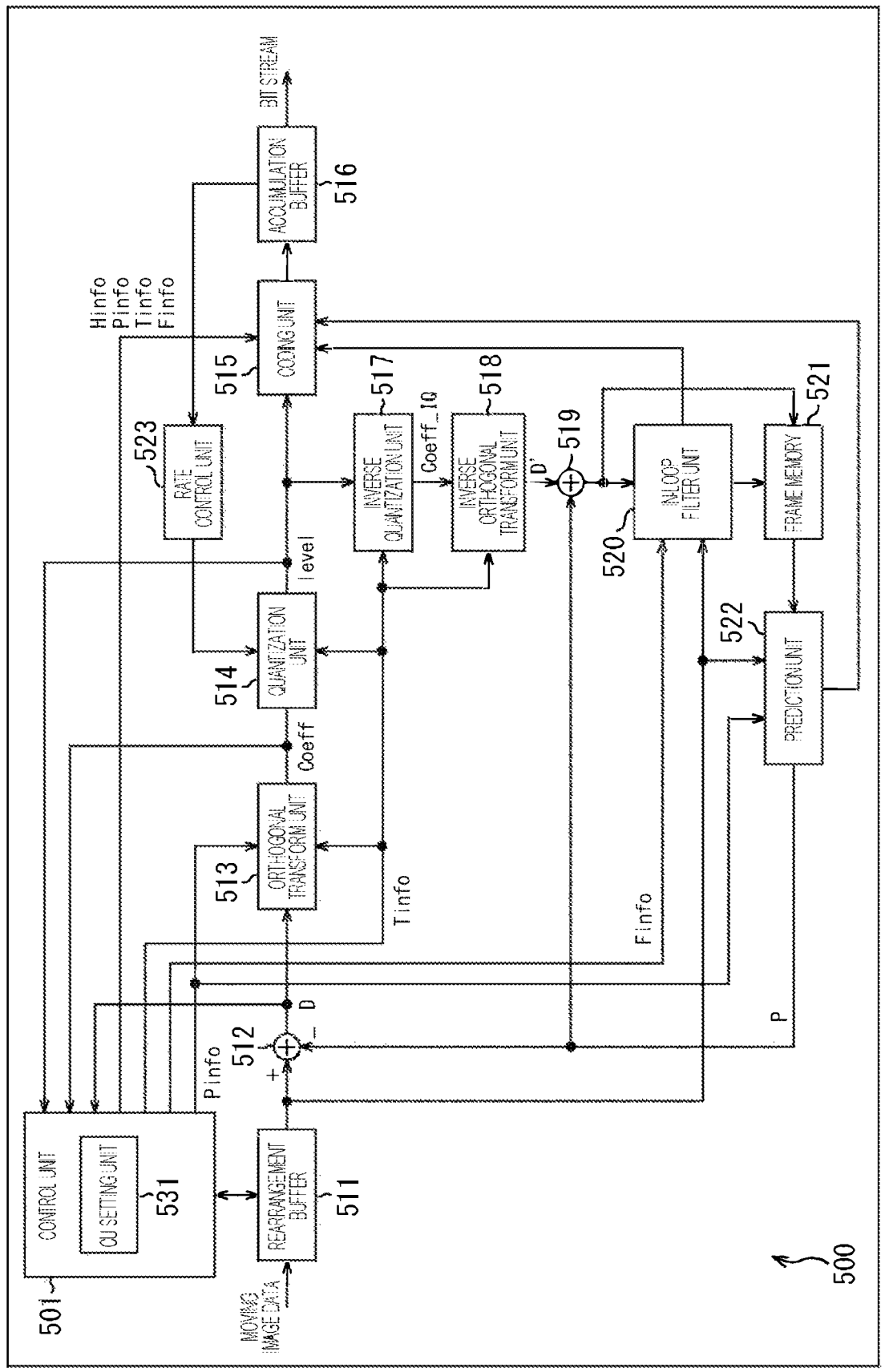
FIG. 30 is a block diagram illustrating a principal configuration example of an image coding device.

The present technology can be applied to any device. FIG. 30 is a block diagram illustrating an example of a configuration of an image coding device, which is an aspect of an image processing device to which the present technology is applied. An image coding device 500 illustrated in FIG. 30 is a device that codes image data of a moving image. For example, the image coding device 500 can code the image data of the moving image by a coding scheme disclosed in any one of above-mentioned Non-Patent Documents.

As illustrated in FIG. 30, the image coding device 500 includes a control unit 501, a rearrangement buffer 511, an operation unit 512, an orthogonal transform unit 513, a quantization unit 514, a coding unit 515, an accumulation buffer 516, an inverse quantization unit 517, an inverse orthogonal transform unit 518, an operation unit 519, an in-loop filter unit 520, a frame memory 521, a prediction unit 522, and a rate control unit 523.

<Control Unit>

The control unit 501 divides moving image data held by the rearrangement buffer 511 into blocks (CU, PU, transform block and the like) serving as units of processing on the basis of an external block size or a block size in a unit of processing specified in advance. Furthermore, the control unit 501 determines coding parameters (header information Hinfo, prediction mode information Pinfo, transform information Tinfo, filter information Finfo and the like) to be supplied to each block.

When determining the coding parameters as described above, the control unit 501 supplies them to each block. For example, the header information Hinfo is supplied to each block. The prediction mode information Pinfo is supplied to the coding unit 515 and the prediction unit 522. The transform information Tinfo is supplied to the coding unit 515, the orthogonal transform unit 513, the quantization unit 514, the inverse quantization unit 517, and the inverse orthogonal transform unit 518. The filter information Finfo is supplied to the in-loop filter unit 520.

<Rearrangement Buffer>

Each field (input image) of the moving image data is input to the image coding device 500 in order of reproduction (order of display) thereof. The rearrangement buffer 511 obtains and holds (stores) each of the input images in order of reproduction (order of display) thereof. The rearrangement buffer 511 rearranges the input images in order of coding (order of decoding) or divides the input images into blocks in units of processing on the basis of control by the control unit 501. The rearrangement buffer 511 supplies each of the processed input images to the operation unit 512. Furthermore, the rearrangement buffer 511 also supplies each of the input images (original images) to the prediction unit 522 and the in-loop filter unit 520.

<Operation Unit>

The operation unit 512 uses an image I corresponding to the block serving as the unit of processing and a prediction image P supplied from the prediction unit 522 as inputs, subtracts the prediction image P from the image I as represented in the following expression to derive a prediction residual D, and supplies the same to the orthogonal transform unit 513.

$$D = I - P$$

<Orthogonal Transform Unit>

The orthogonal transform unit 513 performs processing regarding coefficient transform. For example, the orthogonal transform unit 513 obtains the prediction residual D supplied from the operation unit 512. Furthermore, the orthogonal transform unit 513 obtains the transform information Tinfo supplied from the control unit 501.

The orthogonal transform unit 513 performs orthogonal transform on the prediction residual D on the basis of the transform information Tinfo to derive a transform coefficient Coeff. For example, the orthogonal transform unit 513 performs primary transform on the prediction residual D to generate a primary transform coefficient. Then, the orthogonal transform unit 513 performs secondary transform on the primary transform coefficient to generate a secondary transform coefficient. The orthogonal transform unit 513 supplies the obtained secondary transform coefficient to the quantization unit 514 as the transform coefficient Coeff.

Note that, the orthogonal transform is an example of coefficient transform, and is not limited to this example. That is, the orthogonal transform unit 513 can execute any coefficient transform on the prediction residual D. In addition, the orthogonal transform unit 513 can execute any coefficient transform as primary transform and secondary transform.

<Quantization Unit>

The quantization unit 514 executes processing regarding quantization. For example, the quantization unit 514 obtains the transform coefficient Coeff supplied from the orthogonal transform unit 513. Furthermore, the quantization unit 514 obtains the transform information Tinfo supplied from the control unit 501. Moreover, the quantization unit 514 scales (quantizes) the transform coefficient Coeff on the basis of the transform information Tinfo. Note that, a method for this quantization is any method. Furthermore, a rate of the quantization is controlled by the rate control unit 523. The quantization unit 514 supplies a quantized transform coefficient obtained by such quantization, that is, a quantization transform coefficient level to the coding unit 515 and the inverse quantization unit 517.

<Coding Unit>

The coding unit 515 executes processing regarding coding. For example, the coding unit 515 obtains the quantization transform coefficient level supplied from the quantization unit 514. Furthermore, the coding unit 515 obtains various coding parameters (header information Hinfo, prediction mode information Pinfo, transform information Tinfo, filter information Finfo and the like) supplied from the control unit 501. Moreover, the coding unit 515 obtains information regarding a filter such as a filter coefficient supplied from the in-loop filter unit 520. Furthermore, the coding unit 515 obtains information regarding an optimum prediction mode supplied from the prediction unit 522.

The coding unit 515 performs variable-length coding (for example, arithmetic coding) on the quantization transform coefficient level and generates a bit string (coded data). Furthermore, the coding unit 515 derives residual information Rinfo from the quantization transform coefficient level. Then, the coding unit 515 codes the derived residual information Rinfo to generate a bit string.

The coding unit 515 includes the information regarding a filter supplied from the in-loop filter unit 520 in the filter information Finfo. Furthermore, the coding unit 515 includes the information regarding an optimum prediction mode supplied from the prediction unit 522 in the prediction mode information Pinfo. Then, the coding unit 515 codes the above-described various coding parameters (header information Hinfo, prediction mode information Pinfo, transform information Tinfo, filter information Finfo and the like), and generates a bit string.

The coding unit 515 multiplexes the bit strings of various types of information generated as described above to generate the coded data. The coding unit 515 supplies the coded data to the accumulation buffer 516.

<Accumulation Buffer>

The accumulation buffer 516 temporarily holds the coded data obtained by the coding unit 515. At a predetermined timing, the accumulation buffer 516 outputs the held coded data out of the image coding device 500 as, for example, a bit stream and the like. For example, the coded data is transmitted to a decoding side via any recording medium, any transmission medium, any information processing device and the like. That is, the accumulation buffer 516 also serves as a transmission unit that transmits the coded data (bit stream).

<Inverse Quantization Unit>

The inverse quantization unit 517 executes processing regarding inverse quantization. For example, the inverse quantization unit 517 obtains the quantization transform coefficient level supplied from the quantization unit 514. Furthermore, the inverse quantization unit 517 obtains the transform information Tinfo supplied from the control unit 501.

The inverse quantization unit 517 scales (inversely quantizes) the value of the quantization transform coefficient level on the basis of the transform information Tinfo. Note that, this inverse quantization is inverse processing of the quantization executed by the quantization unit 514. The inverse quantization unit 517 supplies a transform coefficient Coeff_IQ obtained by such inverse quantization to the inverse orthogonal transform unit 518.

<Inverse Orthogonal Transform Unit>

The inverse orthogonal transform unit 518 executes processing regarding inverse coefficient transform. For example, the inverse orthogonal transform unit 518 obtains the transform coefficient Coeff_IQ supplied from the inverse quantization unit 517. Furthermore, the inverse orthogonal transform unit 518 obtains the transform information Tinfo supplied from the control unit 501.

The inverse orthogonal transform unit 518 executes inverse orthogonal transform on the transform coefficient Coeff_IQ on the basis of the transform information Tinfo to derive a prediction residual D'. Note that, this inverse orthogonal transform is inverse processing of the orthogonal transform executed by the orthogonal transform unit 513. For example, the inverse orthogonal transform unit 518 performs inverse secondary transform on the transform coefficient Coeff_IQ (secondary transform coefficient) to generate a primary transform coefficient. Furthermore, the inverse orthogonal transform unit 518 performs inverse primary transform on the primary transform coefficient to generate the prediction residual D'. Note that, the inverse secondary transform is inverse processing of the secondary transform executed by the orthogonal transform unit 513. Furthermore, the inverse primary transform is inverse processing of the primary transform executed by the orthogonal transform unit 513. The inverse orthogonal transform unit 518 supplies the prediction residual D' obtained by such inverse orthogonal transform to the operation unit 519.

<Operation Unit>

The operation unit 519 uses the prediction residual D' supplied from the inverse orthogonal transform unit 518 and the prediction image P supplied from the prediction unit 522 as inputs. The operation unit 519 adds the prediction residual D' and the prediction image P corresponding to the prediction residual D', and derives a locally decoded image Rlocal. The operation unit 519 supplies the derived locally decoded image Rlocal to the in-loop filter unit 520 and the frame memory 521.

<In-Loop Filter Unit>

The in-loop filter unit 520 executes processing regarding in-loop filter processing. For example, the in-loop filter unit 520 uses the locally decoded image Rlocal supplied from the operation unit 519, the filter information Finfo supplied from the control unit 501, and the input image (original image) supplied from the rearrangement buffer 511 as inputs. Note that, the information input to the in-loop filter unit 520 is any information, and information other than these pieces of information may be input. For example, information such as a prediction mode, motion information, a code amount target value, a quantization parameter QP, a picture type, a block (CU, CTU and the like) and the like may be input to the in-loop filter unit 520 as necessary.

The in-loop filter unit 520 appropriately executes filter processing on the locally decoded image Rlocal on the basis of the filter information Finfo. The in-loop filter unit 520 also uses the input image (original image) or other input information for the filter processing as necessary.

For example, the in-loop filter unit 520 can apply a bilateral filter as the filter processing. Furthermore, the in-loop filter unit 520 can apply a deblocking filter (DBF) as the filter processing. Moreover, the in-loop filter unit 520 can apply an adaptive offset filter (sample adaptive offset (SAO)) as the filter processing. Furthermore, the in-loop filter unit 520 can apply an adaptive loop filter (ALF) as the filter processing. Moreover, the in-loop filter unit 520 can apply a plurality of filters out of them as the filter processing. Note that, any filter may be applied in any order, and it is possible to appropriately select. For example, the in-loop filter unit 520 applies, as the filter processing, four in-loop filters of the bilateral filter, deblocking filter, adaptive offset filter, and adaptive loop filter in this order.

Needless to say, the filter processing executed by the in-loop filter unit 520 is any processing and is not limited to the above-described example. For example, the in-loop filter unit 520 may apply a Wiener filter and the like.

The in-loop filter unit 520 supplies the locally decoded image Rlocal subjected to the filter processing to the frame memory 521. Note that, for example, in a case where information regarding the filter such as the filter coefficient is transmitted to the decoding side, the in-loop filter unit 520 supplies the information regarding the filter to the coding unit 515.

<Frame Memory>

The frame memory 521 executes processing regarding storage of data regarding an image. For example, the frame memory 521 uses the locally decoded image Rlocal supplied from the operation unit 519 or the locally decoded image Rlocal subjected to the filter processing supplied from the in-loop filter unit 520 as inputs, and holds (stores) them. Furthermore, the frame memory 521 reconstructs a decoded image R in each picture unit using the locally decoded image Rlocal to hold (store in a buffer in the frame memory 521). The frame memory 521 supplies the decoded image R (or a part thereof) to the prediction unit 522 in response to a request from the prediction unit 522.

<Prediction Unit>

The prediction unit 522 executes processing regarding generation of the prediction image. For example, the prediction unit 522 obtains the prediction mode information Pinfo supplied from the control unit 501. Furthermore, the prediction unit 522 obtains the input image (original image) supplied from the rearrangement buffer 511. Moreover, the prediction unit 522 obtains the decoded image R (or a part thereof) read from frame memory 521.

The prediction unit 522 executes prediction processing such as inter prediction or intra prediction using the prediction mode information Pinfo and the input image (original image). That is, the prediction unit 522 generates the prediction image P by executing prediction and motion compensation with reference to the decoded image R as a reference image.

The prediction unit 522 supplies the generated prediction image P to the operation unit 512 and the operation unit 519.

Furthermore, the prediction unit 522 supplies information regarding the prediction mode selected by the above-described processing, that is, the optimum prediction mode, to the coding unit 515 as necessary.

<Rate Control Unit>

The rate control unit 523 executes processing regarding rate control. For example, the rate control unit 523 controls a rate of a quantization operation of the quantization unit 514 so that overflow or underflow does not occur on the basis of the code amount of the coded data accumulated in the accumulation buffer 516.

<CU Setting in Consideration of Influence on Subjective Image Quality by ZeroOut Application>

The present technology described in <2. CU Setting in Consideration of Influence on Subjective Image Quality by ZeroOut Application> to <2-2-2-4. Application Example> is applied to the image coding device 500 having the above-described configuration.

For example, the control unit 501 includes a CU setting unit 531. The CU setting unit 531 performs division setting of the block (CU, PU, transform block and the like) serving as the units of processing as for the frame data of the moving image held by the rearrangement buffer 511. At that time, the CU setting unit 531 can set the CU division (CU size) by applying the present technology described in <2. CU Setting in Consideration of Influence on Subjective Image Quality by ZeroOut Application> to <2-2-2-4. Application Example>.

For example, the CU setting unit 531 has a configuration similar to that of the CU setting device 201 illustrated in FIG. 17, performs similar processing, and sets the CU division (CU size) by applying "Method 1" (including various methods described in <2-1. Cost Correction based on Image> to <2-1-2-4. Application Example> such as Method 1-1, Method 1-1-1, Method 1-2, Method 1-2-1, Method 1-3, Method 1-3-1, Method 1-4, Method 1-5, and Method 1-6).

In this case, the image coding device 202 has a configuration other than the CU setting unit 531 of the image coding device 500, and performs similar processing.

That is, for example, the CU setting unit 531 can obtain the pixel values of the original image of the CU to be processed from the rearrangement buffer 511. Furthermore, the CU setting unit 531 can obtain the prediction residuals of the CU to be processed from the operation unit 512. Moreover, the CU setting unit 531 can obtain the transform coefficients of the CU to be processed from the orthogonal transform unit 513. Furthermore, the CU setting unit 531 can obtain the quantization coefficients of the CU to be processed from the quantization unit 514. Therefore, similarly to the case of the CU setting device 201 described in the first embodiment, the CU setting unit 531 can correct the cost by using these pieces of information.

That is, the CU setting unit 531 estimates, on the basis of the image, the influence on the subjective image quality of the decoded image by applying ZeroOut to the quantization coefficients corresponding to the image when coding the image, and controls the division of the block on the basis of the estimated influence when setting the size of the block serving as the unit of processing in the coding of the image.

By doing so, the image coding device 500 can suppress the reduction in subjective image quality while suppressing the reduction in coding efficiency.

Furthermore, the CU setting unit 531 has a configuration similar to that of the CU setting device 201 illustrated in FIG. 27, performs similar processing, and sets the CU division (CU size) by applying "Method 2" (including various methods described in <2-2. Cost Correction based on Scaling List> to <2-2-2-4. Application Example> such as Method 2-1, Method 2-1-1, Method 2-2, Method 2-3, and Method 2-4).

In this case, the image coding device 202 has a configuration other than the CU setting unit 531 of the image coding device 500, and performs similar processing.

That is, for example, the CU setting unit 531 can obtain a scaling list (a default scaling list or a current picture scaling list) held by the control unit 501. Therefore, similarly to the case of the CU setting device 201 described in the second embodiment, the CU setting unit 531 can correct the cost by using the scaling list.

That is, the CU setting unit 531 estimates, on the basis of the scaling list, the influence on the subjective image quality of the decoded image by applying ZeroOut to the quantization coefficients corresponding to the image when coding the image, and controls the division of the block on the basis of the estimated influence when setting the size of the block serving as a unit of processing in the coding of the image.

By doing so, the image coding device 500 can suppress the reduction in subjective image quality while suppressing the reduction in coding efficiency.

5-2. Flow of Image Coding Processing

Figure 31:
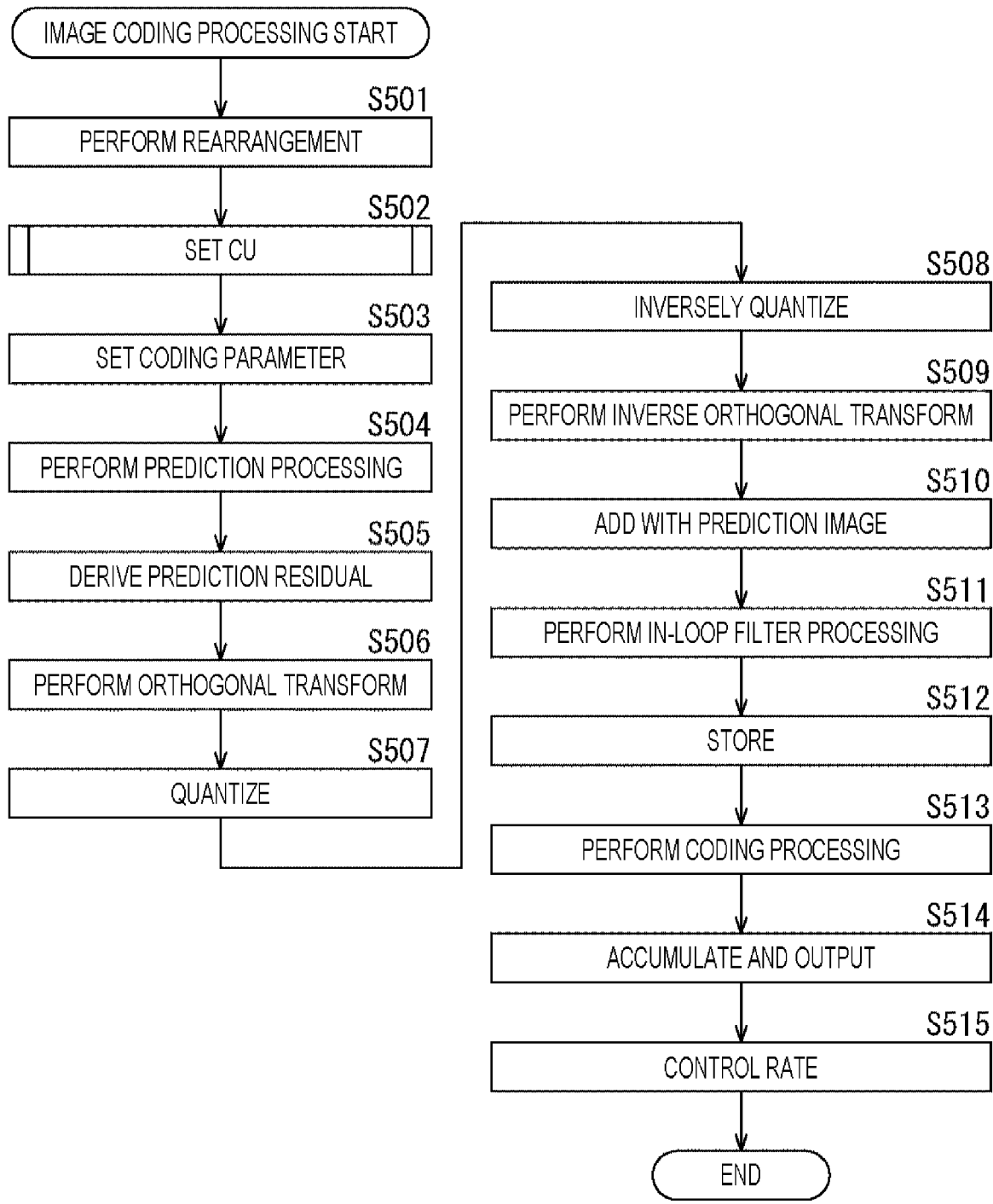
FIG. 31 is a flowchart illustrating an example of a flow of image coding processing.

Next, an example of a flow of image coding processing executed by the image coding device 500 having the above-described configuration will be described with reference to a flowchart in FIG. 31.

When the image coding processing is started, at step S501, the rearrangement buffer 511 is controlled by the control unit 501 to rearrange an order of frames of input moving image data from the order of display to the order of coding.

At step S502, the CU setting unit 531 of the control unit 501 sets the CU for the input image held by the rearrangement buffer 511 (performs block division).

At step S503, the control unit 501 determines (sets) a coding parameter for the input image held by the rearrangement buffer 511.

At step S504, the prediction unit 522 executes prediction processing and generates a prediction image and the like in an optimum prediction mode. For example, in this prediction processing, the prediction unit 522 executes intra prediction to generate a prediction image and the like in an optimum intra prediction mode. Furthermore, the prediction unit 522 executes inter prediction to generate a prediction image and the like in an optimum inter prediction mode. Moreover, the prediction unit 522 selects an optimum prediction mode out of them on the basis of a cost function value and the like.

At step S505, the operation unit 512 performs operation of a difference between the input image and the prediction image in the optimum mode selected by the prediction processing at step S504. That is, the operation unit 512 generates the prediction residual D between the input image and the prediction image. The prediction residual D obtained in this manner has a reduced data amount as compared with the original image data. Therefore, the data amount can be compressed as compared with a case where the image is coded as it is.

At step S506, the orthogonal transform unit 513 executes orthogonal transform processing on the prediction residual D generated by the processing at step S505, and derives the transform coefficient Coeff. For example, the orthogonal transform unit 513 executes primary transform on the prediction residual D to generate a primary transform coefficient. Furthermore, the orthogonal transform unit 513 executes secondary transform on the primary transform coefficient to generate a secondary transform coefficient (transform coefficient Coeff).

At step S507, the quantization unit 514 quantizes the transform coefficient Coeff obtained by the processing at step S506 by using the quantization parameter calculated by the control unit 501 and the like, and derives the quantization transform coefficient level.

At step S508, the inverse quantization unit 517 inversely quantizes the quantization transform coefficient level generated by the processing at step S507 with a characteristic corresponding to the quantization characteristic at step S507, and derives the transform coefficient Coeff_IQ.

At step S509, the inverse orthogonal transform unit 518 performs inverse orthogonal transform on the transform coefficient Coeff_IQ obtained by the processing at step S508 by a method corresponding to the orthogonal transform processing at step S506, and derives the prediction residual D'. For example, the inverse orthogonal transform unit 518 executes inverse secondary transform on the transform coefficient Coeff_IQ (secondary transform coefficient) to generate a primary transform coefficient.

Furthermore, the inverse orthogonal transform unit 518 executes inverse primary transform on the primary transform coefficient to generate the prediction residual D'.

At step S510, the operation unit 519 adds the prediction image obtained by the prediction processing at step S504 to the prediction residual D' derived by the processing at step S509, thereby generating a locally decoded decoded image.

At step S511, the in-loop filter unit 520 executes in-loop filter processing on the locally decoded decoded image derived by the processing at step S510.

At step S512, the frame memory 521 stores the locally decoded decoded image derived by the processing at step S510 and the locally decoded decoded image subjected to the filter processing at step S511.

At step S513, the coding unit 515 codes the quantization transform coefficient level obtained by the processing at step S507. For example, the coding unit 515 codes the quantization transform coefficient level, which is information regarding an image, with arithmetic coding and the like to generate the coded data.

Furthermore, at that time, the coding unit 515 codes various coding parameters (the header information Hinfo, prediction mode information Pinfo, and transform information Tinfo). Moreover, the coding unit 515 derives residual information RInfo from the quantization transform coefficient level, and codes the residual information RInfo.

At step S514, the accumulation buffer 516 accumulates the coded data obtained in this manner, and outputs the coded data to outside of the image coding device 500 as, for example, a bit stream. This bit stream is transmitted to the decoding side via a transmission path or a recording medium, for example.

At step S515, the rate control unit 523 executes rate control as necessary.

When the processing of step S515 ends, the image encoding processing ends.

At step S502 of the image coding processing in such a flow, the CU setting unit 531 sets the CU division (CU size) by applying the present technology described above in <2. CU Setting in Consideration of Influence on Subjective Image Quality by ZeroOut Application>. For example, the CU setting unit 531 may set the CU division (CU size) by applying the present technology described in <2-1. Cost Correction based on Image> to <2-1-2-4. Application Example>.

For example, at step S502, the CU setting unit 531 may execute the CU division processing in a flow of the flowchart illustrated in FIG. 18.

That is, the CU setting unit 531 may set the CU division (CU size) by applying various methods such as "Method 1" to "Method 1-6" illustrated in the table in FIG. 10, a combination thereof or the like, for example.

That is, in this case, the CU setting unit 531 estimates, on the basis of the image, the influence on the subjective image quality of the decoded image by applying ZeroOut to the quantization coefficients corresponding to the image when coding the image, and controls the division of the block on the basis of the estimated influence when setting the size of the block serving as the unit of processing in the coding of the image.

The CU setting unit 531 executes the CU division processing on the CU having the maximum size. Furthermore, the CU setting unit 531 recursively executes the CU division processing on the CU after the division.

By doing so, the image coding device 500 can suppress the reduction in subjective image quality while suppressing the reduction in coding efficiency.

Furthermore, at step S502, the CU setting unit 531 may set the CU division (CU size) by applying the present technology described in <2-2. Cost Correction based on Scaling List> to <2-2-2-4. Application Example>, for example. For example, at step S502, the CU setting unit 531 may execute the CU division processing in a flow of the flowchart illustrated in FIG. 28.

That is, the CU setting unit 531 may set the CU division (CU size) by applying various methods such as "Method 2" to "Method 2-4" illustrated in the table in FIG. 10, a combination thereof or the like, for example.

That is, in this case, the CU setting unit 531 estimates, on the basis of the scaling list (default scaling list and current picture scaling list), the influence on the subjective image quality of the decoded image by applying ZeroOut to the quantization coefficients corresponding to the image when coding the image, and controls the division of the block on the basis of the estimated influence when setting the size of the block serving as a unit of processing in the coding of the image.

The CU setting unit 531 executes the CU division processing on the CU having the maximum size. Furthermore, the CU setting unit 531 recursively executes the CU division processing on the CU after the division.

By doing so, the image coding device 500 can suppress the reduction in subjective image quality while suppressing the reduction in coding efficiency.

6. APPENDIX

<Computer>

The above-described series of processing can be executed by hardware or software. In a case where the series of processing is executed by software, a program forming the software is installed in a computer. Here, examples of the computer include a computer built in dedicated hardware, a general-purpose personal computer that can execute various functions by being installed with various programs and the like, for example.

Figure 32:
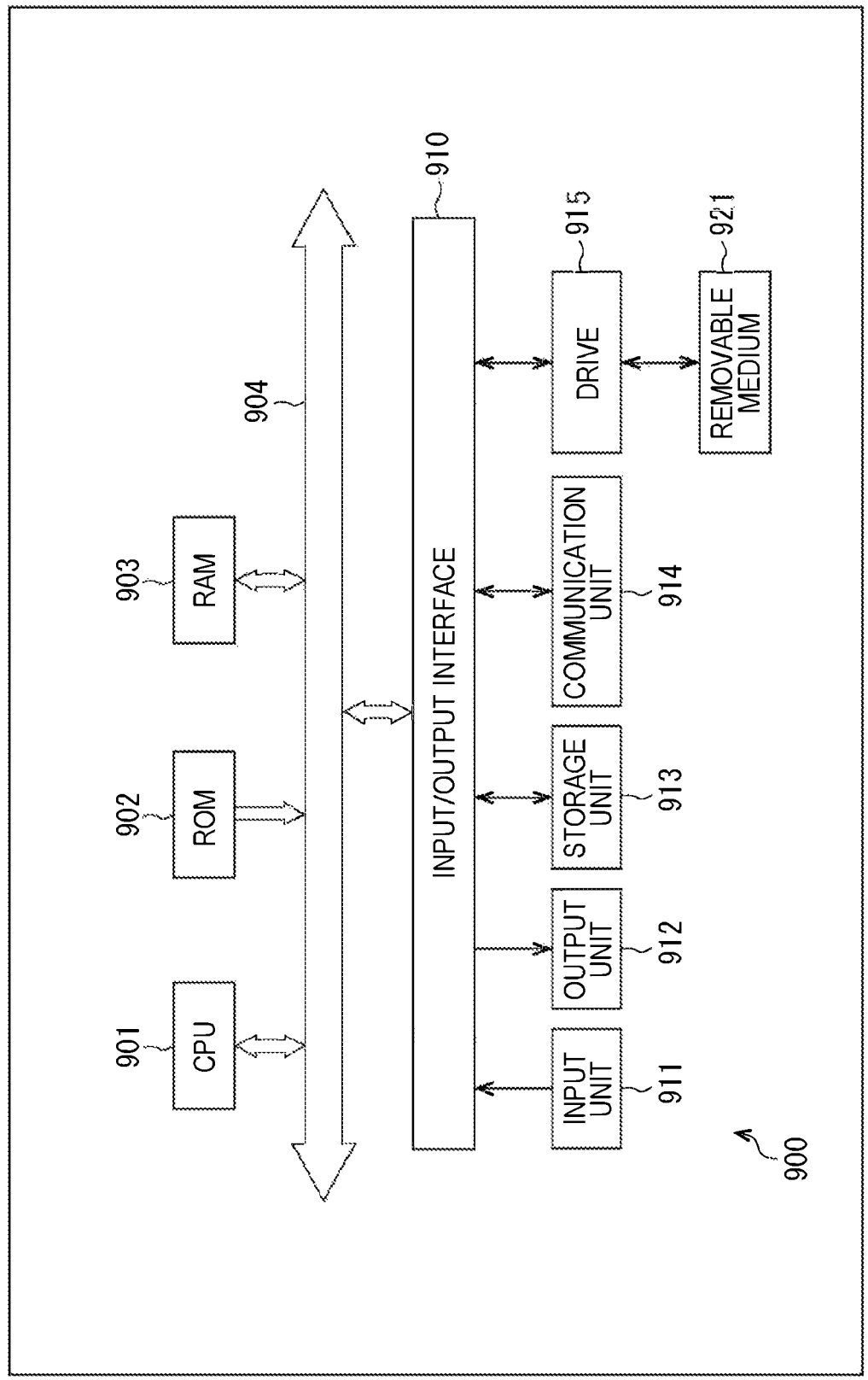
FIG. 32 is a block diagram illustrating a principal configuration example of a computer.

FIG. 32 is a block diagram illustrating a configuration example of hardware of a computer that executes the above-described series of processing by a program.

In a computer 900 illustrated in FIG. 32, a central processing unit (CPU) 901, a read only memory (ROM) 902, and a random access memory (RAM) 903 are mutually connected via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal and the like. The output unit 912 includes, for example, a display, a speaker, an output terminal and the like. The storage unit 913 includes, for example, a hard disk, a RAM disk, a nonvolatile memory and the like. The communication unit 914 includes, for example, a network interface. The drive 915 drives a removable medium 921 such as a magnetic disk, an optical disk, a magneto-optical disk, or a semiconductor memory.

In the computer configured as described above, the series of processing described above is executed, for example, by the CPU 901 loading a program stored in the storage unit 913 into the RAM 903 via the input/output interface 910 and the bus 904, and executing the program. The RAM 903 also appropriately stores data necessary for the CPU 901 to execute various pieces of processing.

The program executed by the computer can be applied by being recorded on, for example, the removable medium 921 as a package medium or the like. In this case, the program can be installed in the storage unit 913 via the input/output interface 910 by attaching the removable medium 921 to the drive 915.

Furthermore, this program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

Applicable Target of the Present Technology

The present technology can be applied to any image coding scheme or decoding scheme. That is, the specifications of various pieces of processing regarding the image coding such as coefficient transform (inverse coefficient transform), quantization (inverse quantization), coding, and prediction are optional as long as they do not contradict the present technology described above, and are not limited to the above-described examples. Furthermore, some of these pieces of processing may be omitted unless there is a contradiction with the present technology described above.

Furthermore, the present technology can be applied to a multi-view image coding system that codes a multi-view image including images of a plurality of viewpoints (views). Furthermore, the present technology can be applied to a multi-view image decoding system that decodes coded data of a multi-view image including images of a plurality of viewpoints (views). In that case, the present technology may be applied to coding and decoding of each viewpoint (view).

Moreover, the present technology can be applied to a hierarchical image coding (scalable coding) system that codes a hierarchical image layered (hierarchized) so as to have a scalability function for a predetermined parameter. Furthermore, the present technology can be applied to a hierarchical image decoding (scalable decoding) system that decodes coded data of a hierarchical image layered (hierarchized) so as to have a scalability function for a predetermined parameter. In that case, the present technology may be applied to coding and decoding of each level (layer).

Furthermore, the present technology can be applied to any configuration.

For example, the present technology can be applied to various electronic devices such as a transmitter and a receiver (for example, a television receiver and a mobile phone) in satellite broadcasting, cable broadcasting such as cable TV, distribution on the Internet, and distribution to a terminal by cellular communication, or a device (for example, a hard disk recorder and a camera) that records an image on a medium such as an optical disk, a magnetic disk, and a flash memory, or reproduces an image from the storage medium.

Furthermore, for example, the present technology can also be implemented as a partial configuration of a device, such as a processor (for example, a video processor) as a system large scale integration (LSI) and the like, a module (for example, a video module) using a plurality of the processors and the like, a unit (for example, a video unit) using a plurality of the modules and the like, or a set (for example, a video set) obtained by further adding other functions to the unit.

Furthermore, for example, the present technology can also be applied to a network system including a plurality of devices. For example, the present technology may be implemented as cloud computing in which a plurality of devices shares and processes in cooperation via a network. For example, the present technology may be implemented in a cloud service that provides a service regarding an image (moving image) to any terminal such as a computer, an audio visual (AV) device, a portable information processing terminal, or an Internet of Things (IoT) device.

Note that, in the present specification, a system means a set of a plurality of components (devices, modules (parts) and the like), and it does not matter whether or not all the components are in the same housing. Therefore, both of a plurality of devices stored in different housings and connected via a network, and one device in which a plurality of modules is stored in one housing are systems.

Field and Use to which Present Technology is Applicable

The system, device, processing unit and the like to which the present technology is applied can be used in any field such as traffic, medical care, crime prevention, agriculture, livestock industry, mining, beauty care, factory, household appliance, weather, and natural surveillance, for example. Furthermore, an application thereof is optional.

For example, the present technology can be applied to systems and devices used for providing content for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine and the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife and the like. Moreover, for example, the present technology can also be applied to systems and devices used for sports.

Others

Note that, in the present specification, a "flag" is information for identifying a plurality of states, and includes not only information used for identifying two states of true (1) and false (0) but also information capable of identifying three or more states. Therefore, a value that may be taken by the "flag" may be, for example, a binary of 1/0 or a ternary or more. That is, the number of bits forming this "flag" is any number, and may be one bit or a plurality of bits. Furthermore, identification information (including the flag) is assumed to include not only identification information thereof in a bit stream but also difference information of the identification information with respect to certain reference information in the bit stream, and thus, in the present specification, the "flag" and "identification information" include not only the information thereof but also the difference information with respect to the reference information.

Furthermore, various types of information (such as metadata) regarding coded data (bit stream) may be transmitted or recorded in any form as long as this is associated with the coded data. Herein, the term "associate" is intended to mean to make, when processing one data, the other data available (linkable), for example. That is, the data associated with each other may be collected as one data or may be made individual data. For example, information associated with the coded data (image) may be transmitted on a transmission path different from that of the coded data (image). Furthermore, for example, the information associated with the coded data (image) may be recorded in a recording medium different from that of the coded data (image) (or another recording area of the same recording medium). Note that, this "association" may be of not entire data but a part of data. For example, an image and information corresponding to the image may be associated with each other in any unit such as a plurality of frames, one frame, or a part within a frame.

Note that, in the present specification, terms such as "synthesize", "multiplex", "add", "integrate", "include", "store", "put in", "introduce", "insert" and the like mean, for example, to combine a plurality of objects into one, such as to combine coded data and metadata into one data, and mean one method of "associating" described above.

Furthermore, the embodiments of the present technology are not limited to the above-described embodiments, and various modifications are possible without departing from the scope of the present technology.

For example, a configuration described as one device (or processing unit) may be divided to form a plurality of devices (or processing units). Conversely, configurations described above as a plurality of devices (or processing units) may be collectively configured as one device (or processing unit). Furthermore, it goes without saying that a configuration other than the above-described configurations may be added to the configuration of each device (or each processing unit). Moreover, when the configuration and operation as the entire system are substantially the same, a part of the configuration of a certain device (or processing unit) may be included in the configuration of another device (or another processing unit).

Furthermore, for example, the above-described program may be executed in any device. In this case, the device is only required to have a necessary function (functional block and the like) and obtain necessary information.

Furthermore, for example, each step of one flowchart may be executed by one device, or may be shared and executed by a plurality of devices. Moreover, in a case where a plurality of pieces of processing is included in one step, the plurality of pieces of processing may be executed by one device, or may be shared and executed by a plurality of devices. In other words, a plurality of pieces of processing included in one step can be executed as the pieces of processing of a plurality of steps. Conversely, the pieces of processing described as a plurality of steps can be collectively executed as one step.

Furthermore, the program executed by the computer may have the following features. For example, the pieces of processing of the steps describing the program may be executed in time series in the order described in the present specification. Furthermore, the pieces of processing of the steps describing the program may be executed in parallel. Moreover, the pieces of processing of the steps describing the program may be individually executed at the necessary timing, such as when the program is called. That is, the pieces of processing of the respective steps may be executed in an order different from the above-described order as long as there is no contradiction. Furthermore, the pieces of processing of steps describing this program may be executed in parallel with the pieces of processing of another program. Moreover, the pieces of processing of the steps describing this program may be executed in combination with the pieces of processing of another program.

Furthermore, for example, a plurality of technologies regarding the present technology can be implemented independently as a single entity as long as there is no contradiction. It goes without saying that any plurality of present technologies can be implemented in combination. For example, a part or all of the present technologies described in any of the embodiments can be implemented in combination with a part or all of the present technologies described in other embodiments.

Furthermore, a part or all of any of the above-described present technologies can be implemented together with another technology that is not described above.

Note that, the present technology can also have the following configuration.

(1) An information processing device including:
an estimation unit that estimates, on the basis of an image, influence on a subjective image quality of a decoded image by applying ZeroOut to quantization coefficients corresponding to the image when coding the image; and
a control unit that controls division of a block on the basis of the influence estimated by the estimation unit when setting a size of the block serving as a unit of processing in the coding of the image.

(2) The information processing device according to (1), in which
the estimation unit estimates the influence on the basis of a statistic of data regarding the image.

(3) The information processing device according to (2), in which
the statistic includes variance of the data.

(4) The information processing device according to (3), in which
the statistic includes variance of pixel values of the image.

(5) The information processing device according to (3) or (4), in which
the statistic includes variance of prediction residuals being a difference between the image and a prediction image.

(6) The information processing device according to any one of (2) to (5), in which
the estimation unit determines whether or not the influence is large by comparing the estimated influence with a predetermined threshold, and
the control unit controls the division of the block on the basis of a result of the determination.

(7) The information processing device according to (6), in which
the threshold is a value derived by a monotonically increasing function for a quantization parameter.

(8) The information processing device according to any one of (1) to (7), in which
the estimation unit estimates the influence on the basis of a spatial feature amount of the image.

(9) The information processing device according to (8), in which
the spatial feature amount includes an evaluation value of data regarding the image by an operation including differentiation.

(10) The information processing device according to (9), in which
the spatial feature amount includes an evaluation value of pixel values of the image by an operation including differentiation.

(11) The information processing device according to (9) or (10), in which
the spatial feature amount includes an evaluation value of prediction residuals being a difference between the image and a prediction image by an operation including differentiation.

(12) The information processing device according to any one of (8) to (11), in which
the estimation unit determines whether or not the influence is large by comparing the estimated influence with a predetermined threshold, and
the control unit controls the division of the block on the basis of a result of the determination.

(13) The information processing device according to (12), in which
the threshold is a value derived by a monotonically increasing function for a quantization parameter.

(14) The information processing device according to any one of (1) to (13), in which
the estimation unit estimates the influence on the basis of a frequency feature amount of the image.

(15) The information processing device according to (14), in which
the frequency feature amount includes a ratio of energy between coefficients transmitted in a case where the ZeroOut is applied and coefficients not transmitted out of transform coefficients corresponding to the image.

(16) The information processing device according to (15), in which
the frequency feature amount includes a ratio of the energy of the transform coefficients in the block that is not divided.

(17) The information processing device according to (15) or (16), in which
the frequency feature amount includes a ratio of the energy of the transform coefficients in the block divided into a size to which the ZeroOut is not applied.

(18) The information processing device according to any one of (14) to (17), in which
the estimation unit determines whether or not the influence is large by comparing the estimated influence with a predetermined threshold, and
the control unit controls the division of the block on the basis of a result of the determination.

(19) The information processing device according to any one of (1) to (18), in which
in a case where the estimated influence is large, the control unit adds a predetermined offset value to a cost in a case where the block is not divided.

(20) The information processing device according to any one of (1) to (19), in which
in a case where the estimated influence is large, the control unit forces the division of the block.

(21) The information processing device according to any one of (1) to (20), in which
the control unit adds an offset value corresponding to the estimated influence to a cost in a case where the block is not divided.

(22) The information processing device according to any one of (1) to (21), further including:
a cost deriving unit that derives a cost of coding in a case where the block is not divided and a cost of coding in a case where the block is divided; and
a division setting unit that sets whether or not to divide the block on the basis of the cost, in which
the control unit controls division setting of the block by the division setting unit by correcting the cost derived by the cost deriving unit on the basis of the influence estimated by the estimation unit.

(23) An information processing method including:
estimating, on the basis of an image, influence on a subjective image quality of a decoded image by applying ZeroOut to quantization coefficients corresponding to the image when coding the image; and
controlling division of a block on the basis of the estimated influence when setting a size of the block serving as a unit of processing in the coding of the image.

(31) An information processing device including:
an estimation unit that estimates, on the basis of a scaling list, influence on a subjective image quality of a decoded image by applying ZeroOut to quantization coefficients corresponding to the image when coding the image; and
a control unit that controls division of a block on the basis of the influence estimated by the estimation unit when setting a size of the block serving as a unit of processing in the coding of the image.

(32) The information processing device according to (31), in which
the estimation unit estimates the influence on the basis of a statistic of list values of a current picture scaling list corresponding to coefficients of the block not transmitted in a case where the ZeroOut is applied.

(33) The information processing device according to (32), in which
the statistic includes an average value of the list values.
(34) The information processing device according to (32) or (33), in which
the estimation unit determines whether or not the influence is large by comparing the estimated influence with a predetermined threshold, and
the control unit controls the division of the block on the basis of a result of the determination.
(35) The information processing device according to (34), in which
the threshold is a statistic of list values of a default scaling list corresponding to coefficients of the block not transmitted in a case where the ZeroOut is applied.
(36) The information processing device according to any one of (31) to (35), in which
in a case where the estimated influence is large, the control unit adds a predetermined offset value to a cost in a case where the block is not divided.
(37) The information processing device according to any one of (31) to (36), in which
in a case where the estimated influence is large, the control unit forces the division of the block.
(38) The information processing device according to any one of (31) to (37), in which
the control unit adds an offset value corresponding to the estimated influence to a cost in a case where the block is not divided.
(39) The information processing device according to any one of (31) to (38), further including:
a cost deriving unit that derives a cost of coding in a case where the block is not divided and a cost of coding in a case where the block is divided; and
a division setting unit that sets whether or not to divide the block on the basis of the cost, in which
the control unit controls division setting of the block by the division setting unit by correcting the cost derived by the cost deriving unit on the basis of the influence estimated by the estimation unit.
(40) An information processing method including:
estimating, on the basis of a scaling list, influence on a subjective image quality of a decoded image by applying ZeroOut to quantization coefficients corresponding to an image when coding the image; and
controlling division of a block on the basis of the estimated influence when setting a size of the block serving as a unit of processing in the coding of the image.

REFERENCE SIGNS LIST

201 CU setting device
211 Control unit
221 Cost deriving unit
222 Cost correction unit
223 CU division setting unit
231 Estimation unit
232 Processing unit
500 Image coding device
501 Control unit
531 CU setting unit
900 Computer

The invention claimed is:
1. An information processing device comprising:
an estimation unit configured to estimate, based on an image, influence on a subjective image quality of a decoded image by applying ZeroOut to quantization coefficients corresponding to the image at a time of a coding process of the image; and
a control unit configured to control division of a block based on the influence estimated by the estimation unit at a time of a setting process of a size of the block that serves as a unit of processing in the coding process of the image.

2. The information processing device according to claim 1, wherein the estimation unit is further configured to estimate the influence bases on a statistic of data regarding the image.

3. The information processing device according to claim 2, wherein
the statistic includes variance of pixel values of the image.

4. The information processing device according to claim 2, wherein the statistic includes variance of prediction residuals that is a difference between the image and a prediction image.

5. The information processing device according to claim 1, wherein the estimation unit is further configured to estimate the influence based on a spatial feature amount of the image.

6. The information processing device according to claim 5, wherein the spatial feature amount includes an evaluation value of pixel values of the image by an operation including differentiation.

7. The information processing device according to claim 5, wherein the spatial feature amount includes an evaluation value of prediction residuals that is a difference between the image and a prediction image by an operation including differentiation.

8. The information processing device according to claim 1, wherein the estimation unit is further configured to estimate the influence based on a frequency feature amount of the image.

9. The information processing device according to claim 8, wherein the frequency feature amount includes a ratio of energy between coefficients transmitted based on the ZeroOut is applied and coefficients not transmitted out of transform coefficients corresponding to the image in the block that is not divided.

10. The information processing device according to claim 8, wherein the frequency feature amount includes a ratio of energy between coefficients transmitted based on the ZeroOut is applied and coefficients not transmitted out of transform coefficients corresponding to the image in the block divided into a size to which the ZeroOut is not applied.

11. The information processing device according to claim 1, wherein based on the estimated influence is large, the control unit is further configured to add an offset value to a cost based on the block is not divided.

12. The information processing device according to claim 1, wherein based on the estimated influence is large, the control unit is further configured to force the division of the block.

13. The information processing device according to claim 1, wherein the control unit is further configured to add an offset value corresponding to the estimated influence to a cost based on the block is not divided.

14. The information processing device according to claim 1, further comprising:
a cost deriving unit configured to derive a cost of the coding process based on the block is not divided and a cost of the coding process based on the block is divided; and
a division setting unit configured to set the division of the block based on the cost, wherein the control unit is further configured to control a division setting process of the block by the division setting unit by a correcting process of the cost derived by the cost deriving unit based on the influence estimated by the estimation unit.

15. An information processing method, comprising:

estimating, based on an image, influence on a subjective image quality of a decoded image by applying ZeroOut to quantization coefficients corresponding to the image at a time of a coding process of the image; and controlling division of a block based on the estimated influence at a time of a setting process of a size of the block serving as a unit of processing in the coding process of the image.

16. An information processing device, comprising:

an estimation unit configured to estimate, based on a scaling list, influence on a subjective image quality of a decoded image by applying ZeroOut to quantization coefficients corresponding to the image at a time of a coding process of the image; and a control unit configured to control division of a block based on the influence estimated by the estimation unit at a time of a setting process of a size of the block that serves as a unit of processing in the coding process of the image.

17. The information processing device according to claim 16, wherein the estimation unit further configured to estimate the influence based on an average value of list values of a current picture scaling list corresponding to coefficients of the block not transmitted based on the ZeroOut is applied.

18. The information processing device according to claim 17, wherein the estimation unit is further configured to determine whether or not the influence is large based on a comparison of the estimated influence with a threshold, and the control unit is further configured to control the division of the block based on a result of the determination.

19. The information processing device according to claim 18, wherein the threshold is an average value of list values of a default scaling list corresponding to coefficients of the block not transmitted based on the ZeroOut is applied.

20. An information processing method, comprising:

estimating, based on a scaling list, influence on a subjective image quality of a decoded image by applying ZeroOut to quantization coefficients corresponding to an image at a time of a coding process the image; and controlling division of a block based on the estimated influence at a time of a setting process of a size of the block serving as a unit of processing in the coding process of the image.

* * * * *